(12) United States Patent
Presby

(10) Patent No.: US 11,021,380 B1
(45) Date of Patent: Jun. 1, 2021

(54) MODULAR WASTEWATER TREATMENT SYSTEM CONFIGURED FOR COMPACT SHIPPING

(71) Applicant: David W Presby, Sugar Hill, NH (US)

(72) Inventor: David W Presby, Sugar Hill, NH (US)

(73) Assignee: PRESBY PLASTICS, INC, Whitefield, NH (US)

( * ) Notice: Subject to any disclaimer, the term of this patent is extended or adjusted under 35 U.S.C. 154(b) by 0 days.

(21) Appl. No.: 16/517,515

(22) Filed: Jul. 19, 2019

(51) Int. Cl.
| | |
|---|---|
| C02F 3/28 | (2006.01) |
| C02F 3/10 | (2006.01) |
| C02F 1/00 | (2006.01) |
| C02F 3/04 | (2006.01) |
| E03F 1/00 | (2006.01) |
| C02F 103/00 | (2006.01) |

(52) U.S. Cl.
CPC ............... *C02F 3/10* (2013.01); *C02F 1/006* (2013.01); *C02F 3/046* (2013.01); *C02F 3/28* (2013.01); *C02F 3/288* (2013.01); *E03F 1/002* (2013.01); *C02F 2103/005* (2013.01); *C02F 2201/007* (2013.01)

(58) Field of Classification Search
CPC .... C02F 3/046; C02F 3/288; C02F 2201/007; C02F 2203/006; E03F 1/002; E02B 11/005
USPC ...................... 210/170.08, 532.2; 405/43, 51
See application file for complete search history.

(56) References Cited

U.S. PATENT DOCUMENTS

| | | | | | |
|---|---|---|---|---|---|
| 2,771,320 | A | * | 11/1956 | Korwin ..................... | B05B 1/20 405/43 |
| 2,814,529 | A | * | 11/1957 | Arnt .......................... | B05B 1/20 405/43 |
| 7,040,840 | B2 | * | 5/2006 | Zook ........................ | E03F 1/002 210/170.08 |
| 7,374,670 | B2 | * | 5/2008 | Potts ........................ | C02F 3/046 210/170.08 |
| 7,854,838 | B2 | * | 12/2010 | Martin ..................... | E02B 5/085 210/170.03 |
| 8,777,515 | B1 | * | 7/2014 | Donlin ................... | E02B 11/005 405/43 |
| 9,783,439 | B2 | * | 10/2017 | Presby ..................... | C02F 3/046 |
| 10,603,608 | B2 | * | 3/2020 | Zock ........................ | E02B 3/108 |
| 2009/0145830 | A1 | * | 6/2009 | Couch ..................... | C02F 3/046 210/170.08 |
| 2018/0319686 | A1 | * | 11/2018 | Potts ........................ | C02F 3/046 |

* cited by examiner

*Primary Examiner* — Christopher Upton
(74) *Attorney, Agent, or Firm* — C Nessler

(57) ABSTRACT

A module for a wastewater treatment system, for use when buried in permeable media such as sand or soil, includes a central distribution unit and a multiplicity of treatment fins in flow communication therewith. Within each fin is a lengthwise-running perforated pipe. In one kind of assembly, a treatment system module comprises a central housing has attached fins which are wrapped in spiral fashion around the central distribution unit when in a compact shipping container. In another assembly, the fins are attached to a central membrane and shipped in a container while folded, detached from the central distribution unit; and the distribution unit may be comprised of separate nested half units to be joined at the point of use. When take to a wastewater treatment site, the packed components are removed from the container and arranged for use.

11 Claims, 48 Drawing Sheets

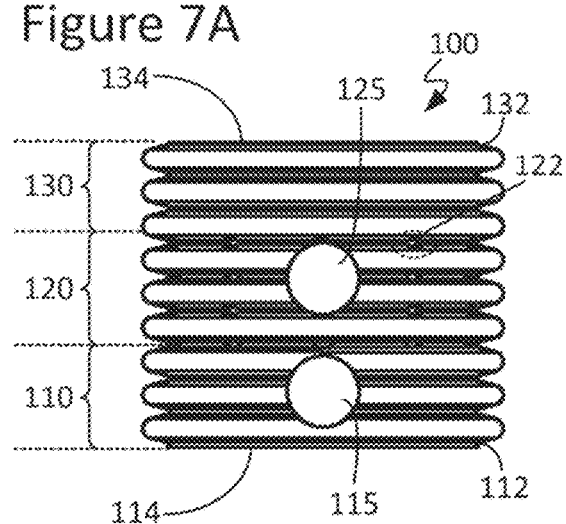
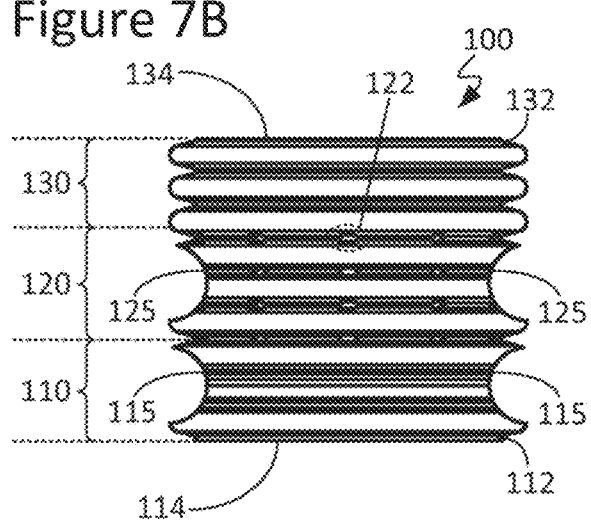
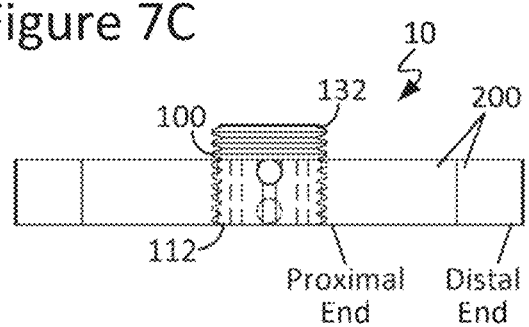
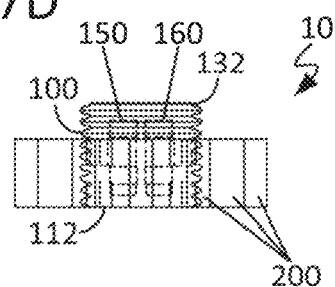
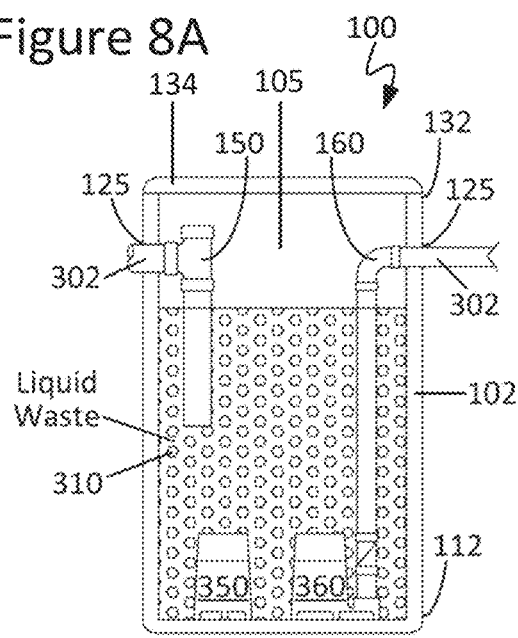
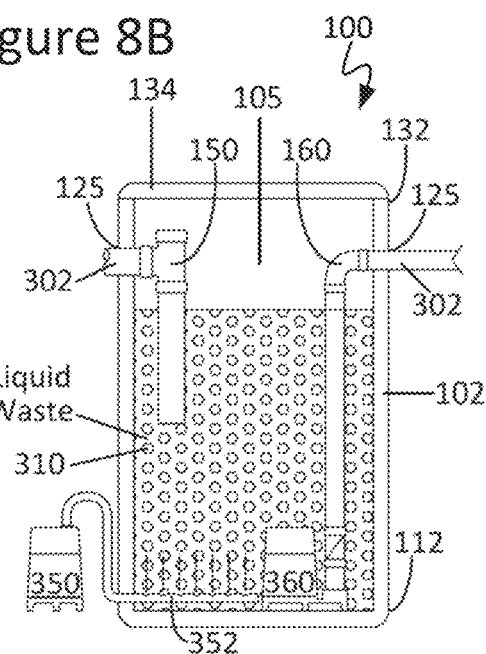

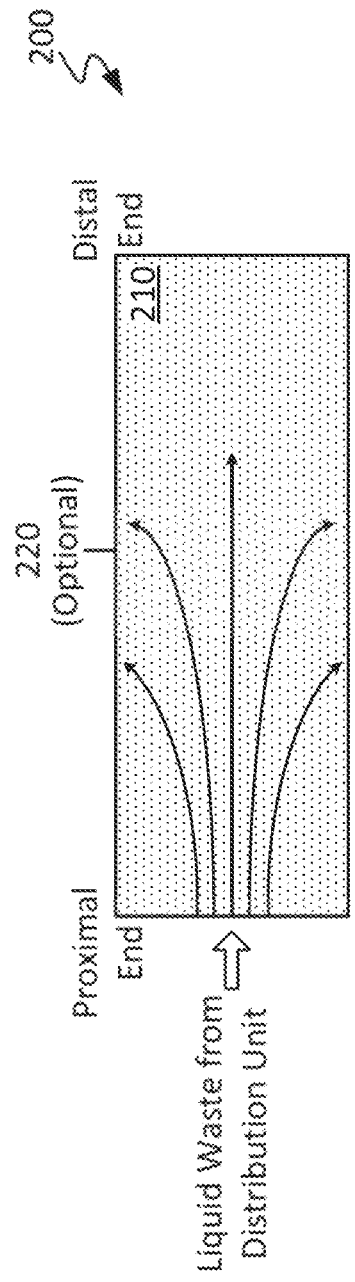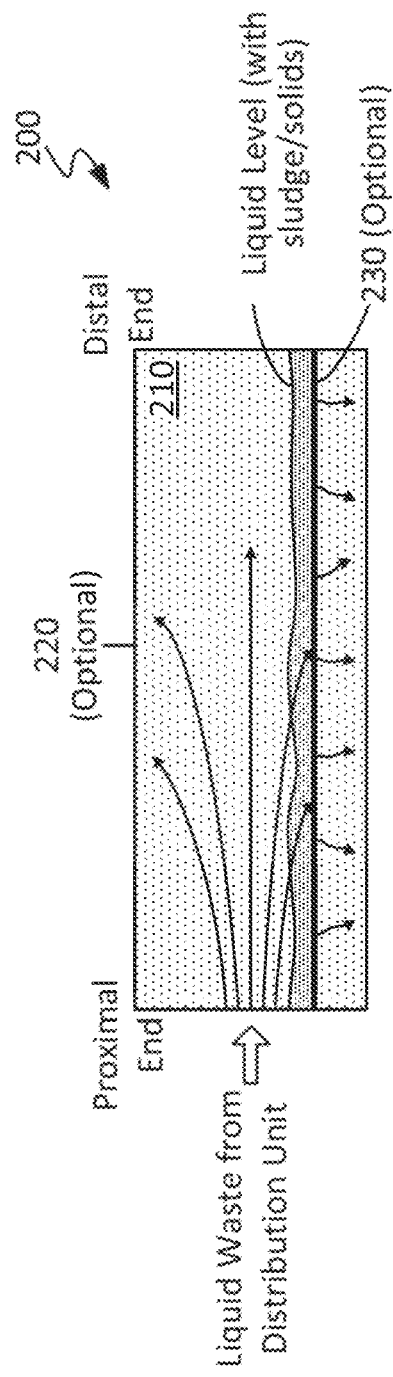

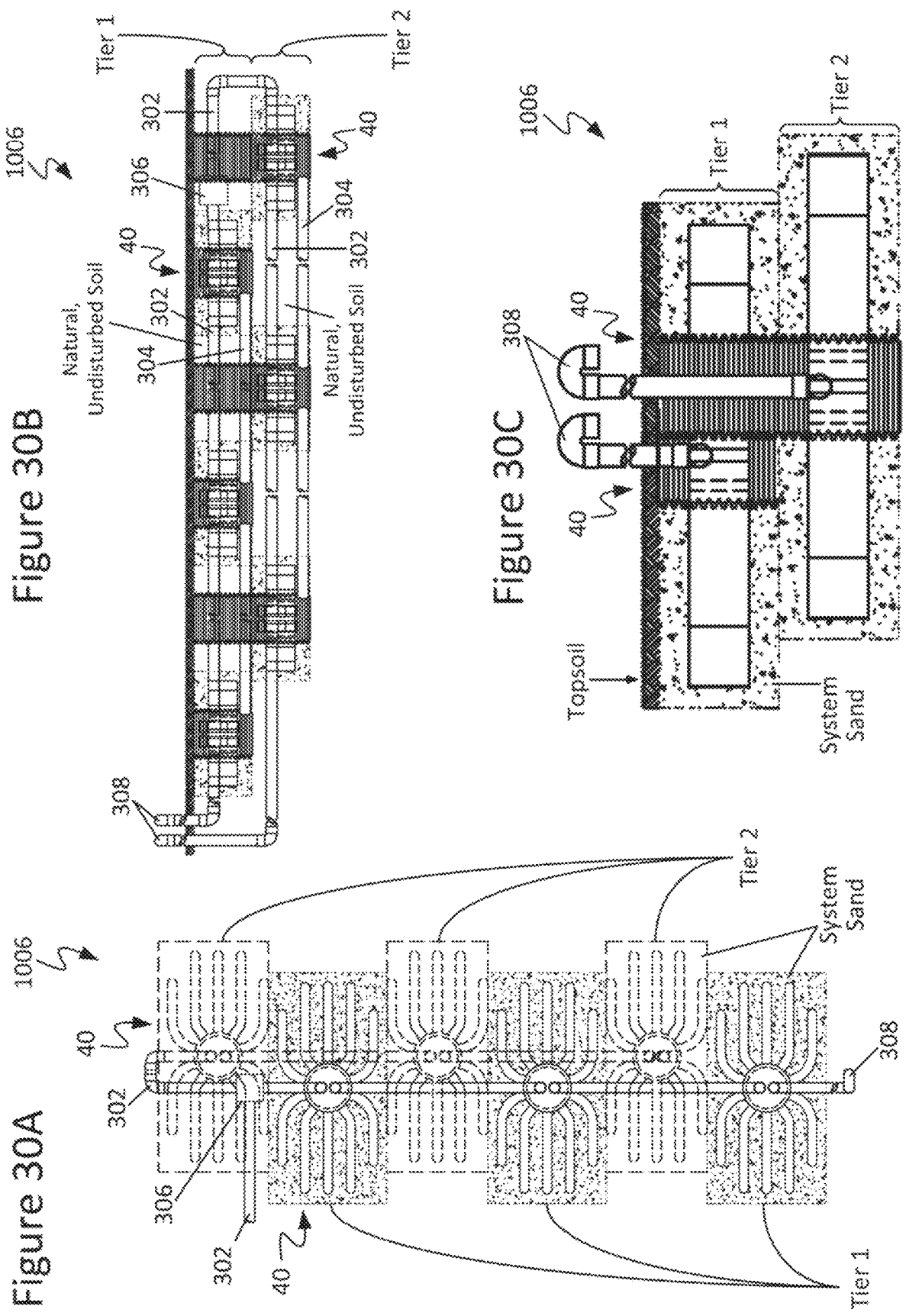

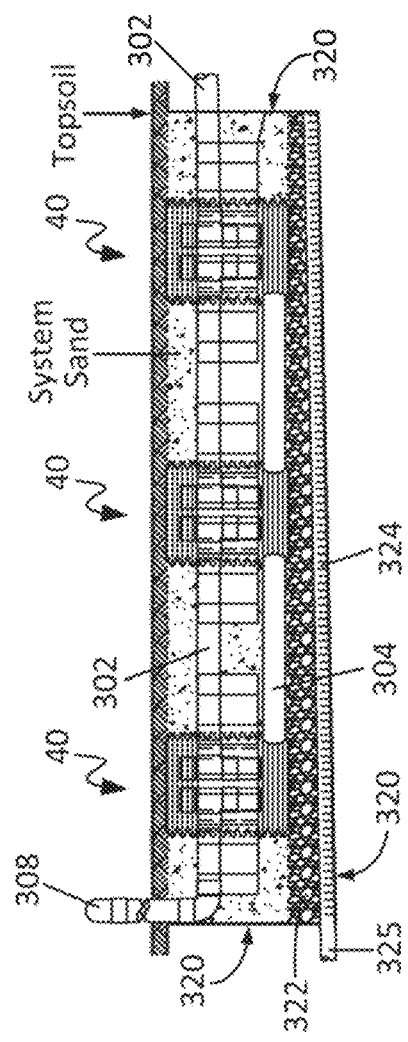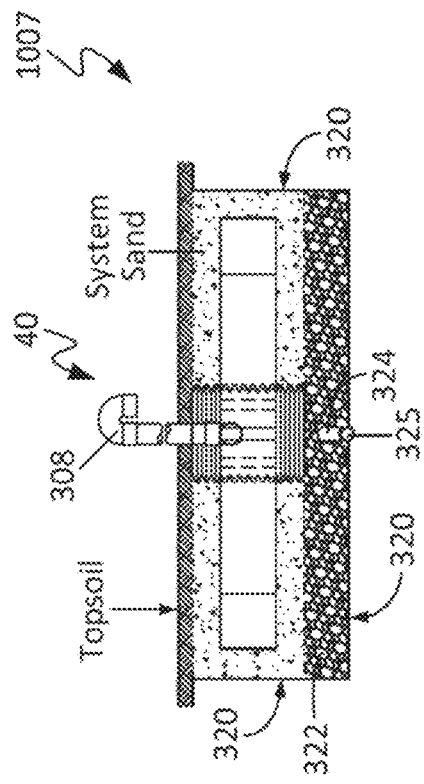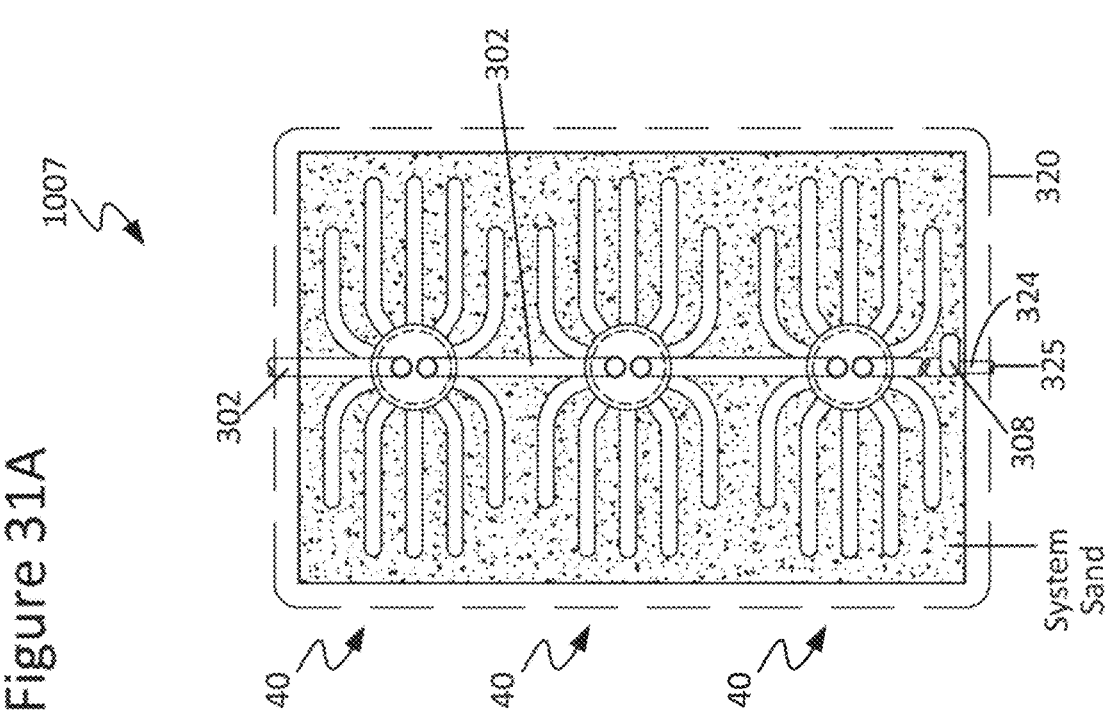

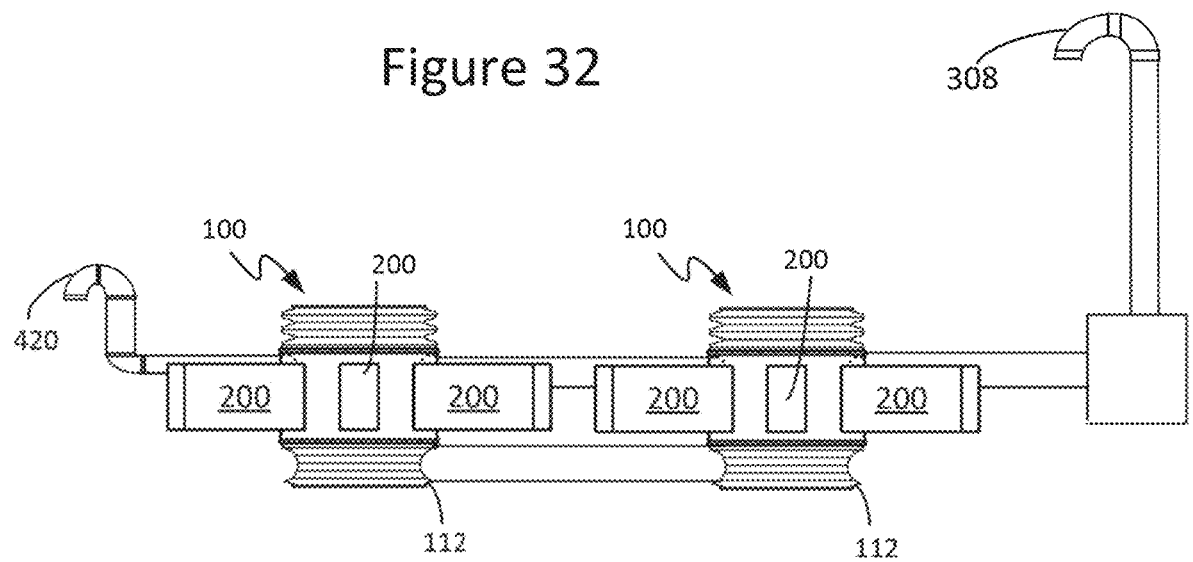

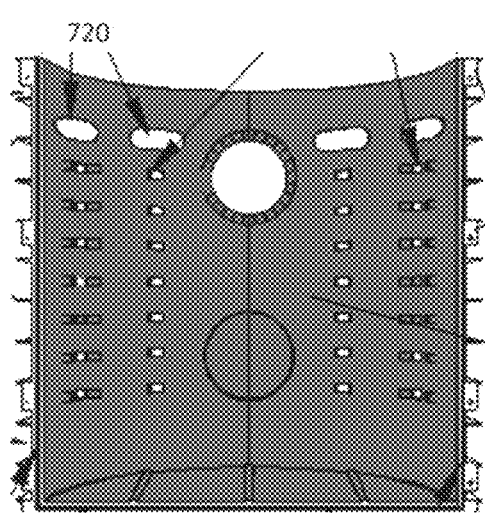 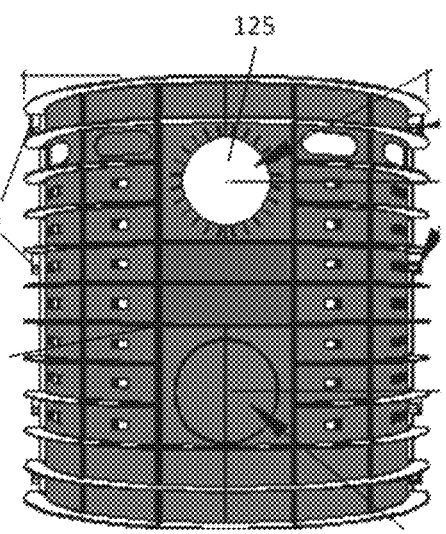
Figure 51A  Figure 51B
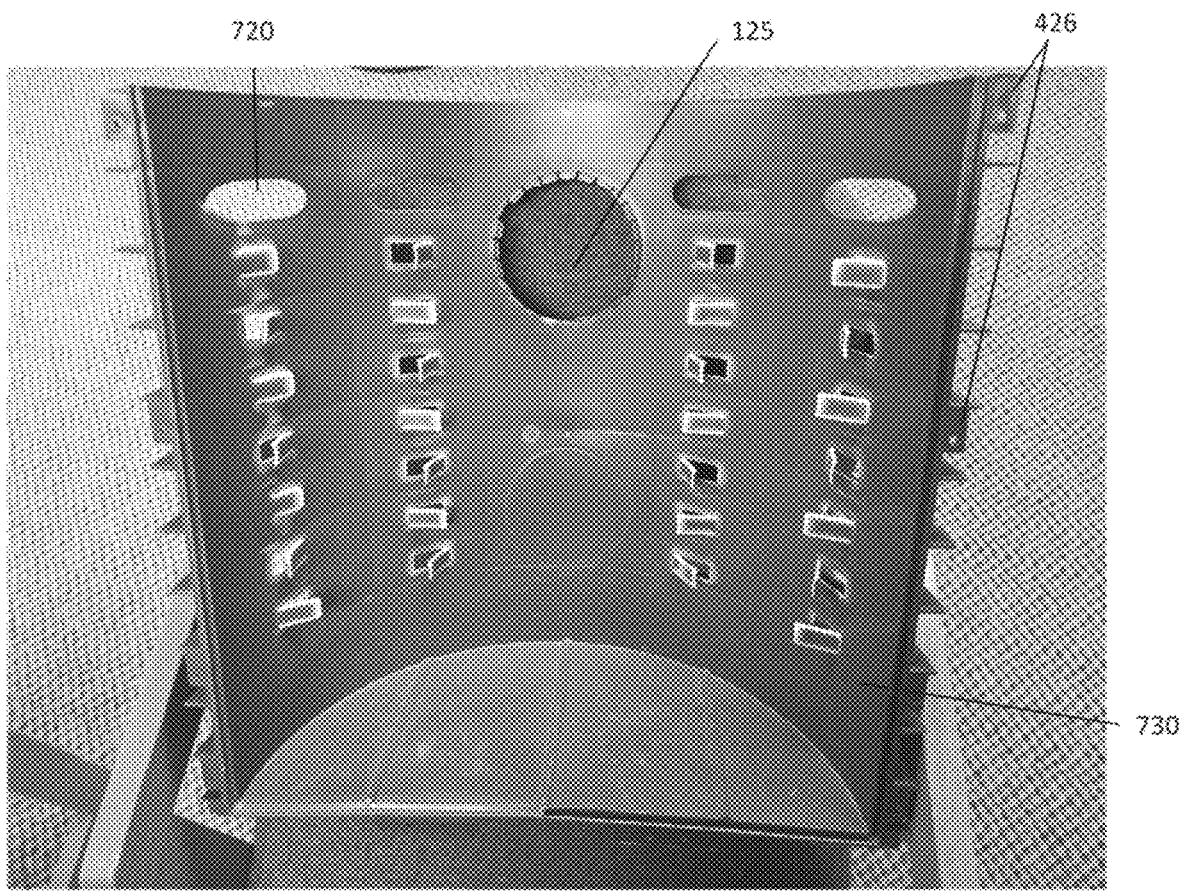
Figure 52

MODULAR WASTEWATER TREATMENT SYSTEM CONFIGURED FOR COMPACT SHIPPING

This application claims benefit of provisional patent application Ser. No. 62/700,535, filed Jul. 19, 2018, the disclosure of which is hereby incorporated by reference in its entirety.

FIELD OF INVENTION

The present invention relates to treatment of liquid waste, and more particularly to treatment of wastewater and septic tank effluent.

BACKGROUND

Well known wastewater treatment options include aerobic digestion and anaerobic digestion. In the bacterial process known as aerobic digestion, microorganisms break down biodegradable material in the wastewater in the presence of oxygen. In such aerobic processes, gaseous byproducts may be produced including, for example, carbon dioxide. In the bacterial process known as anaerobic digestion, microorganisms break down biodegradable material in the absence of oxygen. In such anaerobic processes, gaseous byproducts may be produced including, for example, methane.

The foregoing processes are used within subsurface wastewater treatment systems of the kind that are used for small residential and commercial buildings. In a familiar system, wastewater flows from the source building to a septic tank and then to a leach field which comprises a number of serially-connected galleries, chambers, or drainage units that are arranged in parallel spaced apart rows within soil. As the water flows through the components of the system and into the sand, soil or other media surrounding the components, it is biologically acted upon by bacteria. Often such prior art systems require large land area for continuing good function.

There is a continuing need for and interest in treatment systems which are effective at treating wastewater and which can comply with sanitary system regulator requirements, where the systems are compact and use a comparatively small land area, where the systems are scalable with respect to being capable of handling different size buildings and amounts of wastewater flow, where the systems are readily installed, where the systems are economic to manufacture, and where the systems are compact and economic to transport.

SUMMARY

Objects of the present invention include meeting the needs mentioned just above. Another object is to provide a system adapted to function well when the components thereof are at uneven elevations, either in the original installation, or due to subterranean changes after installation.

The systems and methods described in the present disclosure provide a liquid waste treatment system, also alternatively called a wastewater treatment system herein, which is capable of receiving wastewater from a source and distributing the wastewater throughout a plurality of treatment fins within which the wastewater is biologically acted upon. In accord with the invention, embodiments of a system comprise one or more modules, each module comprising a central distribution unit having an interior, an exterior, and a body portion. The body portion is characterized as a mid-body portion when it is optionally combined with a lower end sump and an upper end headspace. The central distribution unit—also sometimes called the central unit, may be circular or non-circular in the horizontal plane; it comprises a sidewall having a multiplicity of passageways for water flow. In an exemplary system, a membrane surrounds the central distribution unit sidewall and there is a space between the membrane and sidewall which is a fluid reservoir adapted for holding waste water which flows through the passageways. The fluid reservoir interconnects one or more of the passageways, and thus the interior of the central unit, with one or more of each of the fins. Each fin of a multiplicity/plurality of treatment fins is connected directly or indirectly to the membrane. The fins extend outwardly (which is typically horizontally) from the central distribution unit, to carry and treat wastewater. The fins preferably have oblong cross sections with the long axis extending nominally vertically.

In embodiments of the invention each fin comprises an aerobic zone, an outer covering surrounding the fin; the aerobic zone comprises compressed fibers or other media within the fin; and there is optionally at least one perforated pipes running along the length of the fin, within the upper and/or the bottom portion or both, when the fin has an oblong cross section. The perforated pipe(s) is in flow communication with the interior of the central distribution unit, to distribute air that is present within the interior of a central distribution unit by way of a vent.

Central distribution units may be interconnected with each other to provide a system which is an assembly of modules that in combination meet the wastewater flow needs of a particular source of wastewater. In embodiments of the invention, the systems/modules are interconnected by distribution piping and equalization piping, wherein the system is characterized as having a self-leveling characteristic. An exemplary liquid waste treatment system module is capable of providing wastewater to each of the plurality of treatment fins when the central distribution unit is greater than 15 degrees from vertical, greater than 10 degrees from vertical, or greater than 5 degrees from vertical.

In multi-system installations, the fins of one treatment system that are positioned within sand or the like may be interleaved with the fins of an adjacent system.

Embodiments of treatment systems comprise a central distribution unit having a cover defining a port which may be useful for inspection or optionally connected to an extension pipe that runs upwardly to the surface of the sand or other media in which the system is buried, to provide the system with at least one vent, preferably two vents, in communication with the atmosphere. Such a wastewater treatment system is configured through the vent passively to provide atmospheric oxygen to an aerobic treatment zone within the system, so the system is configured to reduce the biochemical oxygen demand (BOD) of the wastewater by greater than 90 percent.

An exemplary treatment system comprises at least four treatment fins and is configured to be collapsed into a box of about 50 cubic feet or less, for economic shipment and distribution; the liquid waste treatment system weighs less than 32 kg. An exemplary system may be configured to treat at least 225 gallons per day of waste water. Multiple systems can be interconnected to provide greater flow capacity.

The systems and methods of the present invention provide a liquid waste treatment system which is capable of being collapsible and packaged to facilitate distribution using standard over-the-road product shipping methods. Each fin can be folded back on itself for shipping or wrapped around the exterior of the central distribution unit. The central distribution unit may be comprised of first and second rigid C-shape pieces that when separate can be nested together for shipment. The membrane with fins may be packaged separately from the central distribution unit. An exemplary system can be collapsed to fill less than 50 cubic feet of space.

Embodiments of the invention fulfil objects of the invention. The features and advantages described above are not all-inclusive and, in particular, many additional features and advantages will be apparent to one of ordinary skill in the art in view of the drawings, specification, and claims which follow. Moreover, it should be noted that the language used in the specification has been selected principally for readability and instructional purposes and not to limit the scope of the inventive subject matter.

BRIEF DESCRIPTION OF THE DRAWINGS

FIG. 7A is a side view of a central distribution unit configured in accordance with another embodiment of the present disclosure.

FIG. 7B is another side view of the central distribution unit of FIG. 7A.

FIG. 7C is a side view of a treatment module including the central distribution unit of FIG. 7A, in accordance with an embodiment of the present disclosure.

FIG. 7D is another side view of the treatment module of FIG. 7C.

FIG. 8A is a side cross-sectional view of a central distribution unit configured in accordance with another embodiment of the present disclosure.

FIG. 8B is a side cross-sectional view of a central distribution unit configured in accordance with another embodiment of the present disclosure.

FIGS. 14A-14B are side cross-sectional views of several example treatment fins configured in accordance with some embodiments of the present disclosure.

FIG. 30A is a plan view of a multi-tiered arrangement of rectangular treatment cells configured in accordance with an embodiment of the present disclosure.

FIG. 30B is a side view of the multi-tiered arrangement of FIG. 30A.

FIG. 30C is another side view of the multi-tiered arrangement of FIG. 30A.

FIG. 31A is a plan view of a serial arrangement of rectangular treatment cells configured in accordance with another embodiment of the present disclosure.

FIG. 31B is a side view of the serial arrangement of FIG. 31A.

FIG. 31C is another side view of the serial arrangement of FIG. 31A.

FIG. 32 illustrates an example embodiment of the present disclosure wherein the system is configured with a low vent and a high vent.

FIGS. 51A-B illustrate two clamshell halves of a central distribution unit, in one embodiment of the disclosure.

FIG. 52 illustrates a single clamshell half of a central distribution unit, in one embodiment of the disclosure.

Figure 1A:
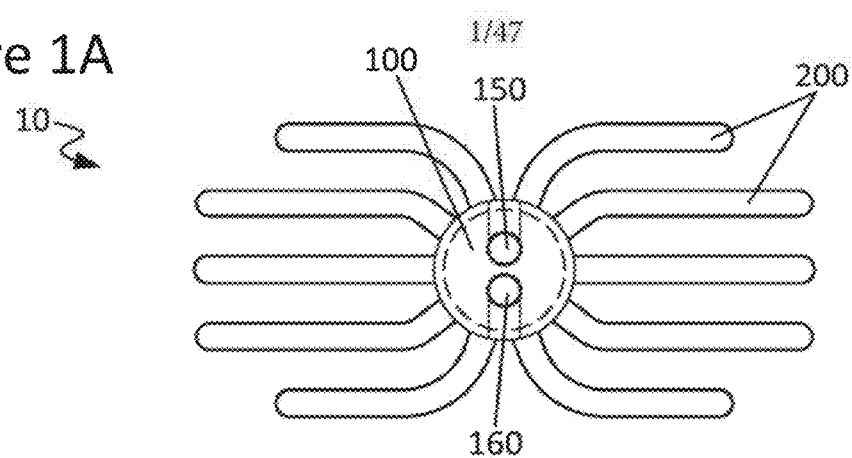
FIG. 1A is a plan view of a treatment module configured in accordance with an embodiment of the present disclosure.
Figure 1B:
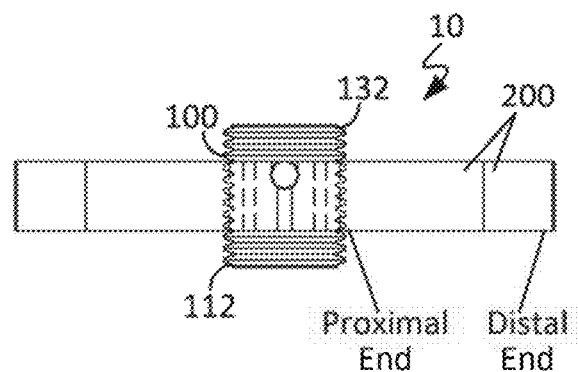
FIG. 1B is a side view of the treatment module of FIG. 1A configured in accordance with an embodiment of the present disclosure.
Figure 1C:
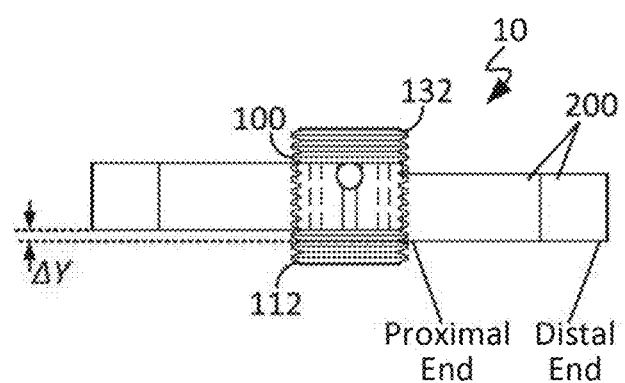
FIG. 1C is a side view of the treatment module of FIG. 1A configured with staggered treatment fins, in accordance with another embodiment of the present disclosure.
Figure 1D:
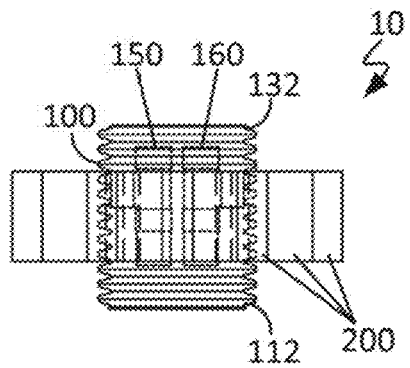
FIG. 1D is another side view of the treatment module of FIG. 1A.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

A modular liquid waste treatment system is disclosed. In accordance with some embodiments, the system includes a central distribution unit and one or more treatment fins in flow communication therewith. The central distribution unit may be configured to receive liquid waste from a given source and distribute that liquid waste, at least in part, to one or more treatment fins. In turn, bacteria may be present in a given treatment fin or fins to treat the liquid waste, and the resultant treated liquid may drain from the fin to the surrounding environment. In some embodiments, a given treatment fin may include porous media providing a large surface area on which bacteria may grow to facilitate treatment. The system may be installed in and/or above the ground, as desired, and in some cases may be surrounded, at least in part, with system sand, coarse aggregate, and/or other treatment media. The system may be used in aerobic and/or anaerobic processing of liquid waste. Numerous configurations and variations will be apparent in light of this disclosure.

The present invention has relation to U.S. Pat. No. 9,783,439 of the present inventor; the disclosure of said patent is hereby incorporated by reference in its entirety. Many of the figures and substantial parts of the disclosure herein correspond with what is described in said patent.

General Overview

Disclosed is a modular liquid waste treatment system suited for burial in water permeable material, e.g., sand, soil or the like. In accordance with some embodiments, the treatment system includes one or more treatment modules. A treatment module may include a central distribution unit and one or more treatment fins in flow communication therewith. The central distribution unit may be configured to receive liquid waste from a given source, such as a septic tank, a distribution box, a storm drain, or another upstream central distribution unit. The central distribution unit may hold the liquid waste until a sufficient liquid level is reached, at which point some of the liquid waste may exit through a passageway in the sidewall of the unit, for example, to the one or more treatment fins associated therewith and/or to another downstream central distribution unit.

A treatment fin, as used herein, is configured to be in flow communication with a central distribution unit so that wastewater or other liquid intended to be treated can pass from the central distribution unit into the fin. A treatment fin includes one or more porous media that are (optionally) retained by an outer retaining material, such as a covering, which may be formed from fabric. The porous material may be added to the treatment fin (e.g., the treatment fin is filled with porous material) after placement at the site, or it may be in place when the treatment fin is shipped or installed. In some cases, a treatment fin may be limited to a single opening that is in flow communication with a central distribution unit. In many embodiments, treated liquid (e.g., effluent) exiting a treatment fin passes through a material that at least partially retains fluids or retards fluid flow. The covering optionally surrounding at least a portion of the porous material of a given treatment fin may be, for example, permeable, semi-permeable, or impermeable (e.g., to effluent), and different types of coverings may be used to cover different portions of the treatment fin. Additional layers of covering, for example, permeable or semi-permeable coverings, may be used inside the treatment fin so that successive layers of coverings and porous media are encountered by water passing from the inner core to the external surface of the treatment fin. The length of a treatment fin can be measured, for example, from the point of contact with a central distribution unit to an end that is most distal from the central distribution unit. The width of a treatment fin can be measured, for example, across the fin in a horizontal direction (when installed) that is orthogonal (e.g., offset by 90°) to the length. The height of a treatment fin is the distance from the top of the treatment fin to the bottom thereof when the treatment fin is in an installed position. The length-to-width ratio of a treatment fin may be, for example, greater than 2:1, greater than 3:1, greater than 5:1, greater than 10:1, less than 50:1, less than 20:1, less than 10:1, or less than 5:1. The length-to-height ratio of a treatment fin may be, for example, greater than 1:1, greater than 2:1, greater than 3:1, less than 10:1, less than 5:1, or less than 2:1. The outer surface area-to-volume ratio of a treatment fin may be, for example, greater than 2:1, greater than 5:1, greater than 10:1, less than 20:1, less than 10:1, less than 5:1 or less than 2:1. A treatment fin may be self-supportive or may be supported, for instance, by system sand or other material after installation. A treatment fin may be stiff or flexible (or have portions of both) and in some cases can be curved and re-curved in situ to minimize the square footage that is required for the functional installation of the treatment module or for packaging for shipment. A treatment fin may include a flange, typically around the opening thereof, that mates with the central distribution unit. The flange may aid in positioning or fixing the fin to the central distribution unit or to a sleeve or other connector that is later affixed to the central distribution unit. Numerous configurations will be apparent in light of this disclosure.

In some instances, the central distribution unit and the at least one treatment fin in flow communication therewith can treat an amount of liquid waste associated with one bedroom. In some cases, the central distribution unit and the at least one treatment fin in flow communication therewith can treat an amount of liquid waste associated with two or more bedrooms. In some instances, the system comprises a single central distribution unit and associated fins that occupy a footprint after installation of less than 250 square feet of land and are configured to treat the amount of waste generated by a family in a four bedroom house. In some instances, the treatment system described herein can be sized to treat an amount of waste associated with commercial or municipal facilities. The modular design of the system allows greater than one, greater than two, greater than five or greater than 10 modular systems to be fluidly connected parallel or serially together to treat large waste flows. In some instances, the treatment system meets National Sanitation Foundation (NSF) Standard 40 treatment criteria. In some embodiments, the system described herein is configured to clean wastewater to NSF standard 40 such that clean water s delivered to the native soil, providing an advantage over flowing untreated effluent directly on the native soil. In some embodiments, each central distribution unit, and the fins connected directly to it, may be configured to process more than 100 gallons per day, more than 150 gallons per day, more than 200 gallons per day, or 250 gallons per day of more.

A given treatment fin may treat the liquid waste received from the central distribution unit via bacterial digestion and then drain the resultant treated liquid to the surrounding environment. To that end, in some embodiments, a given treatment fin may include one or more types of porous media which provide a large surface area on which bacteria may grow, facilitating treatment of the liquid waste. A high surface area aerobic zone may provide surface area of greater than 100 cubic feet per linear foot of treatment fin, greater than 200 cubic feet per linear foot of treatment fin, or more. A system configured as described herein may be installed in and/or above the ground, as desired, and in some cases may be surrounded, at least in part, with system sand and/or other supplemental treatment media, as desired for a given target application or end-use. The system may be surrounded by a system sand extension which extends a certain distance beyond the area of the system itself, which may enable a reduction in the required setback area. The sand extension need not be as deep as the system sand immediately surrounding the fins as it is fed via the adjacent system sand, not directly from the fins. The entire treatment fin and its constituent components, such as, for example, one or more porous media, one or more outer layers, and/or one or more interior layers may be gas-permeable, in some embodiments.

In some embodiments, one or more of the treatment fins may be provided with one or more treatment fin supports. The treatment fin supports are configured to provide support to a treatment fin over its useable life and prevent collapse after media, soil, or sand are placed in and around the treatment fin. In some embodiments, the treatment fin support may include a region including compressed or collapsed fibers. In some embodiments, the treatment fin support may further include a conduit, also referred to as a pipe, which has pores along its length and which configured to distribute water or air within the fin. In those embodiments, the interior of the fin comprises an upper sub-portion containing the pipe and a vertically underlying lower sub-portion which comprises the porous media.

Figure 15:
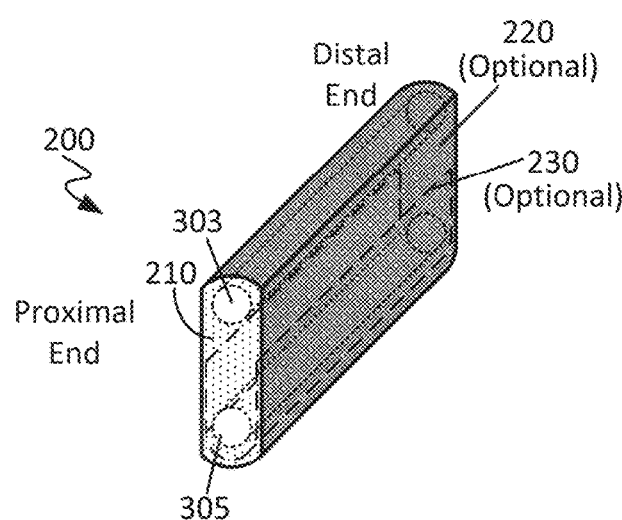
FIG. 15 is an end perspective view of an example treatment fin configured in accordance with another embodiment of the present disclosure.
Figure 16A:
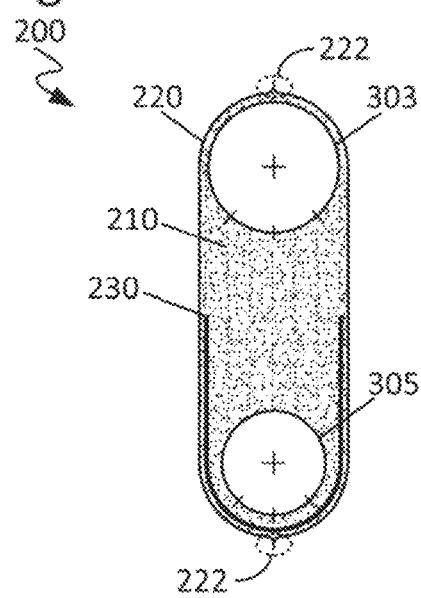
FIGS. 16A-16C are cross-sectional views of several example treatment fins configured in accordance with some embodiments of the present disclosure.
Figure 16B:
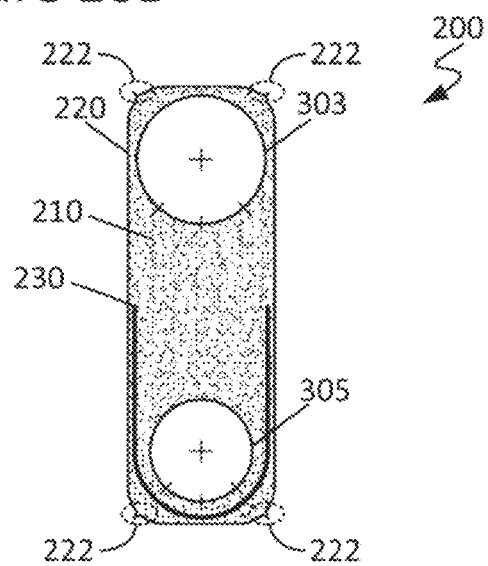

In other embodiments, the treatment fin support may include a pair of conduits (as shown in FIGS. 15 and 16A-B, for example). In some examples, each conduit in the pair of conduits is wrapped with green fibers around each of the conduits, and black fabric can then be wrapped around the outside of each treatment fin. Having a pair of conduits provides improved oxygen flow into the treatment fins to encourage aerobic treatment of effluent. In some embodiments, the treatment fin support is configured to limit collapse of the treatment fin by 50% or more, 60% or more, or even 70% or more. In some embodiments having conduits, the conduits are corrugated and have sufficient flexibility to enable wrapping of the conduit around the central unit exterior or to enable bending in other ways described herein. In some embodiments the conduits are formed of separate lengthwise segments to enable the foregoing bending.

The treatment fin support may be configured to provide stability to and reduce collapse of a given treatment fin, particularly following backfilling of soil or sand on top of the treatment fin. Providing stability and reducing collapse may provide improved treatment capability within the treatment fins as a result of (a) providing increased surface area by increasing the volume of high surface area materials contained within the treatment fin; (b) providing an increased volume within the treatment fin for treatment by reducing collapse of the treatment fin; (c) providing an increased volume within the treatment fin such that oxygen can more readily penetrate into the volume of the treatment fin to encourage aerobic treatment.

In some embodiments, the high surface area aerobic zone may include a zone filled with compressed fibers 600 or collapsed fibers configured for bacterial treatment. In some embodiments, the high surface area aerobic zone is a mesh with holes about ¼", ½", or 1" which has undergone a compression process. In some embodiments, the mesh may be configured in a tube 610. In some embodiments, the fibers may be compressed into a tube 610 via a specialized manufacturing method. In some embodiments, the high surface area aerobic zone is a compressed bacterial surface within the treatment fin which is configured to prevent compression of an outer diameter of the treatment fin. In some embodiments, the compressed fibers 600 may be positioned under a conduit 603 in a treatment fin. In some embodiments, plastic tabs 602 may be connected between the compressed fibers 600 and the conduit 603 in order to maintain alignment of the conduit 603 above the tube 610 of compressed fibers 600.

A specialized manufacturing method may form mesh fiber into a tube shape. A netting 605 may be provided around the outside of the fibers before compression and used after compression to maintain the fibers in a compressed configuration. The mesh fiber, or fiber mesh, is rolled up in a tube shape with netting 605 formed around the fiber mesh as the fibers are formed into a dense configuration. In some examples, the netting 605 may be secured around the compressed fibers 600 using clips 602. Using the specialized manufacturing method described herein, an increase of about 30% more fibers can be realized by compressing fibers into a given volume, compared to when the special method is not used.

Figure 46:
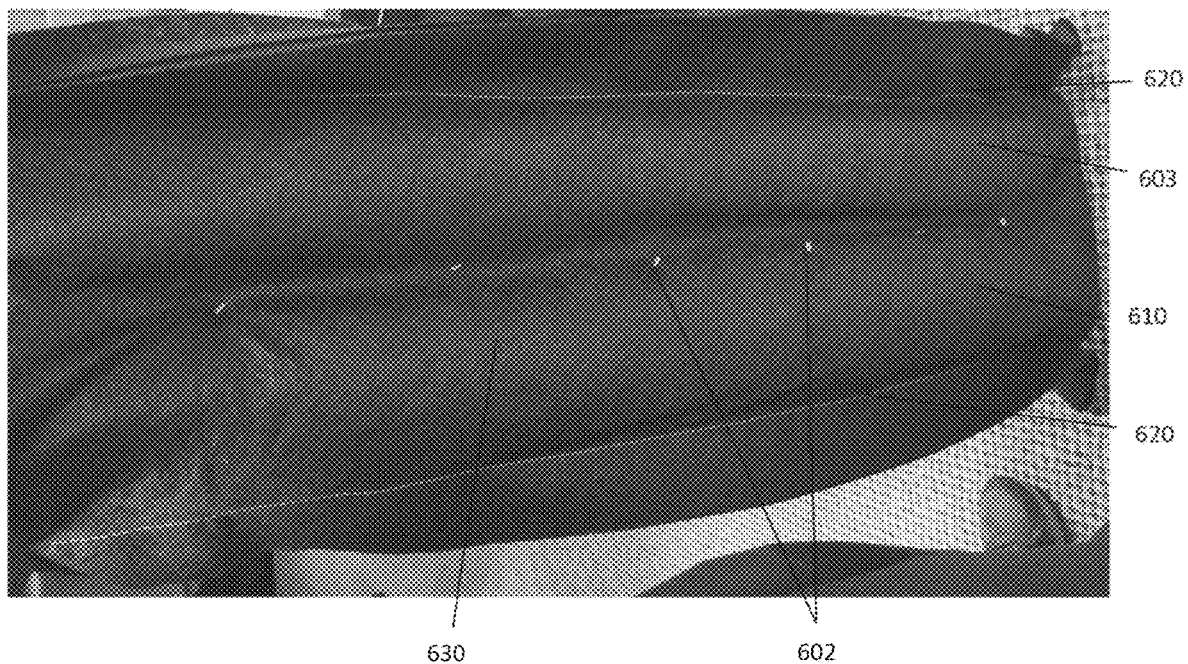
FIG. 46 illustrates an example treatment fin including a tube of compressed fibers positioned below a conduit, in one embodiment of the disclosure.

In some embodiments, as shown for example in FIG. 46, stitching 620 may be utilized for sealing fabric layer 630 of a treatment fin and clips 602 may be utilized for sealing a space between an upper conduit 603 and a lower tube 610 of compressed fibers 600. In other embodiments, as shown for example in FIGS. 49-50, fabric layer 630 may alternatively be sealed using an adhesive or glue 640.

In accordance with some embodiments, a treatment system configured as described herein can be utilized to treat any of a wide range of liquid wastes, including, for example: (1) sewage/septic effluent; (2) industrial effluent; (3) contaminated groundwater; (4) storm runoff; (5) household wastewater; (6) graywater; and/or (7) any other type of wastewater which may undergo aerobic and/or anaerobic treatment. In some cases, a system configured as described herein may be gravity fed (i.e., liquid waste may flow via gravitational force) and, in some instances, aided by capillary action provided by the porous media of a given treatment fin. However, the present disclosure is not so limited, as in some cases, liquid waste may be pressure-fed and/or vacuum-drawn through the disclosed system. Treatment of the liquid waste using the disclosed treatment system may be performed under aerobic and/or anaerobic conditions, as desired for a given target application or end-use.

As previously noted, a treatment system configured as described herein may be configured, in accordance with some embodiments, to be installed, in part or in whole, above the ground and/or within the ground. In some cases, the space around the central distribution unit and the one or more treatment fins of a given system may be backfilled with system sand (and/or other suitable dispersal, treatment, filtration, or support media), and topsoil may be disposed there over. The depth at which a treatment system is installed may be customized, as desired for a given target application or end-use. In some embodiments, extremely efficient treatment may allow for shallow placement of the treatment system in areas having high water tables or poor percolation.

In accordance with some embodiments, multiple treatment systems configured as described herein can be coupled with one another in any of a wide range of system arrangements to provide for great variation in treatment configurations. For instance, series arrangements, terraced arrangements, arrangements including a distribution box, and varying system footprints (e.g., linear; rounded; narrow; interlocking) may be provided using the disclosed treatment system. In accordance with some embodiments, the treatment capacity/throughput of a system configured as described herein can be customized, as desired for a given target application or end-use. In an example case, a treatment system may include one or more treatment modules. A treatment module includes a central distribution unit and the treatment fins that are attached (or otherwise operatively coupled) thereto. A treatment module may be sized and configured to treat the amount of liquid waste associated with a bedroom or may be sized and configured to treat the waste associated with a fraction of a bedroom (e.g., ½ or ¼ of a bedroom) or multiple bedrooms (e.g., 2, 3, 4, or more bedrooms). In one set of example embodiments, a treatment module may be sized so as to occupy less than 50, 100, 250 or 500 cubic feet, less than of space within the earth while allowing for treatment of an amount of liquid waste associated with a four bedroom house. The treatment system described herein can additionally be used to treat commercial or municipal wastewater, adding more units in parallel or in series to meet the required flow processing rate. In some embodiments, a treatment system may include a multiplicity of treatment modules. In other embodiments, a treatment system may include a hundred or more treatment modules. In other words, the treatment system described herein may provide scalable treatment of effluent to meet a desired flow processing volume or rate. This can provide for a modular system in which an installer or engineer can specify a specific number of treatment modules on, for example, a per bedroom, per volume, or per person basis. For instance, a four bedroom house may call for a system that includes four treatment modules. The central distribution unit of each of the treatment modules may be fed by a common source, and the central distribution units may be arranged in parallel or serial (or both) flow communication with each other. In some embodiments, a treatment system provided as described herein may be configured to treat liquid waste to reduce its biochemical oxygen demand (BOD), for example, by about 70% or greater, about 80% or greater, or about 90% or greater. In accordance with some embodiments, a treatment system provided as described herein may be configured to remove total suspended solids (TSS) by about 50% or greater, by about 60% or greater, or by about 70% or greater. In accordance with some embodiments, the system may increase aerobic activity by boosting the level of dissolved oxygen in the waste water being treated. In accordance with some embodiments, nitrification and/or denitrification may be performed directly within a treatment system configured as described herein. Numerous configurations and treatment capacities will be apparent in light of this disclosure.

In some instances, a treatment system provided using the disclosed techniques can be configured, for example, as: (1) a partially/completely assembled treatment system unit; and/or (2) a kit or other collection of discrete components (e.g., central distribution unit; one or more treatment fins; etc.) which may be operatively coupled as desired. It is contemplated that central distribution unit 100 may be configured to be separable, divided, or split into two or more pieces. Central distribution unit 100 may be formed as two pieces cut longitudinally in half from top to bottom, such that the two resulting clamshell pieces 730 can be nested together for storage, packaging and shipping.

Figure 61:
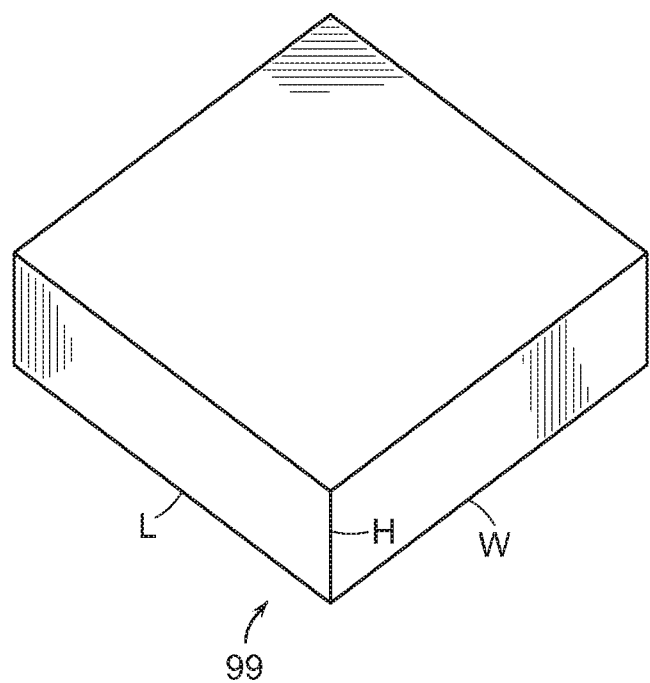
FIG. 61 is a perspective view of the closed box like that shown in FIG. 60, where the treatment module is contained within.
Figure 60:
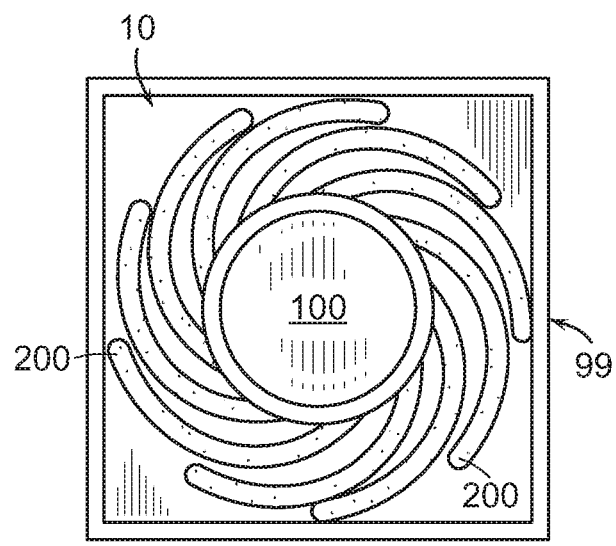
FIG. 60 is a top view of an open box containing a treatment module.

A single unit (i.e. a system designed to treat 1.5 bedrooms, or at least 225 gallons per day) could be packaged for shipment in a shipping container (mostly called "box" for brevity hereafter) configured to have a total size less which is less than 70 cubic feet, or less than 50 cubic feet, or less than 16 cubic feet. Further, a single unit (i.e. a system designed to treat 1.5 bedrooms, or at least 225 gallons per day) could be packaged in a box configured to weigh less than 100 kg, less than 80 kg, less than 60 kg, less than 40 kg, or less than 30 kg such that it may be easily shipped via a commercial over the road shipping company. Multiple treatment units could be packaged together in a box and be configured to have a total size less than 140 $ft^3$, less than 100 $ft^3$, less than 60 $ft^3$, or less than 30 $ft^3$ and weigh less than 200 kg, less than 160 kg, less than 120 kg, less than 80 kg, or less than 60 kg such that they may be easily shipped via a commercial over the road shipping company. In some embodiments, a single unit configured with treatment fins of a length of about 4 ft for treatment of at least 225 gallons may be packaged into a box of 16 $ft^3$ or less with a weight of 60 lbs or less, for example a box having dimensions of L=4 ft, W=4 ft and H=1 ft. See FIG. 61. In some embodiments, a single unit configured with treatment fins of a length of between 4 ft and 8 ft for treatment of 225 or more gallons may be packaged into a box of 50 ft$^3$ or less with a weight of 220 lbs or less. In some embodiments, the central distribution unit a whole or as separate half pieces is shipped as a unit unattached to fins and the treatment fins may be grouped as one or more units of four treatment fins, folded over to retain a compact shape during shipping as described below. With reference to FIG. 60, other embodiments comprise a box/shipping container 99 within which is treatment module 10, the fins 200 of which are wrapped in spiraling fashion around the exterior of the central distribution unit 100. As shown, multiple fins 200 are in partial touching contact with each other. For example, when the central distribution unit 100 is about 24 inch in diameter the container/box may be about 48 inch by 48 inch in width W and length L.

When the module is configured with a container as described in connection with FIG. 60, at the point of use, the module is removed from the container, the module is set upon a suitable sand or soil surface, the fins are unwrapped and extended radially or in opposing parallel rows or as the user otherwise desires, as described elsewhere herein, and the unit is backfilled. When the central unit is in separate pieces and/or the fins are not attached to the central unit, at the point of use the liquid waste treatment system module may be assembled in several steps as follow: With reference to FIGS. 51A, 51B, 52-54, 58A and 58B: In a first step, a bottom portion 760 of central distribution unit may be assembled and connected by mating a first bottom edge with a second bottom edge and using screws, tabs, connectors, caulk, or a combination thereof as described further below. At the same time the side edges of two clamshell halves 730 may be assembled and connected using screws, tabs, connectors, caulk, or a combination thereof, again, as described below. The assembled distribution unit is set on the soil surface in a desired location, where the center of the module is desired to be located.

In a next step, if the treatment fins are not already attached to the central distribution unit, the fins may be stacked on the soil surface while setting within one or more U shape plastic brackets 750, or within other supports such as grade stakes or the like, arranged between 10 and 30 inches apart. (See, for example the end view of FIG. 58C and the side view of FIG. 58D.). In a next step, zip ties 755 may be threaded through an upper zip-tie hole and a lower zip-tie hole on a plurality of treatment fins. Each set of zip ties 755 may be connected on one side, creating a pocket shaped to receive the central distribution unit with fabric overlapping into a sleeve 427. In a next step, the central distribution unit may be placed on the fabric, with the treatment fin air passages 720 oriented toward the top side of the central distribution unit (see, for example, FIG. 58E). In a next step, the remaining fabric may be wrapped over the top of the central distribution unit to cover the central distribution unit. Zip ties 755 may be connected to an upper zip-tie groove and a lower zip-tie groove to secure the treatment fins to the central distribution unit (see, for example, FIG. 58F where the upper end is nearest to the viewer). In a last step, the fins may be spread out radially with the upper sub-portion of each fin that contains a perforated pipe uppermost with respect to the soil surface. When there are multiple modules, distribution and equalization piping may be installed. A lid is placed on the top of the central distribution unit. Then sand other media is backfilled amongst the fins of each module, and around the central distribution unit, and above the whole of the module as required by regulation and for protecting the system from the weight of people, animals and vehicles traveling across the surface of the backfill.

Figure 29A:
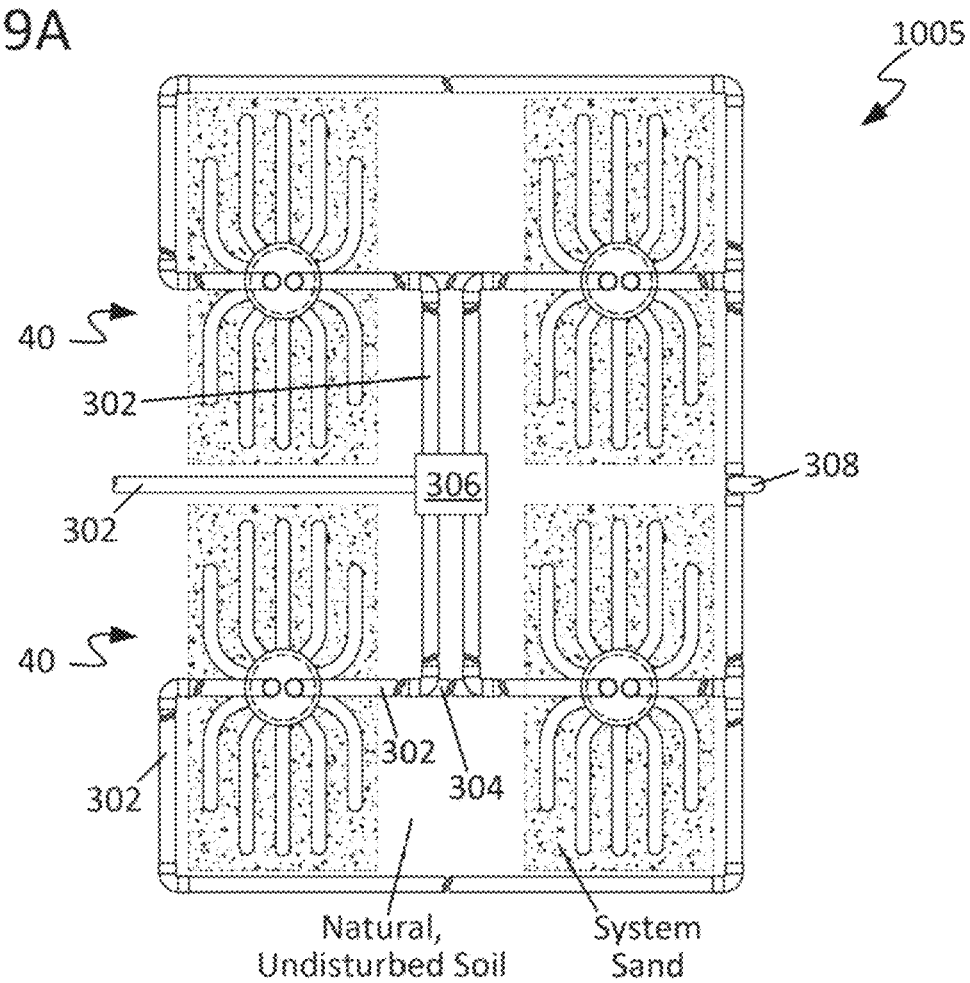
FIG. 29A is a plan view of an arrangement of rectangular treatment cells including a distribution box configured in accordance with an embodiment of the present disclosure.
Figure 29B:
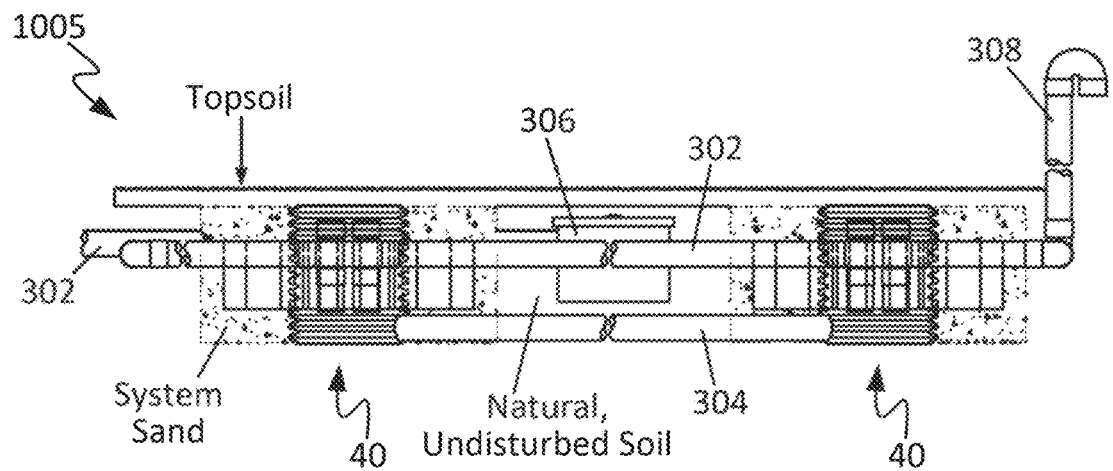
FIG. 29B is a side view of the arrangement of FIG. 29A.

It is contemplated that connection points of the liquid waste distribution unit components may be filled with a bead of elastomer or other sealant to ensure proper sealing prior to securing the components of central distribution unit 100 together with connectors, for example, screws or bolts. Central distribution unit 100 may be easily assembled using connectors 425 and alignment tabs 426 (as shown in FIG. 33, FIGS. 53-54, and FIGS. 58A-B) or the like to join the two or more pieces of the central distribution unit 100 to form a single cylinder to be used in treatment system 10. The two clamshell halves 730 may be configured to provide advantages in terms of plumbing pipe into the central distribution unit 100. Opening 115 and opening 125 may be configured to be perforated openings for connecting one or more conduits, including, for example, an equalization pipe, as shown in FIG. 29A, 29B Opening 115 and opening 125 may be popped out by applying pressure to the perforated portion during assembly of central distribution unit 100.

In accordance with some embodiments, a treatment system provided as described herein may be configured for compatibility with anaerobic processing. For instance, in an exemplary embodiment, a treatment system provided as described herein may be coupled with an anaerobic processing module such as that disclosed in U.S. Pat. No. 8,501,006, titled "Apparatus and Method for Processing Liquid Waste," the disclosure of which is herein incorporated by reference in its entirety.

As used herein, an impermeable material is one which prevents the flow of water and/or other liquids therethrough, and in some cases may be designed to retain liquid indefinitely. A semi-permeable material may be one which allows water and/or other liquids to pass therethrough after a period of retention, which may vary with the composition and structure of the material. In some instances, water and/or other liquids may pass through a semi-permeable material, but most solids may be retained thereby. An impermeable material which has been breached (e.g., needle-punched or otherwise punctured) may serve as a semi-permeable material. A permeable material may be one which allows water and/or other liquids to pass freely therethrough with minimal or no retention. Permeable materials may include pores that allow for the free flow of water and/or other liquids, while preventing the passage of some undissolved solids.

Furthermore, it should be noted that although reference is generally made herein to the use of one or more treatment fins, the present disclosure is not so limited only to the use of generally fin-like structures. In a more general sense, and in accordance with some other embodiments, a given treatment body configured as described herein to be operatively coupled with a central distribution unit, a distribution box, or other source of liquid waste can be of any desired shape, geometry, and dimensions, fin-like or otherwise, as desired for a given target application or end-use. Numerous configurations and variations will be apparent in light of this disclosure.

System Structure and Operation

FIGS. 1A-1D illustrate several views of a treatment module 10 configured in accordance with an embodiment of the present disclosure. As can be seen, treatment module 10 includes a central distribution unit 100 and one or more treatment fins 200 in flow communication therewith. In some embodiments, the treatment fins 200 of a given treatment module 10 may be arranged in line with one another (e.g., as in FIG. 1B), whereas in some other embodiments, at least a first treatment fin 200 may be vertically offset from a second treatment fin 200 by a vertical distance (ΔY) along the length of unit 100 (e.g., as in FIG. 1C). As can be seen further, treatment module 10 may include an inlet baffle 150 and an outlet baffle 160, in some embodiments. A discussion of these elements is provided below.

The central distribution unit 100 of a given treatment module 10 may have any of a wide range of configurations. For example, consider FIGS. 2A-2C, which illustrate several views of a central distribution unit 100 configured in accordance with an embodiment of the present disclosure. As can be seen here, central distribution unit 100 may be formed, in some embodiments, as a generally tubular body including a lower sump portion 110, a mid-portion 120, and an upper headspace portion 130 (each discussed below), arranged as generally shown. The sidewall 102 of central distribution unit 100 may define an interior hollow region 105, which, in some embodiments, extends through the entire length of central distribution unit 100, passing from lower end 112 to upper end 132 and thus providing a longitudinal passageway within the central distribution unit 100. In some other embodiments, however, interior hollow region 105 may pass through only a portion of the length of central distribution unit 100, partially extending, for example, from upper end 132 towards lower end 112 and thus providing a longitudinal recess within central distribution unit 100. The longitudinal passageway defines an axis, and the axis of the central distribution unit 100 may be oriented substantially (e.g., within 10 degrees) vertically or vertically when installed. In other embodiments, the axis of the central distribution unit 100 may be substantially horizontal (e.g., within 10 degrees) or horizontal, or between horizontal and vertical.

In some embodiments, central distribution unit 100 may be formed such that at least one of its lower end 112 and/or its upper end 132 is un-occluded by sidewall 102, and thus that central distribution unit 100 may be considered open-ended, at least in part. In an example case, central distribution unit 100 includes both a lower end 112 and an upper end 132 that are un-occluded by sidewall 102. In some other embodiments, however, central distribution unit 100 may be formed such that at least one of its lower end 112 and/or its upper end 132 is occluded by sidewall 102, and thus that central distribution unit 100 may be considered closed-ended, at least in part. In an example case, central distribution unit 100 includes a lower end 112 that is occluded by sidewall 102 and an upper end 132 that is un-occluded by sidewall 102. Either or both ends also may be surrounded by a material such as a covering and may be permeable, semi-permeable, or impermeable.

Figure 4A:
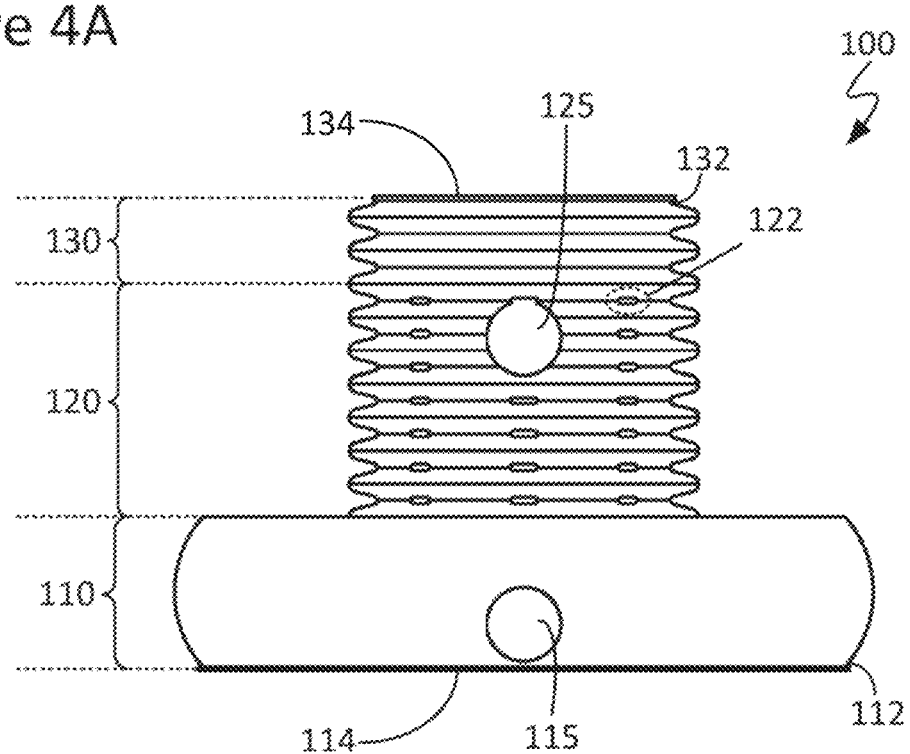
FIG. 4A is a side view of a central distribution unit configured in accordance with another embodiment of the present disclosure.
Figure 4B:
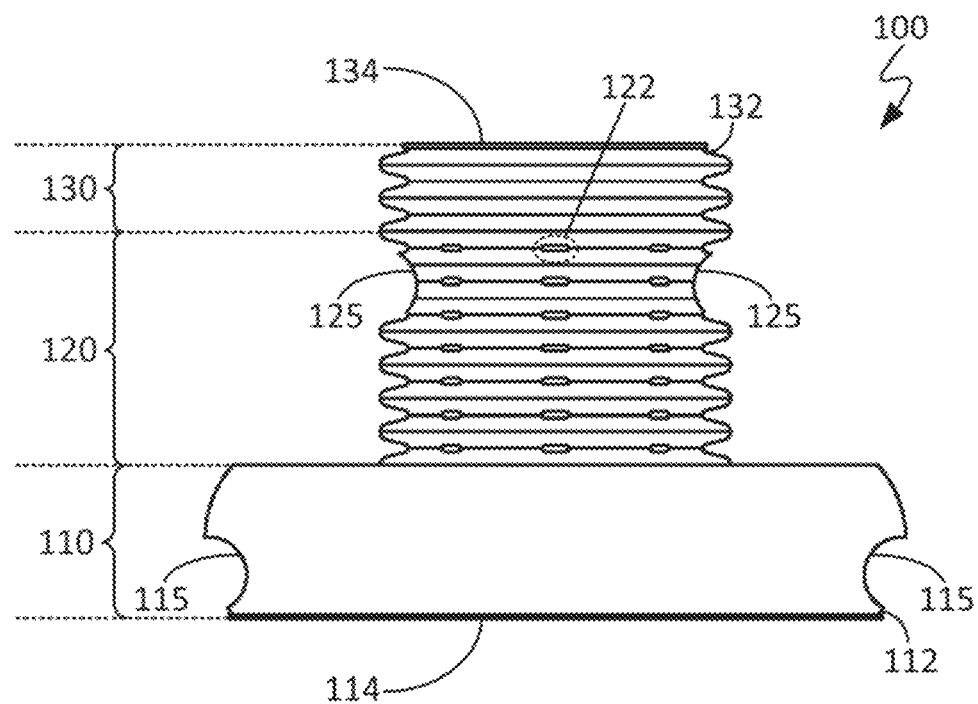
FIG. 4B is another side view of the central distribution unit of FIG. 4A.

The interior and/or the exterior of central distribution unit 100 may be corrugated, in part or in whole. Corrugations can aid with the flow of liquid, add strength, and can promote the cooling of liquid. In some embodiments, central distribution unit 100 may be corrugated along substantially its entire length (e.g., as in FIGS. 2A-2B). In some other embodiments, however, central distribution unit 100 may have one or more non-corrugated portions (e.g., such as can be seen with respect to central distribution unit 100 in FIGS. 4A-4B, discussed below). Corrugation of a given portion (e.g., sump portion 110, mid-portion 120, and/or headspace portion 130) of central distribution unit 100 may provide for additional surface area on which bacteria may grow, which in turn may facilitate treatment of liquid waste received by that unit 100, in accordance with some embodiments. Corrugations also may provide flexibility to the central distribution unit 100.

Central distribution unit 100 may be constructed from any of a wide range of materials, and in some instances may be made from a substantially rigid, non-degradable material. The material selected for a given central distribution unit 100 may be hydrophilic or hydrophobic, as desired for a given target application or end-use. Some example suitable materials from which central distribution unit 100 may be constructed include: (1) a polymer, such as polyolefins including polypropylene and polyethylene, polyolefin, polycarbonate, polyvinyl chloride (PVC), and/or acrylonitrile butadiene styrene (ABS); (2) a metal or alloy, such as copper (Cu), aluminum (Al), steel, and/or cast iron; (3) wood; (4) concrete; (5) clay; (6) glass; (7) ceramic; (8) a refractory material; and/or (9) a combination of any one or more of the aforementioned materials. Polymers may be, for example, homopolymers, copolymers, or terpolymers, and central distribution unit 100 may be formed using techniques known to those of skill in the art, such as, for example, extrusion, blow molding, injection molding or combinations thereof. In some cases, a first portion of central distribution unit 100 may be formed from a first material (or combination of materials), whereas a second portion thereof may be formed from a second, different material (or combination of materials). For instance, in an example case, central distribution unit 100 may include a concrete sump portion 110 and a mid-portion 120 and headspace portion 130 (see FIG. 4) which are formed from a polymer. In some embodiments, the central distribution unit 100 may include two or more separate portions that are joined at opening 125, so that when the two or more portions are joined, they can clamp around the proximal end of a treatment fin 200, securing it in place. The portions may be joined together by a fastener such as a locking ring, a clamp, screw, bolt, tape, hook and loop fastener, and/or heat shrink tubing sized to fit around the central distribution unit 100. Portions also may be welded together or fastened with an adhesive. A gasket or other material may be used at the interface between the portions. In another example case, central distribution unit 100 may include a steel sump portion 110 and a mid-portion 120 and headspace portion 130 which are formed from a plastic. In some cases, central distribution unit 100 may be formed from a material that may be injection molded. In some cases, the interior and/or the exterior of central distribution unit 100 may be coated, for example, with one or more coatings which promote or discourage bacterial growth, as desired. Other suitable materials for central distribution unit 100 will depend on a given application and will be apparent in light of this disclosure.

Figure 2A:
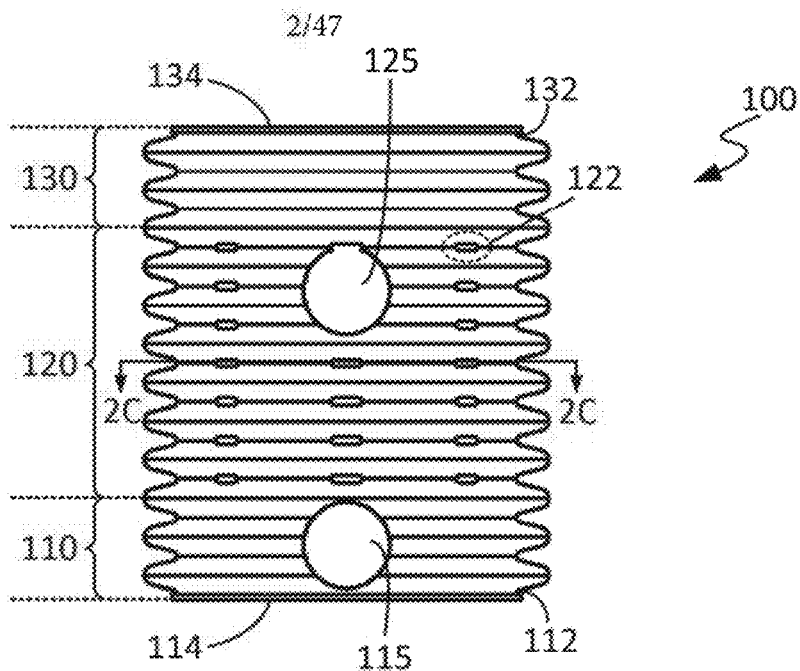
FIG. 2A is a side view of a central distribution unit configured in accordance with an embodiment of the present disclosure.
Figure 2B:
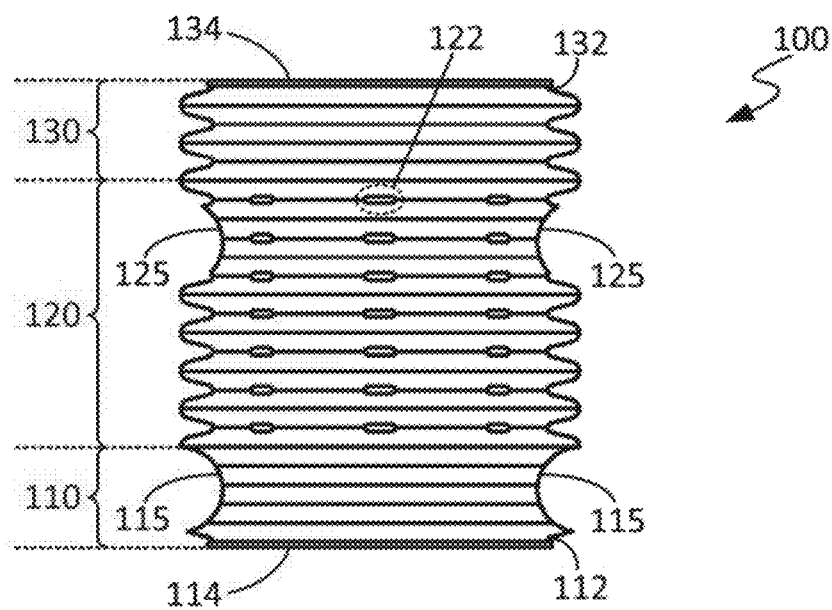
FIG. 2B is another side view of the central distribution unit of FIG. 2A.
Figure 2C:
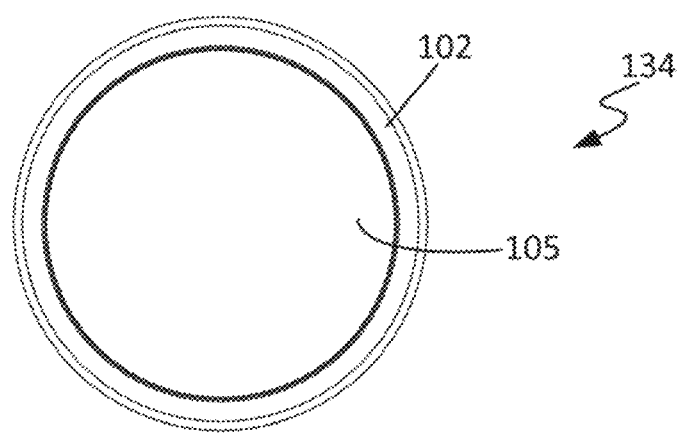
FIG. 2C is a cross-sectional view of one embodiment of the central distribution unit of FIG. 2A taken along line 2C-2C therein.
Figure 22:
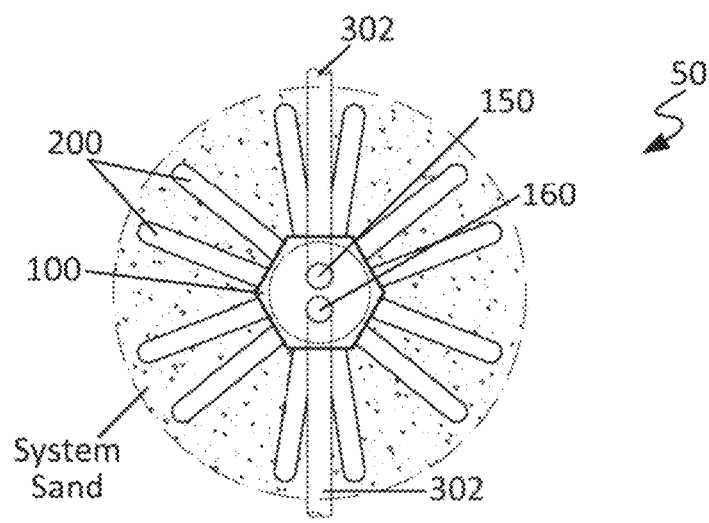
FIG. 22 is a plan view of a rounded treatment cell configured in accordance with another embodiment of the present disclosure.

In some embodiments, central distribution unit 100 may be generally cylindrical in shape, having a circular, elliptical, or other curvilinear cross-sectional profile (e.g., as in FIG. 2C). In some other embodiments, however, central distribution unit 100 may be generally prismatic in shape, having a polygonal cross-sectional profile (e.g., triangular; square/rectangular; hexagonal as in FIG. 22; octagonal; etc.). Other suitable geometries for central distribution unit 100 will depend on a given application and will be apparent in light of this disclosure.

The size of central distribution unit 100 may be customized. In some cases, the sidewall 102 may have a thickness, for example, in the range of about 0.01-8.0 inches (e.g., about 0.01-1.0 inches, about 1.0-2.5 inches, about 2.5-5.0 inches, about 5.0-8.0 inches, or any other sub-range in the range of about 0.01-8.0 inches). In some instances, the thickness of sidewall 102 may be, for example, less than 2 inches, 1 inch, 0.5 inches, or 0.25 inches. In some other cases, the sidewall 102 may have a thickness, for example, greater than or equal to about 1 inch, 2 inches, 4 inches, 8 inches, 12 inches, or 15 inches. In some cases, central distribution unit 100 may have a length, for example, in the range of about 12-120 inches (e.g., about 12-24 inches, about 24-36 inches, about 36-48 inches, about 48-60 inches, about 60-90 inches, about 90-120 inches, or any other sub-range in the range of about 12-120 inches). In some cases, central distribution unit 100 may have a height, for example, in the range of about 2-24 inches (e.g., about 2-6 inches, about 6-12 inches, about 12-18 inches, about 18-24 inches, or any other sub-range in the range of about 2-24 inches). In some cases, central distribution unit 100 may have a width/diameter, for example, in the range of about 2-48 inches (e.g., about 2-8 inches, about 8-12 inches, about 12-18 inches, about 18-24 inches, about 24-30 inches, about 30-36 inches, about 36-42 inches, about 42-48 inches, or any other sub-range in the range of about 2-48 inches). In some other cases, central distribution unit 100 may have a width/diameter, for example, greater than or equal to about 48 inches (e.g., about 54 inches or greater; about 60 inches or greater). It should be noted, however, that the present disclosure is not so limited to only these example dimensional ranges for a given central distribution unit 100, as in a more general sense, and in accordance with an embodiment, the size of central distribution unit 100 may be customized, as desired for a given target application or end-use. In some instances, central distribution unit 100 may be of substantially uniform width/diameter along its length, whereas in some other instances, central distribution unit 100 may be of a non-uniform width/diameter along its length (e.g., tapered or otherwise varied). Numerous configurations will be apparent in light of this disclosure.

Figure 2D:
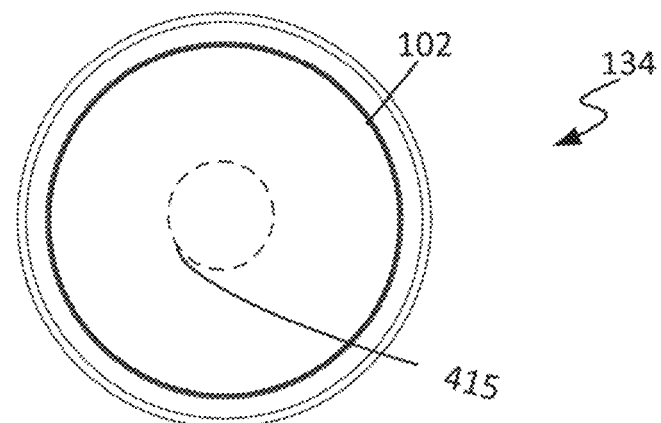
FIG. 2D is a cross-sectional view of one embodiment of the central distribution unit of FIG. 2A taken along line 2C-2C therein.
Figure 2E:
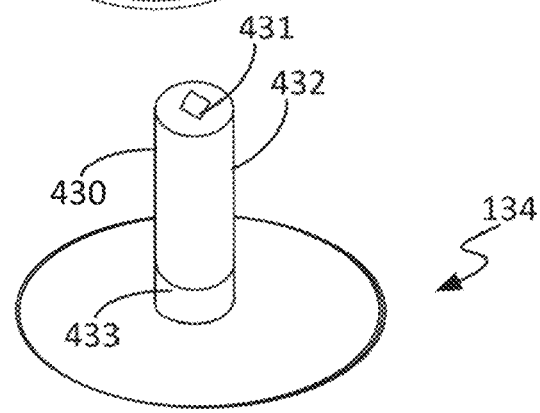
FIGS. 2E-F illustrate an example inspection port inserted into a central distribution unit cover, in accordance with one embodiment of the present disclosure.
Figure 2F:
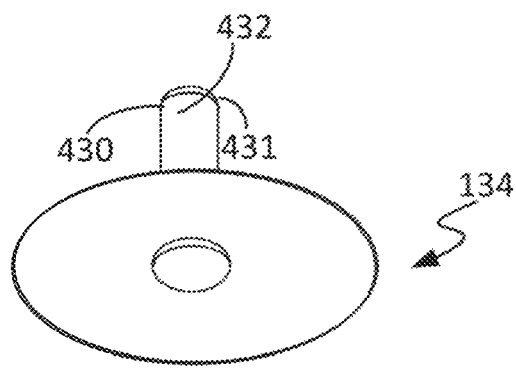
Figure 3A:
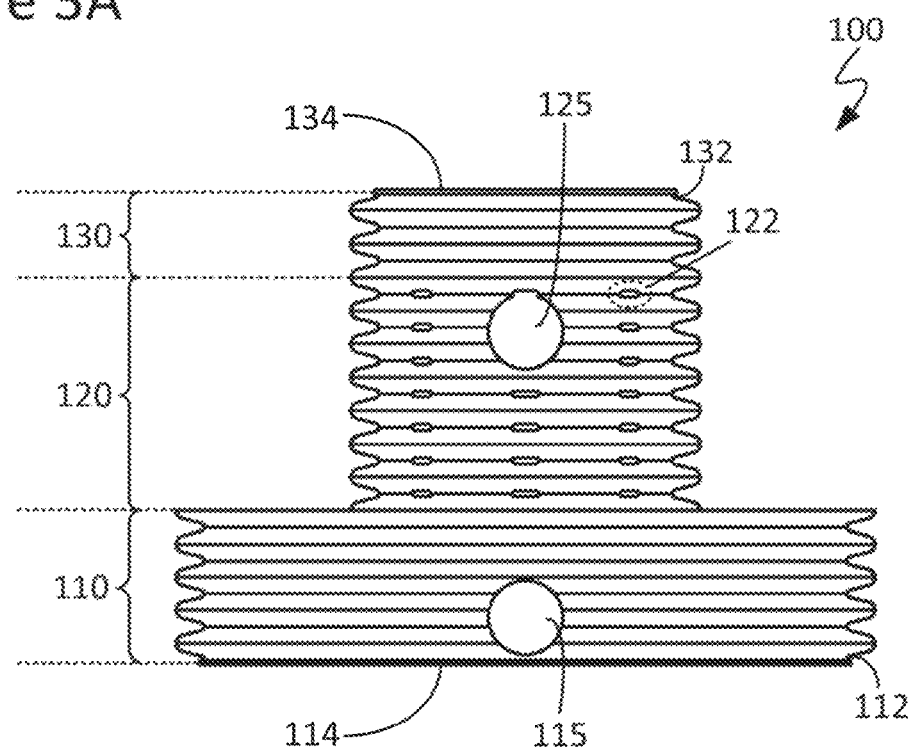
FIG. 3A is a side view of a central distribution unit configured in accordance with another embodiment of the present disclosure.
Figure 3B:
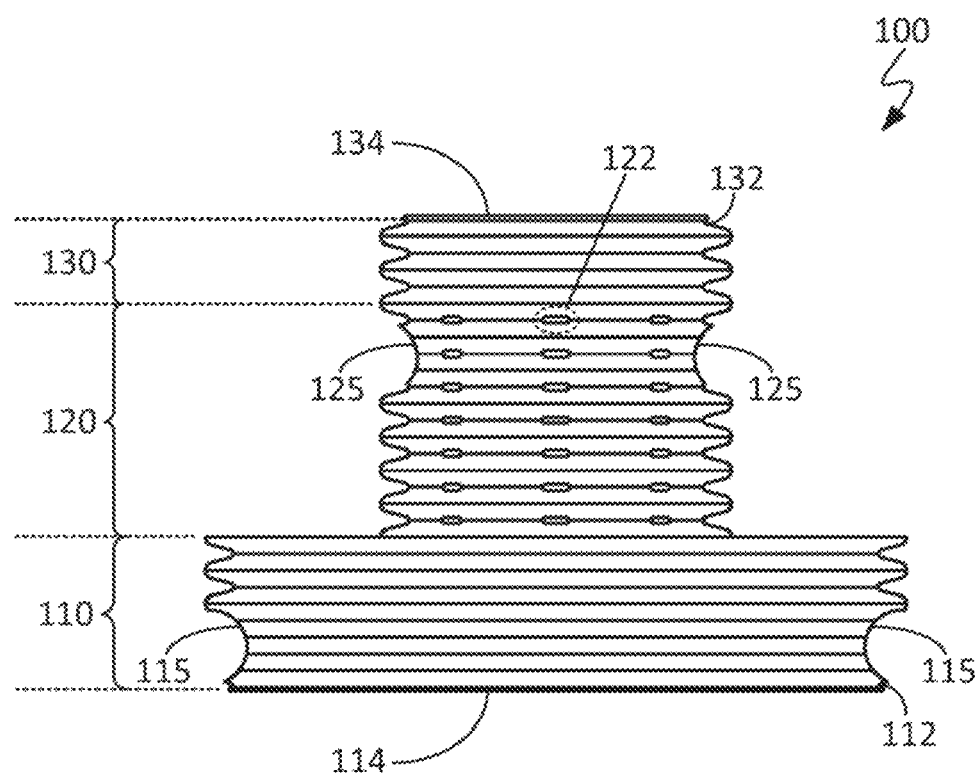
FIG. 3B is another side view of the central distribution unit of FIG. 3A.

In some instances, the lower end 112 of central distribution unit 100 optionally may be fitted with a cover 114. In accordance with an embodiment, optional cover 114 may serve to provide a liquid-tight seal that prevents or otherwise reduces leakage of liquid waste contained within central distribution unit 100 from sump portion 110 thereof. In some instances, the upper end 132 of central distribution unit 100 optionally may be fitted with a cover 134. In accordance with an embodiment, optional cover 134 may serve to: (1) provide a seal that prevents or otherwise reduces entry of foreign debris (e.g., surrounding soil, sand, etc.) into central distribution unit 100 through upper end 132; and/or (2) allow access into the interior hollow region 105 of central distribution unit 100 (e.g., for cleaning thereof). Cover 134 may be configured with one or more flanges, one or more lock tabs, or a combination thereof such that the cover is configured to be attached and detached to the central distribution unit as needed. Cover 134 may be configured to be screwed on and locked down once a flange becomes inserted in a lock tab. Optional covers 114 and 134 can be constructed from any suitable material, as will be apparent in light of this disclosure, and in some cases may be constructed from the same material(s) as central distribution unit 100, discussed above. Also, the geometry and size of optional covers 114 and 134 can be customized, as desired for a given target application or end-use, and in some embodiments may be selected so as to substantially match the geometry and size of central distribution unit 100 (e.g., at lower end 112 thereof; at upper end 132 thereof). A given optional cover 114/134 may be affixed to central distribution unit 100 in a temporary or permanent manner, using any suitable means, such as, for example: a threaded fit; a pressure fit; one or more fasteners (e.g., screws; bolts); and/or an adhesive or other sealant. In some cases, optional cover 114 may be inserted within or otherwise received by lower end 112, whereas in some other cases, it may be seated on/over lower end 112. In some cases, optional cover 134 may be inserted within or otherwise received by upper end 132, whereas in some other cases, it may be seated on/over upper end 132. In some cases, optional cover 134 may be provided with a cutout opening 415 which can serve as an inspection port 430 for examining the interior of the central distribution unit 100. FIG. 2D illustrates an example inspection port 430 in the cover 134 of central distribution unit 100. In some cases, a given inspection port 430 may be provided, in part or in whole, by a prefabricated hole cut into cover 134 of central distribution unit 100. In some other cases, a given inspection port 430 may be provided by a removable insert stamped out of cover 134 of central distribution unit 100. In some other cases, an inspection port 430 may be provided by removing (e.g., punching out) a piece of cover 134 of central distribution unit 100 defined, for example, by a perforated or indented outline 415 that provides an area of weakness in the wall that can be easily knocked out. Inspection port 430 may also be drilled or cut into cover 134 either before or after installation in the ground. Pipe 432 may be fitted into cutout 415 with a pipe coupling 433 and be provided with a threaded cap 431 for easy opening and inspection with minimal or no digging. It is contemplated that the inspection port may be capable of being closed or re-sealed following inspection (FIGS. 2E-F). It is contemplated that a portion of cover 134 may include a fitted tab for securing pipe 432 into the hole created from indented outline 415. The fitted tab may be part of cover 134 and may allow mating of a corresponding extension structure on pipe 432 such that when pipe 432 is rotated to be locked in place the corresponding extension structure mates with the fitted tab. Threaded cap 431 may be turned, loosened, and removed, to facilitate viewing inside the central distribution unit. Threaded cap 431 may be turned, tightened, and replaced following viewing to prevent any unwanted debris from entering into central distribution unit 100.

In accordance with some embodiments, the sump portion 110 of a given central distribution unit 100 may be configured, for example, to collect sludge and/or other waste solids that may settle out of the liquid waste received by central distribution unit 100. The geometry and size of sump portion 110 may be customized, and in some cases may be selected, at least in part, based on the amount of sludge/solids that it may receive in use. Thus, the dimensions of sump portion 110 may be varied to accommodate a lesser or greater volume of sludge/solids, as desired for a given target application or end-use.

In some embodiments, the width/diameter of the sump portion 110 of central distribution unit 100 may be substantially the same as the width/diameter of the mid-portion 120 and/or headspace portion 130 of that unit 100 (e.g., as in FIGS. 2A-2B). In some other embodiments, however, the width/diameter of the sump portion 110 may be larger than the width/diameter of the mid-portion 120 and/or headspace portion 130 of that unit 100. For instance, consider FIGS. 3A-3B and FIGS. 4A-4B, which illustrate views of several example central distribution units 100 configured in accordance with some embodiments of the present disclosure. In some cases, the sump portion 110 of a given central distribution unit 100 may have a width/diameter that is in the range of about 1-5× (e.g., about 1½×, about 2×, about 2½×, about 3×, about 3½×, about 4×, about 4½×, about 5×) the width/diameter of the mid-portion 120 and/or the headspace portion 130 of that unit 100. In an example case, a central distribution unit 100 may include: (1) a headspace portion 130 and a mid-portion 120 having a width/diameter of about 12 inches; and (2) a sump portion 110 having a width/diameter of about 18 inches. In another example case, a central distribution unit 100 may include: (1) a headspace portion 130 and a mid-portion 120 having a width/diameter of about 18 inches; and (2) a sump portion 110 having a width/diameter of about 36 inches. In another example case, a central distribution unit 100 may include: (1) a headspace portion 130 and a mid-portion 120 having a width/diameter of about 24 inches; and (2) a sump portion 110 having a width/diameter of about 48 inches. It should be noted, however, that the present disclosure is not so limited to only these example dimensional ranges, as in a more general sense, and in accordance with an embodiment, the size of sump portion 110 may be customized, as desired for a given target application or end-use. Numerous configurations will be apparent in light of this disclosure.

As previously discussed, the interior and/or the exterior of central distribution unit 100 may be corrugated or non-corrugated, in part or in whole, as desired. Thus, in some embodiments, sump portion 110 may be corrugated (e.g., as in FIGS. 2A-2B). In some other embodiments, however, the sump portion 110 of central distribution unit 100 may be non-corrugated (e.g., as in FIGS. 4A-4B).

In accordance with some embodiments, a given central distribution unit 100 may have one or more openings 115 formed in its sidewall 102, for example, at sump portion 110. In some cases, a given opening 115 may be provided, in part or in whole, by a prefabricated hole cut into sidewall 102 of central distribution unit 100. In some other cases, a given opening 115 may be provided by a removable insert stamped out of sidewall 102 of central distribution unit 100. In some other cases, a given opening 115 may be provided by removing (e.g., punching out) a piece of sidewall 102 of central distribution unit 100 defined, for example, by a perforated or indented outline that provides an area of weakness in the wall that can be easily punched through when desired.

In some cases, a given opening 115 may be generally curvilinear in shape (e.g., circular, elliptical, etc.). In some other cases, a given opening 115 may be generally polygonal in shape (e.g., triangular, square, rectangular, hexagonal, etc.). In some cases, a given opening 115 may have a width/diameter, for example, in the range of about 0.5-12 inches (e.g., about 0.5-3 inches, about 3-4½ inches, about 4½-6 inches, about 6-8 inches, about 8-12 inches, or any other sub-range in the range of about 0.5-12 inches). In some other cases, a given opening 115 may have a width/diameter, for example, greater than or equal to about 12 inches (e.g., about 12-18 inches or greater; about 18-24 inches or greater). It should be noted, however, that the present disclosure is not so limited to only these example geometries and dimensional ranges, as in a more general sense, and in accordance with an embodiment, the shape and size of a given opening 115 may be customized, as desired for a given target application or end-use. Numerous configurations will be apparent in light of this disclosure.

Central distribution unit 100 may be provided with any given quantity of openings 115 (e.g., one, two, three, four, or more openings 115) formed in its sidewall 102 at sump portion 110, and the arrangement of those openings 115 can be customized, as desired for a given target application or end-use. In an example case, central distribution unit 100 may have two openings 115 which substantially align (e.g., precisely align or otherwise align within a given tolerance) with one another across the breadth of sump portion 110 (e.g., in a generally linear arrangement). In another example case, however, the two openings 115 may not be directly aligned with one another (e.g., in an acute or obtuse L-shaped arrangement). In another example case, central distribution unit 100 may have three openings 115, two of which substantially align (e.g., precisely align or otherwise align within a given tolerance) with one another across the breadth of sump portion 110, and the third of which is perpendicular or otherwise offset from such alignment (e.g., in a generally T-shaped arrangement). In yet another example case, however, the three openings 115 may not be directly aligned with one another (e.g., in a generally triangular or Y-shaped arrangement). In still another example case, four openings 115 may be formed in the sidewall 102 of central distribution unit 100 (e.g., in a generally plus-shaped, cruciform, or X-shaped arrangement). It may be desirable, in some instances, to ensure that the one or more openings 115 are formed in the sidewall 102 of central distribution unit 100 so as not to inhibit any liquid-tight seal offered, for example, by sump portion 110 (e.g., whether closed-ended or by way of being sealed with an optional cover 114). In some embodiments, sump portion 110 may lack outlets and exclusively act as a collection region for sludge, fats, oils, greases, and/or other waste solids that may settle out of the liquid waste received by central distribution unit 100. In some embodiments, sump portion 110 may collect a biomat and encourage bacterial digestion, aerobic activity, or treatment of effluent. Ridges may be included in sump portion 110 to further facilitate collection of sludge, fats, oils, greases, and/or other waste solids in sump portion 110. Numerous configurations for opening(s) 115 will be apparent in light of this disclosure.

In accordance with some embodiments, a given opening 115 may be configured to receive or otherwise be coupled with a pipe 304 (e.g., as in FIG. 24B, discussed below) so as to provide for flow communication with the interior hollow region 105 of central distribution unit 100 (e.g., at sump portion 110). To that end, a given opening 115 may be configured to interface with a pipe 304 using any standard and/or custom pipe fitting connection, such as, for example: (1) a friction-fit connection; (2) a flanged connection; (3) a threaded connection; (4) a retainer-and-tab connection; (5) a bayonet-type connection; (6) a snap-fit connection; and/or (7) a combination of any one or more thereof. In some cases, a given opening 115 may include a fitting that is molded into sidewall 102, whereas in some other cases, a given opening 115 may include a fitting that is inserted or otherwise disposed therein. Retention of a pipe 304 by a given opening 115 may be aided, for example, by an adhesive (e.g., glue; cement), welding (e.g., heat weld; ultrasonic weld), and/or pressure/friction fit, in accordance with some embodiments. In some cases, a given opening 115 may be configured, for example, to receive and retain a threaded fitting on a pipe 304 even if that opening 115 is not correspondingly threaded. Other suitable configurations for interfacing with the one or more openings 115 of a given central distribution unit 100 will depend on a given application and will be apparent in light of this disclosure.

In some cases, a given opening 115 may be configured to interface with a pipe 304 in a liquid-tight sealing relationship. To this end, a given opening 115 may include, in accordance with some embodiments, an O-ring, grommet, rubber sleeve, clamshell sealer, or other suitable gasket configured to prevent or otherwise reduce leakage of the liquid waste contained within central distribution unit 100 from the interface of a given opening 115 with pipe 304. It should be noted, however, that a liquid-tight sealing relationship is not required, as a given opening 115 and pipe 304 may be configured, in accordance with some other embodiments, to couple in a secure or permanent but not necessarily liquid-tight manner.

In accordance with some embodiments, the mid-portion 120 of a given central distribution unit 100 may be configured, for example, to allow liquid waste to flow into and/or out of that unit 100. To that end, the mid-portion 120 may have one or more apertures 122 (e.g., holes, perforations, elongate slots, or other orifices) defined in its sidewall 102 at mid-portion 120. A given aperture 122 may traverse the full thickness of sidewall 102, providing a fluid passageway from interior hollow region 105, through sidewall 102, and out of unit 100. In accordance with some embodiments, liquid waste that has accumulated to a given target liquid level within interior hollow region 105 may flow through sidewall 102 via the one or more apertures 122 at mid-portion 120 and out of unit 100 (e.g., into one or more treatment fins 200 in flow communication therewith, as discussed below).

In some cases, a given aperture 122 may be generally curvilinear in shape (e.g., circular, elliptical, etc.). In some other cases, a given aperture 122 may be generally polygonal in shape (e.g., triangular, square, rectangular, hexagonal, etc.). In some cases, a given aperture 122 may have a width/diameter, for example, in the range of about 0.01-6 inches (e.g., about 0.01-0.25 inches, about 0.25-0.5 inches, about 0.5-0.75 inches, about 0.75-1.0 inches, about 1.0-2.5 inches, about 2.5-6 inches, or any other sub-range in the range of about 0.01-6 inches). In some cases, a given aperture 122 may have a length, for example, in the range of about 0.1-10.0 inches (e.g., about 0.1-2.5 inches, about 2.5-5.0 inches, about 5.0-7.5 inches, about 7.5-10.0 inches, or any other sub-range in the range of about 0.1-10.0 inches. It should be noted that the apertures 122 of central distribution unit 100 are not all required to be of uniform geometry, size, or type, and further that the present disclosure is not so limited to only these example geometries and dimensional ranges, as in a more general sense, and in accordance with an embodiment, the shape and size of a given aperture 122 may be customized, as desired for a given target application or end-use. Numerous configurations will be apparent in light of this disclosure.

In some instances, a plurality of apertures 122 may be randomly distributed across the mid-portion 120 of a given central distribution unit 100. In some other instances, a plurality of apertures 122 may be regularly or semi-regularly distributed across mid-portion 120. For instance, in an example case, the apertures 122 of mid-portion 120 may be substantially vertically aligned (e.g., precisely vertically aligned or otherwise vertically aligned within a given tolerance). In another example case, the apertures 122 of mid-portion 120 may be substantially horizontally aligned (e.g., precisely horizontally aligned or otherwise horizontally aligned within a given tolerance).

The geometry and size of mid-portion 120 can be customized, and in some cases may be selected, at least in part, based on the amount of liquid waste that is to pass therethrough during use. Thus, the dimensions of mid-portion 120 may be varied to accommodate a lesser or greater flow of liquid waste, as desired for a given target application or end-use. In some embodiments, the width/diameter of the mid-portion 120 of central distribution unit 100 may be substantially the same as the width/diameter of the sump portion 110 and/or headspace portion 130 of that unit 100 (e.g., as in FIGS. 2A-2B). In some other embodiments, however, the width/diameter of the mid-portion 120 may be smaller than the width/diameter of the sump portion 110 and/or headspace portion 130 of that unit 100 (e.g., as in FIGS. 3A-3B). In an example case, a central distribution unit 100 may include: (1) a headspace portion 130 and a mid-portion 120 having a width/diameter of about 12 inches; and (2) a sump portion 110 having a width/diameter of about 18 inches. In another example case, a central distribution unit 100 may include a headspace portion 130, a mid-portion 120, and a sump portion 110 each having a width/diameter of about 18 inches. In another example case, a central distribution unit 100 may include a headspace portion 130, a mid-portion 120, and a sump portion 110 each having a width/diameter of about 24 inches. It should be noted, however, that the present disclosure is not so limited to only these example dimensional ranges, as in a more general sense, and in accordance with an embodiment, the size of mid-portion 120 may be customized, as desired for a given target application or end-use. Numerous configurations will be apparent in light of this disclosure.

As previously discussed, the interior and/or the exterior of central distribution unit 100 may be corrugated or non-corrugated, in part or in whole, as desired. Thus, in some embodiments, mid-portion 120 may be corrugated (e.g., as in FIGS. 2A-2B). In some other embodiments, however, mid-portion 120 may be non-corrugated.

In accordance with some embodiments, a given central distribution unit 100 may have one or more openings 125 formed in its sidewall 102, for example, at mid-portion 120. As will be appreciated in light of this disclosure, a given opening 125 may be provided using any of the example techniques discussed above, for instance, with respect to forming opening(s) 115 in sidewall 102. As will be further appreciated, the geometry, size, quantity, and arrangement of opening(s) 125 may be customized, as desired for a given target application or end-use, and in some cases may be selected from any of the example geometries, sizes, quantities, and arrangements discussed above, for instance, with respect to opening(s) 115. In accordance with some embodiments, the location of a given opening 125 in sidewall 102 may be selected, at least in part, so as to permit liquid waste to accumulate within the interior hollow region 105 of unit 100 to a given target liquid level, at which point at least a portion of the liquid waste begins to flow out of unit 100 through that opening 125 (e.g., via an associated inlet baffle 150 or outlet baffle 160, as discussed below). Numerous configurations for opening(s) 125 will be apparent in light of this disclosure.

In accordance with some embodiments, a given opening 125 may be configured to receive or otherwise be coupled with a pipe 302 (e.g., as in FIG. 24B, discussed below) so as to provide for flow communication with the interior hollow region 105 of central distribution unit 100 (e.g., at mid-portion 120). To that end, a given opening 125 may be configured to interface with a pipe 302 using any standard and/or custom pipe fitting connection, including the example interfacing configurations discussed above, for instance, with respect to opening(s) 115. In some cases, a given opening 125 may be configured to interface with a pipe 302 in a liquid-tight sealing relationship using any of the example configurations discussed above, for instance, with respect to providing liquid-tight opening(s) 115. It should be noted, however, that a liquid-tight sealing relationship is not required, as a given opening 125 and pipe 302 may be configured, in accordance with some other embodiments, to couple in a secure but not necessarily liquid-tight manner.

In accordance with some embodiments, the headspace portion 130 of a given central distribution unit 100 may be configured, for example, to collect gases produced by liquid waste contained within that unit 100. The geometry and size of headspace portion 130 may be customized, and in some cases may be selected, at least in part, based on the volume of gas that may accumulate within central distribution unit 100 in use. Thus, the dimensions of headspace portion 130 may be varied to accommodate a lesser or greater gaseous volume, as desired for a given target application or end-use. In some embodiments, the width/diameter of the headspace portion 130 of central distribution unit 100 may be substantially the same as the width/diameter of the sump portion 110 and/or mid-portion 120 of that unit 100 (e.g., as in FIGS. 2A-2B). In some other embodiments, however, the width/diameter of the headspace portion 130 may be smaller than the width/diameter of the sump portion 110 and/or mid-portion 120 of that unit 100 (e.g., as in FIGS. 3A-3B). In an example case, a central distribution unit 100 may include: (1) a headspace portion 130 and a mid-portion 120 having a width/diameter of about 12 inches; and (2) a sump portion 110 having a width/diameter of about 18 inches. In another example case, a central distribution unit 100 may include a headspace portion 130, a mid-portion 120, and a sump portion 110 each having a width/diameter of about 18 inches. In another example case, a central distribution unit 100 may include a headspace portion 130, a mid-portion 120, and a sump portion 110 each having a width/diameter of about 24 inches. It should be noted, however, that the present disclosure is not so limited to only these example dimensional ranges, as in a more general sense, and in accordance with an embodiment, the size of headspace portion 130 may be customized, as desired for a given target application or end-use. Numerous configurations will be apparent in light of this disclosure.

As previously discussed, the interior and/or the exterior of central distribution unit 100 may be corrugated or non-corrugated, in part or in whole, as desired. Thus, in some embodiments, headspace portion 130 may be corrugated (e.g., as in FIGS. 2A-2B). In some other embodiments, however, headspace portion 130 may be non-corrugated.

As previously noted, central distribution unit 100 may include an inlet baffle 150 and/or an outlet baffle 160, in accordance with some embodiments. Inlet baffle 150 and outlet baffle 160 can be configured as typically done. As can be seen from FIGS. 1A-1D, inlet baffle 150 may be disposed within the interior hollow region 105 of central distribution unit 100 so as to substantially align (e.g., precisely align or otherwise align within a given tolerance) with an opening 125 (e.g., at mid-portion 120), in accordance with an embodiment. As can be seen further, outlet baffle 160 may be disposed within the interior hollow region 105 of central distribution unit 100 so as to substantially align (e.g., precisely align or otherwise align within a given tolerance) with another opening 125 (e.g., at mid-portion 120), in accordance with an embodiment.

Inclusion of an inlet baffle 150 and/or an outlet baffle 160 within a given central distribution unit 100 may allow for any of a wide range of connections for flow communication into and/or out of central distribution unit 100. For example, in some cases, a pipe 302 may be coupled with inlet baffle 150 and with an upstream source of liquid waste (e.g., a septic tank; a distribution box; an upstream treatment module 10), thereby allowing liquid waste to flow from that source, through pipe 302, and into central distribution unit 100 via inlet baffle 150. In some cases, a pipe 302 may be coupled with outlet baffle 160 and, for example, with another treatment module 10 downstream, thereby allowing liquid waste to flow from a first central distribution unit 100 of a first treatment module 10, through pipe 302, and into a second, downstream central distribution unit 100 of a second, downstream treatment modules 400. The flow of liquid waste into and/or out of a given central distribution unit 100 may be provided, in part or in whole, by gravity feed, pumping, and/or vacuum draw, in accordance with some embodiments. In some embodiments, the second downstream treatment module 400 may treat effluent which flows directly from a septic tank. In some embodiments, the second downstream treatment module 400 may be configured without treatment fins. See FIGS. 35, 39 to 43, for example.

In some embodiments, central distribution unit 100 may be configured as a second, downstream treatment module 400 that is designed for denitrification. Denitrification can include processes using cellulose, such as wood chips. A wood chip denitrification treatment module may comprise a liner 411 placed inside a central distribution unit 100 with wood chips added to the central cavity. In some embodiments, denitrification can include processes using a mixture of wood chips and charcoal. In some embodiments, the liner 411 may be an impermeable liner. Holes may be added through both the liner 411 and central distribution unit 100, or through the central distribution unit 100 only, to permit liquid communication between treatment modules.

Figure 42:
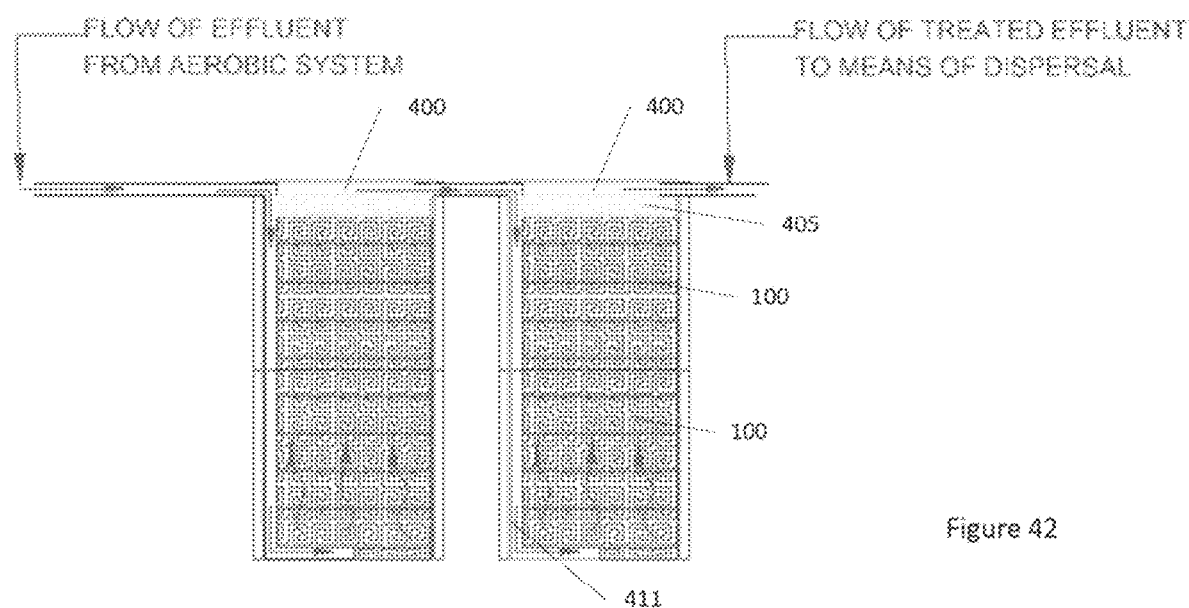
FIG. 42 illustrates a side view of an example embodiment of the present disclosure showing a stacked arrangement of a set of secondary, downstream treatment modules.

In some embodiments, central distribution unit 100 may be configured as a second, downstream treatment module 400 that is designed for zeolite polishing. Zeolite polishing involves passing liquid waste over a molecular sieve that binds molecules to a carbon source. In some embodiments, the second, downstream treatment module 400 may treat liquid waste under anaerobic conditions. In some embodiments, the second, downstream treatment module 400 may treat liquid waste under aerobic conditions. In some embodiments, the second, downstream treatment module 400 is configured to encourage sulfur and phosphorous removal. In some embodiments, the second, downstream treatment module 400 includes the use of materials such as zeolite and/or elemental sulfur. In some embodiments, the second, downstream treatment module 400 may include one or more of zeolite (e.g., clinoptilolite, phillipsite, mordenite, erionite), sulfur, iron laden sand and wood chips or other carbon source. In some embodiments, the second, downstream treatment module 400 may be configured for treatment of *E. coli* and/or disinfection. In some embodiments, the second, downstream treatment module 400 performs a denitrification function to decrease the amount of nitrogen contained in effluent through chemical reaction and aids in phosphorous removal. In some embodiments, nitrogen may be removed via adsorption or chemical reaction, and the process need not use bacteria such as nitrobacteria. In some embodiments, the second, downstream treatment module 400 does not include high surface synthetic biological support material such as random fibers. In some embodiments, nitrogen and phosphorus reduced water is discharged from the top of the system. The second, downstream treatment module 400 may be located in ground or above ground. The second, downstream treatment module 400 may be connected in series and may be in series with septic treatment systems. The second, downstream treatment module 400 may or may not include a layer of sand 405 at the upper surface, as shown in FIG. 42. In some embodiments, the layer of sand 405 may be about 3" in depth.

In some embodiments, it is contemplated that two, three, four, five, six, or seven or more second, downstream treatment modules 400 may be connected in parallel or in series. In one embodiment, five wood chip denitrification treatment modules may be plumbed in series with a single zeolite polishing treatment module at the end. In some embodiments, a single, larger treatment module may provide the same TSS and BOD removal as several smaller treatment modules. In some embodiments, liquid waste may first pass through an aerobic treatment module, second through an anaerobic treatment module, and third through an aerobic treatment module. In some embodiments, the final aerobic treatment module may include releasing fluids (i.e. gases and/or liquids) into the air via a spray dispersal system.

FIGS. 34-36 and FIGS. 38-41 illustrate embodiments including a first set of treatment modules including radially extending treatment fins as well as a set of secondary, downstream treatment modules 400 that do not include treatment fins. The first set of treatment modules may be under aerobic conditions to digest and process the waste. In some embodiments, a flow diverter 407 may be used to change the direction of flow between a first treatment module and a second, downstream treatment module. In some embodiments, effluent may be treated by a ultraviolet light or ultraviolet radiation unit 408 following treatment with the second, downstream treatment module.

Figure 34:
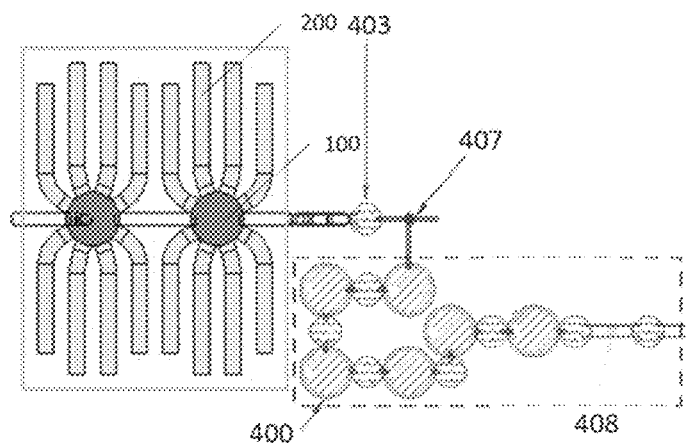
FIG. 34 illustrates a bird's eye view of an example embodiment of the present disclosure wherein a set of secondary, downstream treatment modules follow treatment with a set of first treatment modules.

In FIG. 34, a set of two serially connected first treatment modules are shown followed by a series of sampling ports 403 intermingled with a set of six second, downstream treatment modules 400 positioned in series along a non-linear pathway.

Figure 35:
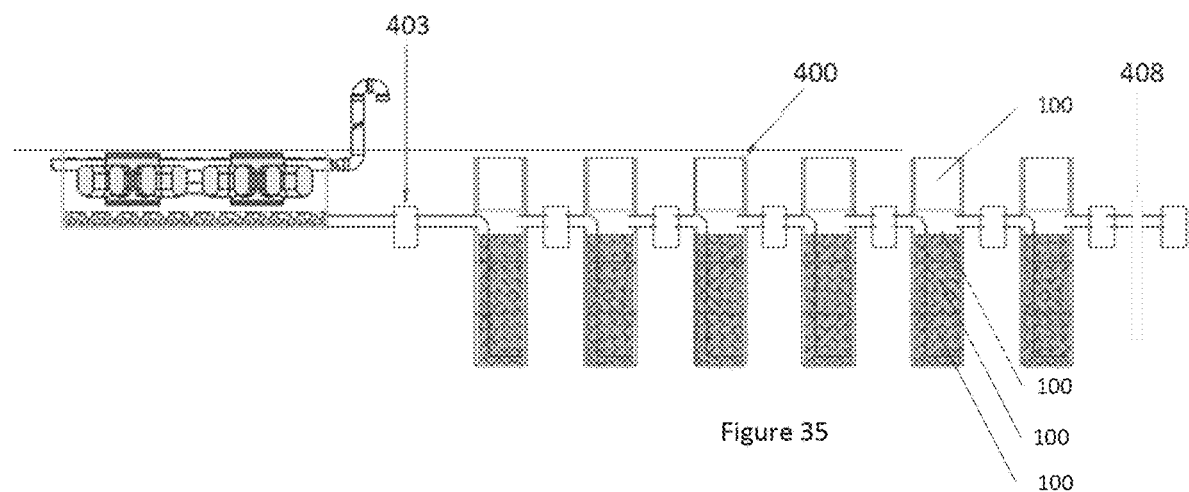
FIG. 35 illustrates a side view of an example embodiment of the present disclosure wherein a set of secondary, downstream treatment modules follow treatment with a set of first treatment modules.

In FIG. 35, a set of two serially connected first treatment modules are shown followed by a series of sampling ports 403 positioned in series alternating with a set of six second, downstream modules 400 positioned in series along a linear pathway. Each of the second, downstream treatment modules 400 is shown as a stacked arrangement of four central distribution units 100. It is contemplated that the second, downstream treatment modules 400 may be a single central distribution unit 100 or a stacked arrangement of two, three, four, five, or six central distribution units 100, in some embodiments. Some central distribution units 100 may act as risers and may be devoid of treatment material, treatment fins, skimmer tabs, perforations or air passages. Some central distribution units 100 may be functional and used for treatment of effluent.

Figure 36:
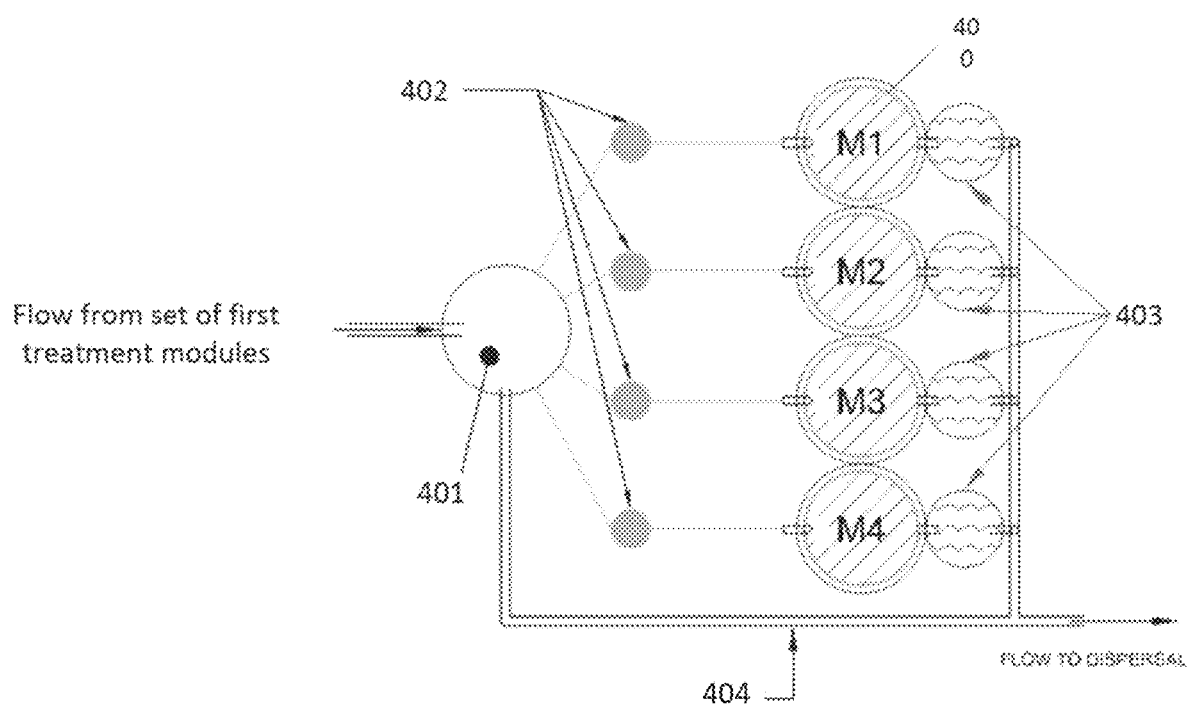
FIG. 36 illustrates a bird's eye view of an example embodiment of the present disclosure wherein a holding tank 401 stores effluent from a first treatment module before entering a pump for dispersal into a set of secondary, downstream treatment modules.
Figure 37:
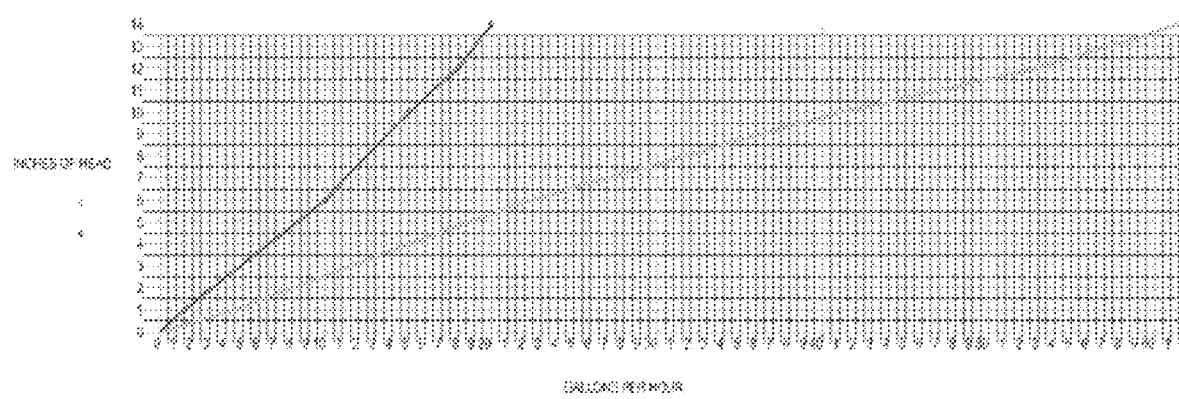
FIG. 37 illustrates a graphical representation of one example embodiment of the present disclosure wherein gallons of flow per hour is plotted against inches of head.

In FIG. 36, a holding tank 401 and a set of four pumps 402 are positioned between the set of first treatment modules and the set of four second, downstream treatment modules 400 to distribute the effluent in a controlled fashion. The holding tank 401 and/or the one or more pumps 402 may provide remote control of gallons per day or gallons per hour flow through individual secondary, downstream treatment modules 400. The one or more pumps 402 may be set on a timer. The one or more pumps 402 may be set on a timer that is set to control the flow to be 1.4 gallons per minute, for example. In some embodiments, effluent may travel via a bypass 404 to dispersal and circumvent the set of second, downstream treatment modules 400.

Figure 38:
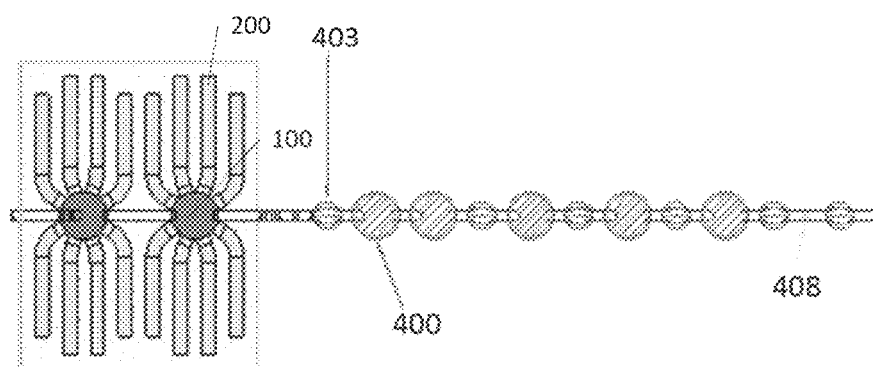
FIG. 38 illustrates a bird's eye view of an example embodiment of the present disclosure wherein a set of secondary, downstream treatment modules follow treatment with a set of first treatment modules.
Figure 39:
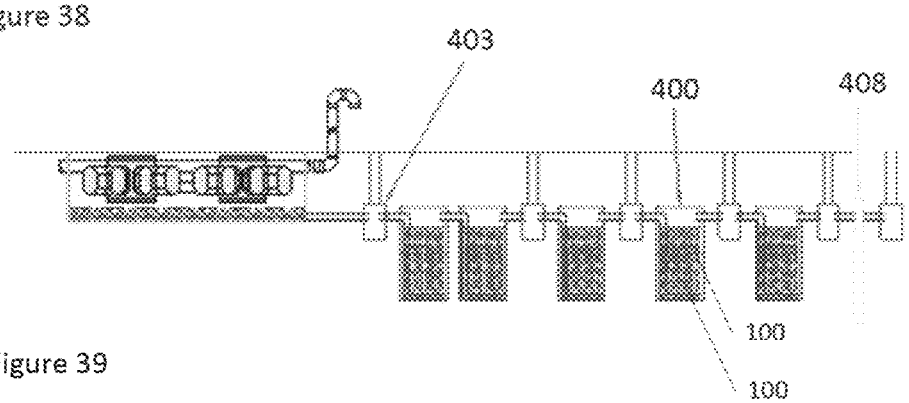
FIG. 39 illustrates a side view of an example embodiment of the present disclosure wherein a set of secondary, downstream treatment modules follow treatment with a set of first treatment modules.
Figure 40:
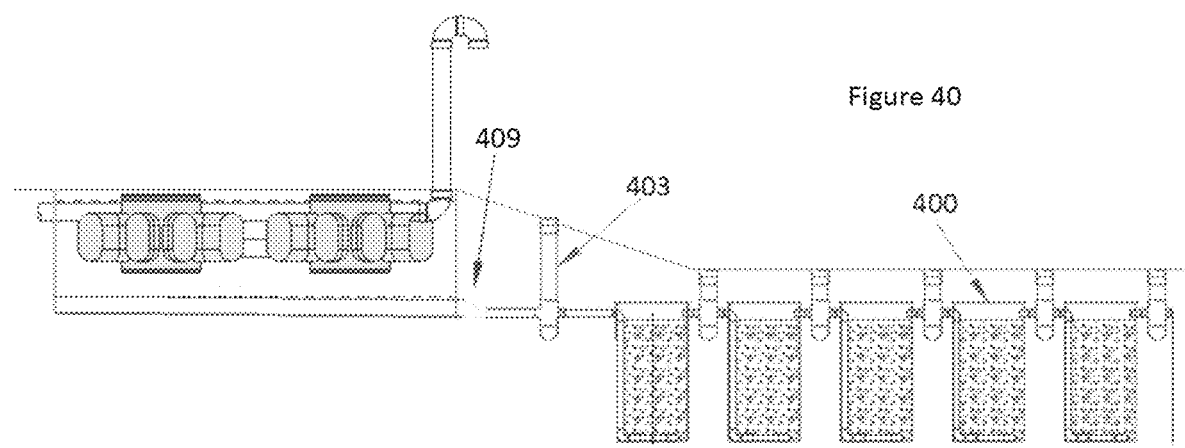
FIG. 40 illustrates a side view of an example embodiment of the present disclosure wherein a set of secondary, downstream treatment modules follow treatment with a set of first treatment modules.

In FIGS. 38-40, a set of two serially connected first treatment modules are shown followed by a series of sampling ports 403 intermingled with a set of five second, downstream treatment modules 400 positioned in series along a linear pathway. FIG. 39 shows each of the second, downstream treatment modules 400 as a stacked arrangement of two central distribution units 100. FIG. 40 shows flow from the set of first treatment modules through a layer of mixed materials positioned below the first treatment modules, into a flow reducer 409. In some embodiments, the modular liquid waste treatment system as shown in FIG. 40, may span a horizontal distance from end to end of between about 20 feet and about 25 feet. In some embodiments, the horizontal distance of one embodiment of the first treatment module may span between about 5 and about 10 feet. In some embodiments, the horizontal distance of the second, downstream treatment module may span between about 10 feet and about 20 feet.

Figure 41:
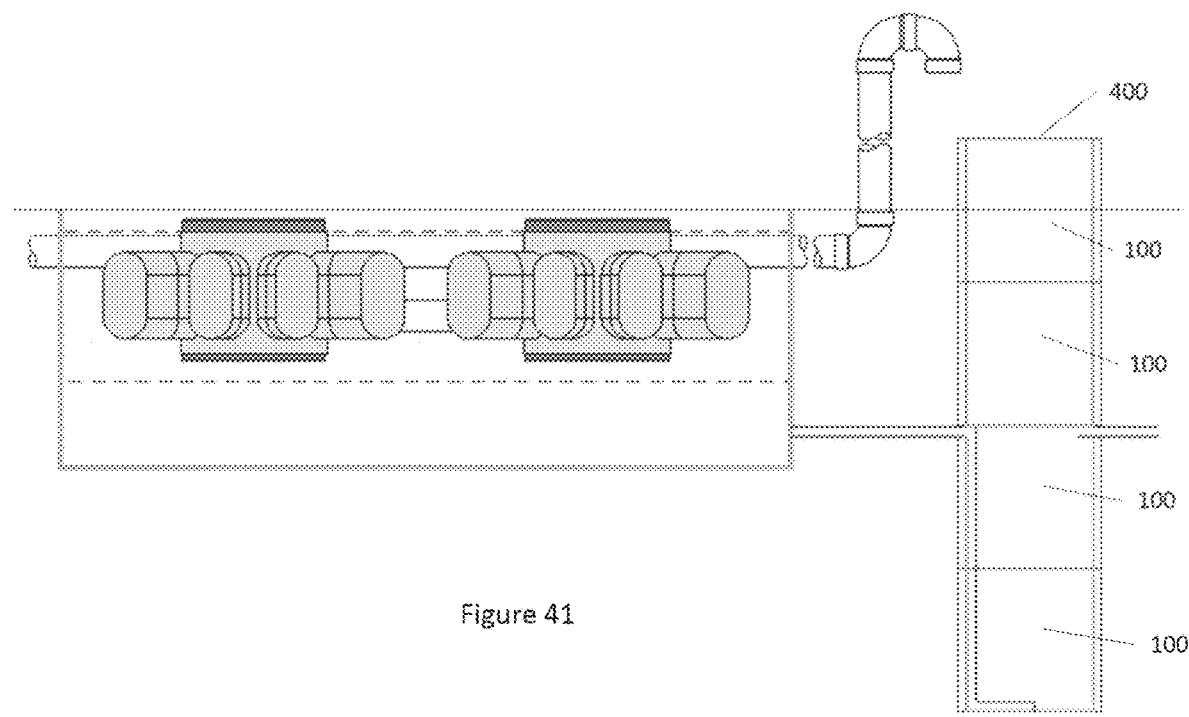
FIG. 41 illustrates a side view of an example embodiment of the present disclosure wherein a set of stacked secondary, downstream treatment modules follow treatment with a set of first treatment modules.

In FIG. 41, a set of two serially connected first treatment modules are shown followed by a single second, downstream treatment module 400. The second, downstream treatment module 400 is shown in a stacked arrangement of four individual central distribution units 100 stacked one on top of the next.

Figure 43:
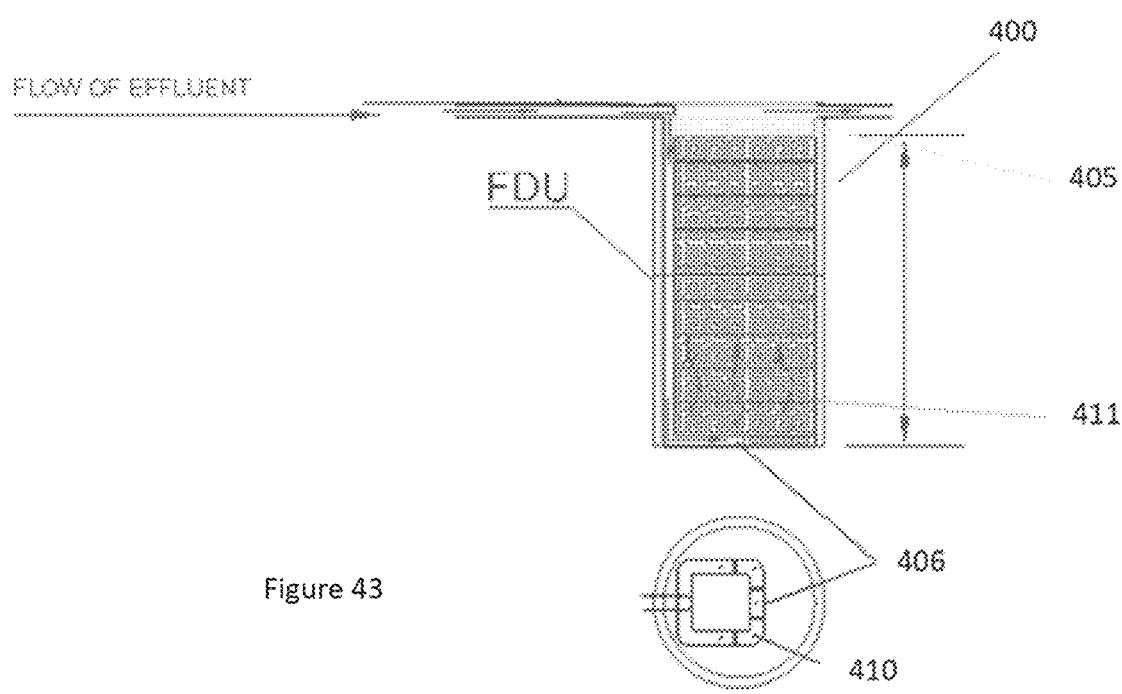
FIG. 43 illustrates a side view of an example embodiment of the present disclosure showing a stacked arrangement of a single secondary, downstream treatment module.

FIGS. 42 and 43 illustrate embodiments utilizing a pair and a single second, downstream treatment module 400, respectively. In some embodiments, effluent may flow in from an aerobic treatment system and may disperse into the environment following treatment.

FIG. 42 shows a close up view of a set of two stacked downstream treatment modules 400. Flow first enters from a first treatment module and flows via a vertical pipe, which may be close to the soil surface, down to a bottom portion of the second, downstream treatment module 400. Effluent may disperse upwards into a bed of material for denitrification and/or phosphorous removal of the effluent. As shown in FIG. 43, in some embodiments, the upward flow may occur through holes 410 in a looped pipe 406 located underneath the bed of materials contained in central distribution unit 100. In some embodiments, the looped pipe 406 may have holes 410 that are approximately 0.5 inches in diameter. In some embodiments, the looped pipe 406 may be looped in a square shape, a circular shape, or other geometrical configuration. In some embodiments, an inside diameter of an individual second, downstream treatment module 400 may be between about 6 inches and about 2 feet, and an outside diameter may be between about 6 inches and about 2 feet. In some embodiments, a height of a second, downstream treatment module may be between about 1 foot and about 4 feet for two stacked central distribution units 100. The height of woodchip or zeolite material contained in the second, downstream treatment module 400 may be between about 2 feet and about 4 feet. A layer of sand 405 may add additional height of between about 2 inches and about 8 inches to the system.

Figure 44:
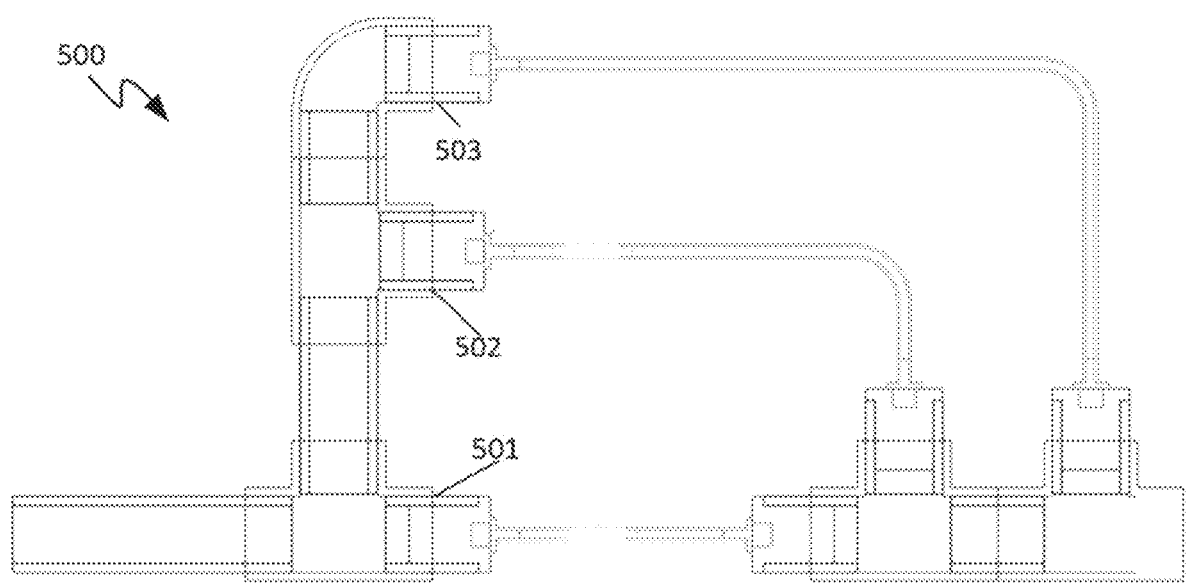
FIG. 44 illustrates an example flow regulator, in one embodiment of the present disclosure.

FIG. 44 illustrates a side view of an example flow regulator 500 which is configured to control flow between units, in some embodiments of the disclosure. Flow regulator 500 may comprise a flow valve, a pressure sensor, and an output pressure sensor. In the illustrated embodiment, flow regulator 500 comprises a first level flow regulator 501, a second level flow regulator 502, and a third level flow regulator 503 which are all configured to control a rate of flow of effluent through the system. First level flow regulator 501 and second level flow regulator 502 may have the same orifice size but may be positioned at different vertical heights. Third level flow regulator 503 may be configured with a larger orifice size as an additional bypass and may be positioned at a higher vertical position than first level flow regulator 501 and second level flow regulator 502. Flow regulator 500 is designed to limit water flow such that the rate of flow does not disturb the resident time. In other words, flow regulator 500 is designed to maximize treatment in a given treatment module. If a backup occurs, effluent may backup into pipes and flow regulator 501 may be implemented to reintroduce effluent to the treatment module at a rate of flow that would not cause further backup.

Following treatment by the set of first treatment modules and the set of second, downstream treatment modules 400, effluent may disperse back into the ground, and gas byproducts associated with treatment may be sprayed into the air, may be released via a vent into the air, or may exit by other alternative means.

In some cases, such as when a given treatment module 10 is the last in a series of treatment modules 10 or when it is the only treatment module 10 present, a pipe 302 may be coupled, for example, with outlet baffle 160 and with a vent stack 308, thereby allowing: (1) air from the surrounding environment to flow into central distribution unit 100 (e.g., to aid in aerobic processing of liquid waste contained therein); and/or (2) gases produced during treatment of the liquid waste to vent from the interior of central distribution unit 100 to the atmosphere. Vent stack 308 also may provide a path of gaseous communication between the atmosphere at the end of the system and the atmosphere at a gaseous waste vent in the structure being serviced. Vent stack 308 may be configured as typically done. It is contemplated that passive vent equalization may be achieved via the vent stack 308 and pipe 302. Pipe 302 may be configured as a vent equalization pipe allowing air and oxygen flow between each central distribution unit in a series of central distribution units 100 such that fresh oxygen can enter each central distribution unit 100 via an air inlet vent 420 (or low vent) and encourage aerobic bacterial digestion. Any off gas can be released at an outlet vent, or via vent stack 308 (or high vent). In some embodiments, pipe 302 may be a vent EQ or vent equalization pipe. It is contemplated that air inlet vent may be placed at a higher elevation, such as on a roof top. It is contemplated that with the system for vent equalization described here, no active pumping would be required to encourage air flow.

Figure 21A:
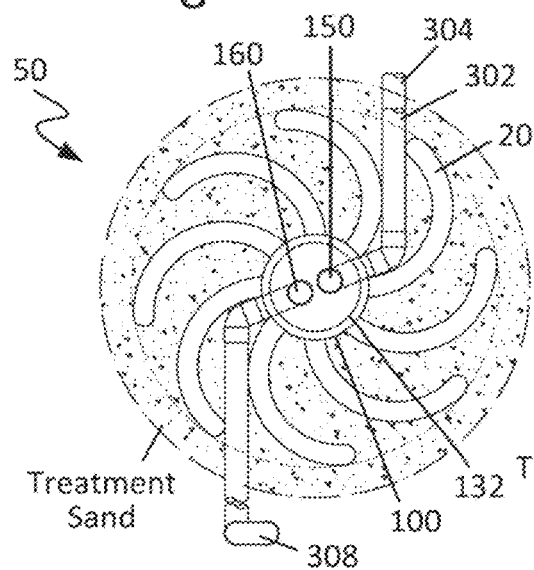
FIG. 21A is a plan view of a rounded treatment cell configured in accordance with another embodiment of the present disclosure.

In some cases, the inlet baffle 150 and/or outlet baffle 160 (and corresponding openings 125) of a given central distribution unit 100 may be arranged in an offset manner (e.g., as in FIG. 21A) so as not to interfere with the positioning/arrangement of the one or more treatment fins 200 about unit 100. Numerous configurations will be apparent in light of this disclosure.

Figure 5A:
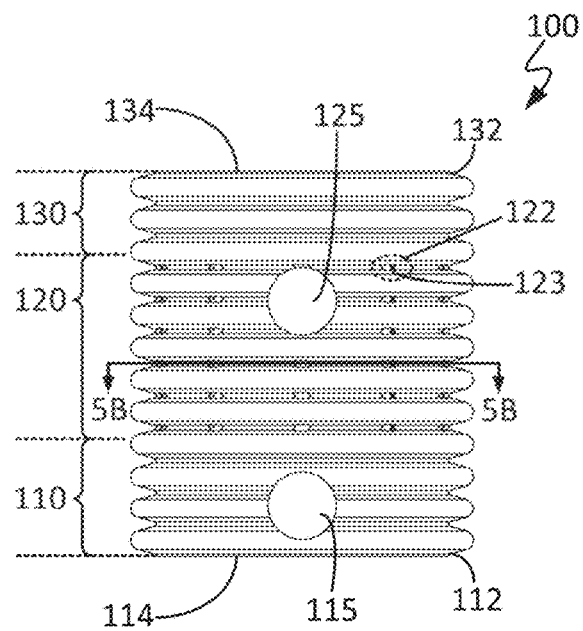
FIG. 5A is a side view of a central distribution unit configured in accordance with another embodiment of the present disclosure.
Figure 5B:
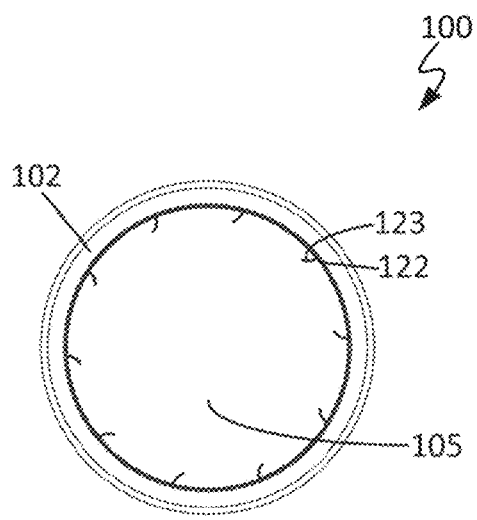
FIG. 5B is a cross-sectional view of the central distribution unit of FIG. 5A taken along line 5B-5B therein.

FIGS. 5A-5B illustrate several views of a central distribution unit 100 configured in accordance with another embodiment of the present disclosure. As can be seen here, in some cases, central distribution unit 100 optionally may include one or more skimmer tabs 123 formed from or otherwise affixed to sidewall 102 (e.g., at mid-portion 120) and extending generally radially inward into interior hollow region 105. In some cases, a given skimmer tab 123 may be provided proximal an aperture 122. When included, the one or more optional skimmer tabs 123 may serve, at least in part, to retain greases, oils, and other floating matter within central distribution unit 100, thereby preventing or otherwise reducing the ability of such materials to exit through or clog apertures 122. The quantity and distribution of skimmer tabs 123 may be customized, as desired for a given target application or end-use. In some instances, a plurality of skimmer tabs 123 may be randomly distributed across the mid-portion 120 of a given central distribution unit 100. In some other instances, a plurality of skimmer tabs 123 may be regularly or semi-regularly distributed across mid-portion 120. For instance, in an example case, the skimmer tabs 123 of mid-portion 120 may be substantially aligned (e.g., precisely aligned or otherwise aligned within a given tolerance).

In some cases, a given skimmer tab 123 may have a width/diameter, for example, of about ¼ inch or greater, about ½ inch or greater, about ¾ inch or greater, or about 1 inch or greater. In some cases, a given skimmer tab 123 may have a length, for example, in the range of about 0.5-2.0 inches (e.g., about 0.5-1.0 inches, about 1.0-1.5 inches, about 1.5-2.0 inches, or any other sub-range in the range of about 0.5-2.0 inches). It should be noted, however, that the present disclosure is not so limited to only these example dimensional ranges, as in a more general sense, and in accordance with an embodiment, the size of a given skimmer tab 123 may be customized, as desired for a given target application or end-use. Numerous configurations will be apparent in light of this disclosure.

Figure 6A:
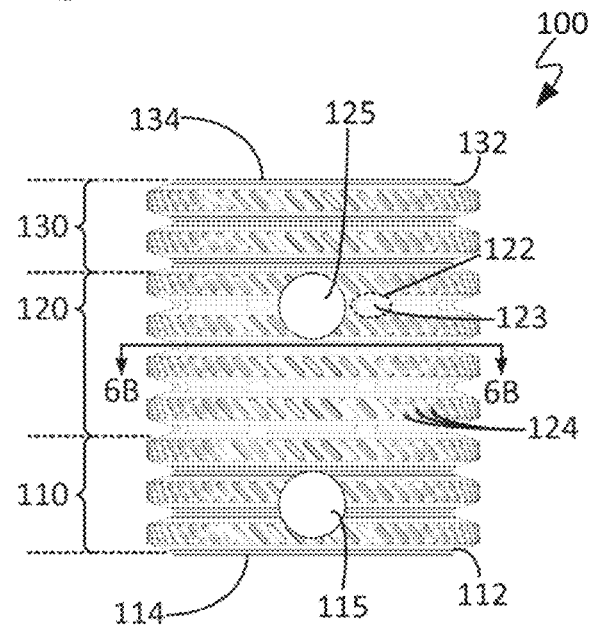
FIG. 6A is a side view of a central distribution unit configured in accordance with another embodiment of the present disclosure.
Figure 6B:
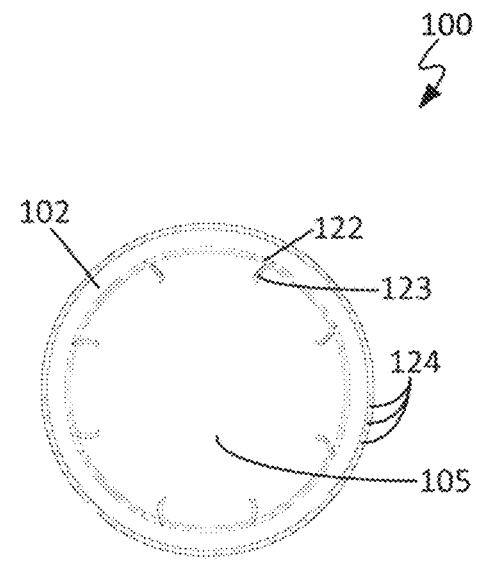
FIG. 6B is a cross-sectional view of the central distribution unit of FIG. 6A taken along line 6B-6B therein.

FIGS. 6A-6B illustrate several views of a central distribution unit 100 configured in accordance with another embodiment of the present disclosure. As can be seen here, in some cases, central distribution unit 100 optionally may include one or more ridges 124 formed from or otherwise affixed to sidewall 102 and extending generally radially outward therefrom. When included, the one or more optional ridges 124 may serve, at least in part, to facilitate liquid flow from mid-portion 120 (e.g., into a given treatment fin 200 in flow communication therewith). For instance, ridge(s) 124 may facilitate liquid flow where flow otherwise would be prevented or inhibited by a sleeve or other material in contact with the exterior surface of sidewall 102 of a central distribution unit 100. The quantity and distribution of ridges 124 may be customized, as desired for a given target application or end-use. In some instances, a plurality of ridges 124 may be randomly distributed across central distribution unit 100, in part or in whole. In some other instances, a plurality of ridges 124 may be regularly or semi-regularly distributed across central distribution unit 100, in part or in whole. For instance, in an example case, a plurality of ridges 124 may be provided along a corrugation rib of central distribution unit 100. The dimensions of a given ridge 124 may be customized, as desired for a given target application or end-use. Numerous configurations will be apparent in light of this disclosure.

FIGS. 7A-7D illustrate several views of a central distribution unit 100 configured in accordance with another embodiment of the present disclosure. As can be seen here, in some cases, central distribution unit 100 optionally may include a sump portion 110 that is truncated or otherwise reduced in length and thus does not extend beyond the bottom of a given treatment fin 200 in flow communication with unit 100. In an example case, the lower end 112 of a central distribution unit 100 having a truncated sump portion 110 may be substantially flush with the bottom edge of a given treatment fin 200 in flow communication with that unit 100 (e.g., as in FIGS. 7C-7D). In some such cases, the one or more apertures 122 of mid-portion 120 may be adjusted in arrangement and/or size such that liquid waste passing therethrough initially enters a given treatment fin 200 only at an upper portion thereof (e.g., within the upper longitudinal half of a given fin 200) before draining downward, in accordance with some embodiments. Provision of a truncated sump portion 110 may reduce the overall length of unit 100, which in turn may reduce system size when installed and reduce materials used/cost.

FIGS. 8A-8B illustrate several example central distribution units 100 configured in accordance with some embodiments of the present disclosure. As can be seen here, in some cases, an aeration pump 350 optionally may be disposed within central distribution unit 100 (e.g., as in FIG. 8A). In some other cases, an aeration pump 350 optionally may be disposed outside of central distribution unit 100 and connected with its interior hollow region 105 via an aeration hose/conduit 352 (e.g., such as in FIG. 8B). Optional aeration pump 350 may be configured as typically done and may serve, at least in part, to agitate liquid waste contained within central distribution unit 100. In some instances, and in accordance with an embodiment, such agitation may facilitate aerobic treatment of liquid waste contained within a given central distribution unit 100.

As can be seen further from FIGS. 8A-8B, in some cases, a discharge pump 360 optionally may be disposed within central distribution unit 100. In some cases, discharge pump 360 may be external to central distribution unit 100 and coupled with the interior of central distribution unit 100 via a hose or conduit. Optional discharge pump 360 may be configured as typically done and may serve, at least in part, to discharge liquid waste contained within a given central distribution unit 100, for example, to a septic tank (e.g., to recirculate liquid waste to the septic tank for nitrification and/or denitrification), a dispersal/drain field, a direct dispersal unit, and/or any other liquid waste treatment device, as will be apparent in light of this disclosure. In some exemplary embodiments, the system is operable as a passive treatment and dispersal system and no active pumping is required.

In some cases, one or more treatment media 310 optionally may be disposed within central distribution unit 100 (e.g., as in FIGS. 8A-8B). When included, treatment media 310 may serve, at least in part, to provide additional surface area on which bacteria may grow and which may provide surface contact for treatment of liquid waste contained within unit 100. To that end, treatment media 310 may be any of a wide range of materials, and in some example cases may be any of the example materials discussed below, for instance, with respect to porous media 210.

In accordance with an example embodiment, central distribution unit 100 may be constructed, in part or in whole, from ENVIRO-SEPTIC® conduit, available heretofore from Presby Environmental, Inc., Whitefield, N.H. In accordance with an example embodiment, central distribution unit 100 may be constructed, in part or in whole, from ADVANCED ENVIRO-SEPTIC® conduit, available heretofore from Presby Environmental, Inc., Whitefield, N.H. In accordance with some example embodiments, central distribution unit 100 may be constructed, in part or in whole, from a conduit such as that disclosed in any of U.S. Pat. No. 6,461,078, titled "Plastic Sewage Pipe," U.S. Pat. No. 8,342,212, titled "Fluid Conduit with Layered and Partial Covering Material Thereon," and U.S. Pat. No. 8,501,006, titled "Apparatus and Method for Processing Liquid Waste," each of which is herein incorporated by reference in its entirety. In some cases, multiple central distribution units 100 may be cut from a single extruded conduit/pipe. In some instances, a given central distribution unit 100 may be assembled from multiple pieces of conduit/pipe fixed together. In some still other embodiments, central distribution unit 100 may be a septic distribution box configured as typically done. Numerous suitable configurations for central distribution unit 100 will be apparent in light of this disclosure.

Figure 9:
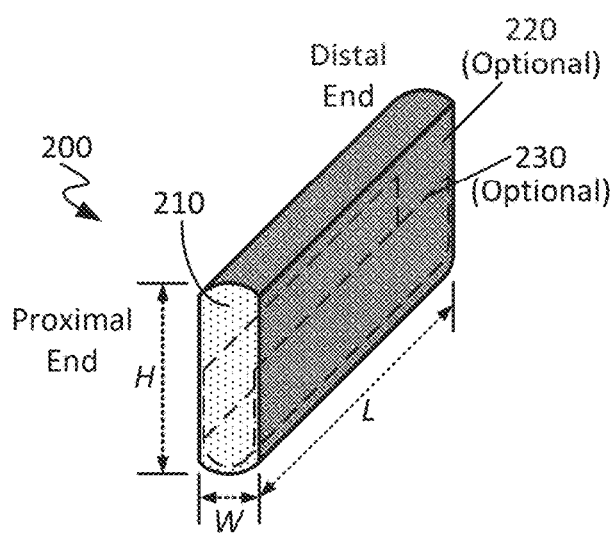
FIG. 9 is an end perspective view of an example treatment fin configured in accordance with an embodiment of the present disclosure.

As previously noted, the central distribution unit 100 of a given treatment module 10 may have one or more treatment fins 200 in flow communication therewith. A given treatment fin 200 may have any of a wide range of configurations. FIG. 9 illustrates a treatment fin 200 configured in accordance with an embodiment of the present disclosure. As can be seen here, in some embodiments, treatment fin 200 may include: (1) one or more porous media 210; (2) an optional media retention layer 220 at least partially surrounding porous media 210; and (3) one or more optional internal barrier layers 230 disposed within porous media 210. A discussion of each of these is provided below.

In accordance with some embodiments, the one or more porous media 210 of a given treatment fin 200 may serve, at least in part, to provide surface area upon which bacterial colonies may grow for treatment of liquid waste received from a central distribution unit 100 coupled with that treatment fin 200. By varying the size and/or composition of porous media 210, the porosity of a given treatment fin 200 may be customized, as desired for a given target application or end-use. The porous media 210 may provide available surface area for microbial activity and may be, for example, greater than 2×, greater than 5×, greater than 10×, greater than 20×, greater than 50×, or greater than 100× the outer surface area of the treatment fin 200. In some cases, the one or more porous media 210 may occupy at least 90%, at least 80%, at least 70%, at least 60%, or at least 50% of the volume of a host treatment fin 200. In some other cases, the one or more porous media 210 may occupy less than 50% of the volume of a host treatment fin 200.

Porous media 210 may include any of a wide range of porous materials compatible with microbial growth and which exhibit sufficient porosity to allow liquid waste to flow therethrough at a given target rate. In some embodiments, the porous media 210 may have a percent porosity of greater than 50%, greater than 70%, greater than 80%, greater than 90%, or greater than 95%. In some instances, porous media 210 may have a pore volume, for example, of greater than 20% or greater than 50%. In some other instances, porous media 210 may have a pore volume, for example, of less than 50% or less than 20%. In some example embodiments, porous media 210 may include an aggregate material, such as: (1) a natural aggregate, such as crushed stone, coarse sand, gravel, pea gravel, vermiculite, or shells; and/or (2) a synthetic aggregate, such as glass, polymeric beads, sintered glass, sintered polymer, ceramic, an expanded polymer (e.g., polystyrene foam), crushed concrete, or crushed cement. The individual aggregate pieces may be of consistent or varying sizes, as desired, and in some cases, the size may be selected, for example, to optimize or otherwise facilitate liquid flow, bacterial activity, and/or moisture retention for a given treatment fin 200. In some instances, the individual aggregate pieces may be coated with a substance, for example, that increases surface area, increases porosity, increases or reduces surface tension, and/or improves bacterial growth, as desired.

In some embodiments, porous media 210 may include a coarse material, such as, for example: (1) cotton, wool, mineral wool, coconut husk, peat moss, wood chips, mulch, hair, or other natural coarse material; and/or (2) coarse polymeric fibers or beads (e.g., polypropylene; polyethylene; polystyrene), mesh (polymeric; metallic), ground-up plastic, shredded rubber, fiberglass, or other synthetic coarse material. In some instances, the coarse material may be randomly distributed. In some cases, a constituent piece/portion of such coarse material may have an average thickness (e.g., width/diameter), for instance, of: about $\frac{1}{64}$ inch or greater; about $\frac{1}{32}$ inch or greater; about $\frac{1}{16}$ inch or greater; about $\frac{1}{8}$ inch or greater; about $\frac{1}{4}$ inch or greater; or about $\frac{1}{2}$ inch or greater. In some cases, a constituent piece/portion of such coarse material may have an average length, for instance, in the range of about 0.25-1.5 inches (e.g., about 0.25-0.5 inches, about 0.5-0.75 inches, about 0.75-1.0 inches, about 1.0-1.25 inches, about 1.25-1.5 inches, or any other sub-range in the range of about 0.25-1.5 inches). In some embodiments, porous media 210 may include unitary/monolithic blocks of a solid, porous material, such as, for example: (1) a synthetic material, such as porous concrete, an expanded or sintered polymer, or sintered glass; and/or (2) a natural material, such as carbon. In some cases, the blocks may be coated, at least in part, with an impermeable or semi-permeable material (e.g., a sealant) to facilitate retention of liquid therein. For instance, in an example embodiment, an expanded porous foam block may be coated with a semi-permeable polyurethane coating. In some embodiments, porous media 210 may include carbon media.

In some cases, the porous media 210 of a given treatment fin 200 may be uniform in composition (e.g., a single material is used), whereas in some other cases, the porous media 210 of a given treatment fin 200 may be of non-uniform composition (e.g., multiple materials are used). The porous media 210 utilized in a given treatment fin 200 may be hydrophilic or hydrophobic, as desired for a given target application or end-use. Also, the density of porous material 210 may be varied, in accordance with some embodiments. For instance, in some cases, porous material 210 (or an entire treatment fin 200) may have a density of about 500 g/L or less, about 250 g/L or less, or about 100 g/L or less. In some instances, this may help to provide a treatment fin 200 that is relatively lightweight. Other suitable compositions for the one or more porous media 210 of a given treatment fin 200 will depend on a given application and will be apparent in light of this disclosure.

In accordance with some embodiments, a given treatment fin 200 may be configured such that liquid waste exits the interior of an associated central distribution unit 100 and enters into the porous media 210. To that end, liquid waste may flow through a given aperture 122 into a single or multiple treatment fins 200 in flow communication therewith. Such flow of liquid waste may be provided, in part or in whole, by gravity feed, pumping, and/or vacuum draw, in accordance with some embodiments. In some cases, the material composition and structure of the porous media 210 of a given treatment fin 200 may provide for capillary action that facilitates distribution of the liquid waste within fin 200. In accordance with some embodiments, a given treatment fin 200 may be configured, for example, to retain liquid waste (e.g., within an interior/middle region thereof) for an extended period of time, thereby keeping such fin 200 microbiologically primed during periods of reduced flow from an associated central distribution unit 100. To that end, the pore size of porous media 210, the size of treatment fin 200, and/or the location of treatment fin 200 (e.g., in ground; above ground) may be varied, as desired for a given target application or end-use. In some cases, the material composition and structure of porous media 210 may provide for a period of liquid retention that allows for substantial wetting and sufficient dwell time for microbial growth on such media 210. In some cases, such liquid retention may provide for raising of the volume of liquid waste within central distribution unit 100 to a level where it can be transferred (e.g., via a pipe 302 coupled with an outlet baffle 160) to a central distribution unit 100 of a downstream treatment module 10 coupled therewith. In some instances, porous media 210 may be rigid and resilient against being crushed or otherwise deforming under applied force, thereby providing protection against collapse of a given treatment fin 200 (e.g., from or after backfilling).

In accordance with some embodiments, the porous media 210 of a given treatment fin 200 optionally may be disposed within or otherwise enveloped/wrapped with a media retention layer 220. When included, optional media retention layer 220 may serve, at least in part, to: (1) maintain the general structure of porous media 210, thereby helping to maintain a target pore size or pore volume for treatment fin 200; and/or (2) provide for controlled draining/flow of liquid from porous media 210 into the surrounding environment (e.g., system sand and/or soil) at a given target rate. To that end, media retention layer 220 may include any of a wide range of permeable, semi-permeable, and/or impermeable materials (e.g., having one or more breaches therein) compatible with microbial growth and which exhibit sufficient porosity to allow liquid to flow therethrough at a given target rate, and may be woven, non-woven, extruded, natural, synthetic, or a combination of any one or more thereof. For example, in some embodiments, media retention layer 220 may be a geotextile fabric (extruded or produced from polymeric or other fibers). The geotextile fabric may be woven or non-woven. As will be appreciated in light of this disclosure, a geotextile fabric may be any fabric that provides one or more of drainage, filtration, separation, reinforcement, protection, erosion control, and stability, for example, of porous media 210. Some example suitable material compositions for optional media retention layer 220 include: polypropylene; polyethylene; polyester; and/or a combination of any one or more thereof. The media retention layer 220 may be hydrophilic or hydrophobic, as desired for a given target application or end-use. In some cases in which media retention layer 220 includes a semi-permeable or an impermeable material, for example, it may be desirable to breach (e.g., needle-punch or otherwise puncture) that material to ensure liquid can flow therethrough at a given target rate. This will render an impermeable layer semi-permeable layer.

It should be noted, however, that it is not necessary for media retention layer 220 to be so rigid as to support the porous media 210 by itself, as system sand, soil, gravel, crushed stone, natural aggregate, synthetic aggregate, glass beads, polymer beads, expanded polymer beads, organic material, cellulose, lignocellulose, (or any combination thereof) or other material that surrounds the treatment fin 200 may assist to that end. In some embodiments, optional media retention layer 220 may include a material that is flexible and thus aids in providing a flexible, malleable, or otherwise manipulable treatment fin 200. In some instances, optional media retention layer 220 may be formed from a single, continuous covering, whereas in other instances it may be formed from multiple pieces of covering material that have been assembled with one another. In some cases, optional media retention layer 220 may be formed with one or more seams 222 (optional) joined, for example, by sewing, stapling, welding, heat bonding, and/or gluing. In some instances, media retention layer 220 may be a partial layer that partially encloses (e.g., surrounds less than the total volume of) porous media 210 of a treatment fin 200. In some example cases, media retention layer 220 may be generally U-shaped, shaped as an arcuate portion of a circle/ellipse, or otherwise open-ended and arranged to cover, but not fully surround, porous media 210. In some other example cases, a plurality of media retention layers 220 configured in this manner may be overlapped, interlocked, mated, or otherwise arranged with one another such that, although they individually would only partially enclose porous media 210, together they surround porous media 210 to a given desired degree. Other suitable configurations for optional media retention layer 220 will depend on a given application and will be apparent in light of this disclosure. In embodiments without a media retention layer 220, the porous media 210 can comprise a porous monolith or a plurality of fragments that are retained by an adhesive or by sintering, for example.

In accordance with some embodiments, one or more internal barrier layers 230 optionally may be disposed within porous media 210. When included, a given optional internal barrier layer 230 may serve, at least in part, to catch any sludge/solids which manage to migrate out of central distribution unit 100 and into a given treatment fin 200. To that end, a given optional internal barrier layer 230 may be formed from any of the example materials discussed above, for instance, with respect to optional media retention layer 220. In some cases in which a given optional internal barrier layer 230 includes a semi-permeable or an impermeable material, for example, it may be desirable to breach (e.g., needle-punch or otherwise puncture) that material to ensure that liquid can flow therethrough at a given target rate. Also, it may be desirable to ensure that the one or more optional internal barrier layers 230 are appropriately sized and arranged within porous media 210 so as not to prevent or otherwise significantly inhibit the ability of the liquid waste to reach portions of the porous media 210 located, for example, beneath such internal barrier layer(s) 230. In some instances, a given optional internal barrier layer 230 may be a partial layer that partially encloses (e.g., surrounds less than the total volume of) porous media 210 of a treatment fin 200. In some example cases, a given optional internal barrier layer 230 may be generally U-shaped (e.g., as generally shown by the optional barrier layer 230 denoted by the dashed line in FIG. 9), shaped as an arcuate portion of a circle/ellipse, or otherwise open-ended and arranged to cover, but not fully surround, porous media 210. Thus, in accordance with some embodiments, a given optional internal barrier layer 230 may cover less than the entire internal circumference or perimeter of treatment fin 200 (e.g., less than about ¾, less than about ½, less than about ¼, or any other desired amount of the internal surface of treatment fin 200). Other suitable configurations for a given optional internal barrier layer 230 will depend on a given application and will be apparent in light of this disclosure.

In some cases, a plurality of internal barrier layers 230 optionally may be disposed within porous media 210. In accordance with some embodiments, each successive barrier layer 230, going from innermost to outermost, may be of greater surface area and/or size (e.g., encompassing a greater space) than one before it. In accordance with some other embodiments each successive barrier layer 230, going from innermost to outermost, may be of lesser surface area and/or size (e.g., encompassing a lesser space) than one before it. In accordance with some embodiments, successive barrier layers may alternate between lesser surface area than the one before it and greater surface area than the one before it. In some embodiments a coarse layer may be surrounded by a fine layer, which is further surrounded by a coarse layer. In some embodiments, alternating type of fabric or material thickness in combination with layers of porous media may achieve these goals. In some embodiments, layering of porous media with fabric layers may be accomplished using one or more partial layers, a patchwork arrangement of materials within a layer, or different densities of a single material or multiple materials within a single layer. In a more general sense, and in accordance with some embodiments, the size of successive barrier layers 230 can be varied, as desired for a given target application or end-use. In an example case, a first impermeable barrier layer 230 may be configured to form a reservoir having a first volume, and a second impermeable barrier layer 230 may be positioned outside of the first impermeable barrier layer 230 and may form a second volume greater than the first volume. In some embodiments, each successive barrier layer 230, going from innermost to outermost, may be of greater or lesser porosity (e.g., pore quantity, pore size, pore density, etc.) than one before it. The depth and/or curvature of a given barrier layer 230 may be customized. The amount of porous media 210 or other space retained by (e.g., volume defined by) a given barrier layer 230 or between adjacent barrier layers 230 may be customized. In some cases, adjacent barrier layers 230 may have a space there between, which optionally may be filled with porous medium 210. In some instances, there may be a space between a given barrier layer 230 and media retention layer 220, which optionally may be filled with porous medium 210. In some instances, barrier layer 230 may alternate with regions of greater surface area and regions of lesser surface area (i.e. regions or layers of coarse covering alternating with regions or layers of fine covering, regions or layers of semi-permeable covering alternating with regions or layers of impermeable covering).

In accordance with some embodiments, a spacer layer optionally may be included between consecutive barrier layers 230. When included, a given optional spacer layer may be configured to facilitate the flow of liquids within a treatment fin 200 and to provide space for bacterial activity between adjacent internal barrier layers 230. To that end, a given spacer layer may be constructed from any of a wide range of materials, including, for example: a polymer, such as polyethylene, polypropylene, or polyester; a rubber (natural or synthetic); a metal; a glass; a ceramic; and/or a combination of any one or more thereof. In some cases, a given optional spacer layer may be, for example, a fiber mat formed from a layer of coarse fibers randomly oriented on each other. In some cases, an optional spacer layer may be, for example, a mesh layer having channels or pathways therein. In some instances, a given optional spacer layer may be formed from a porous material, such as, for example, a bed of aggregate or polymeric fragments, among others. The thickness of a given spacer layer may be customized, as desired for a given target application or end-use. In some cases, the presence of a given spacer may promote development and/or maintenance of bioactivity on the surfaces of the adjacent internal barrier layers 230 which it separates.

Figure 10A:
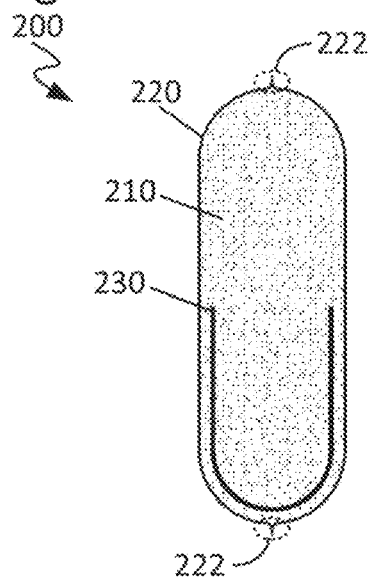
FIGS. 10A-10C are cross-sectional views of several example treatment fins configured in accordance with some embodiments of the present disclosure.
Figure 10B:
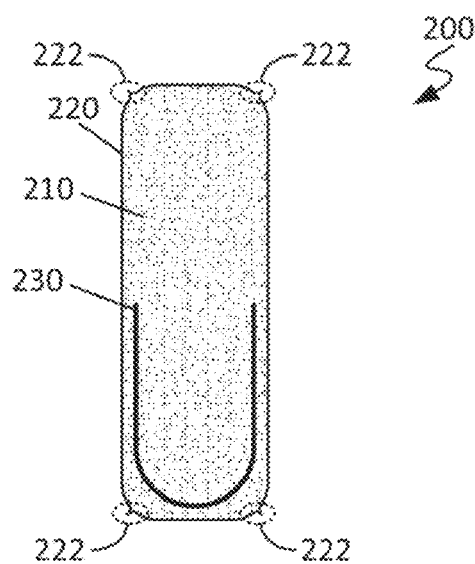
Figure 10C:
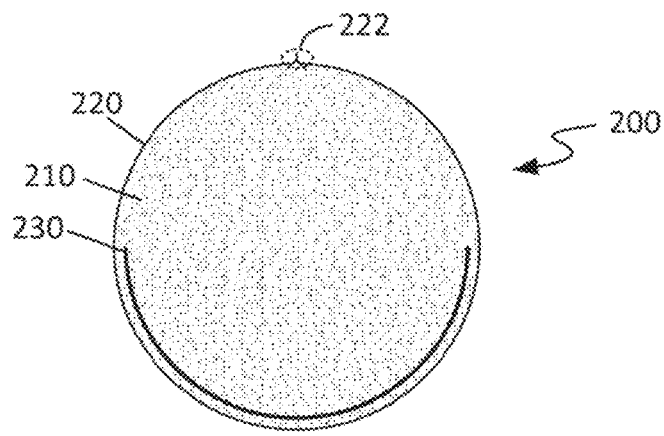

The profile of a given treatment fin 200 may be customized, as desired for a given target application or end-use. FIGS. 10A-10C illustrate cross-sectional views of several example treatment fins 200 configured in accordance with some embodiments of the present disclosure. As can be seen, in some cases, a given treatment fin 200 may be of a curvilinear cross-sectional geometry (e.g., generally oval, as in FIG. 10A; generally circular, as in FIG. 10C; elliptical; oblong; etc.). In some other cases, a given treatment fin 200 may be of a polygonal cross-sectional geometry (e.g., triangular; rectangular; square; rounded-rectangular, as in FIG. 10B; hexagonal; octagonal; etc.). In many cases, the shape of a given treatment fin 200 is malleable from one cross-sectional shape to another without detrimentally affecting performance.

Figure 11A:
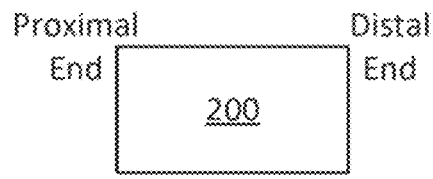
FIGS. 11A-11B are side views of several example treatment fins configured in accordance with some embodiments of the present disclosure.
Figure 11B:
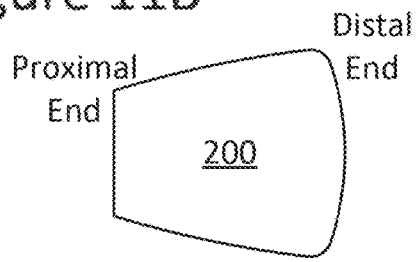
Figure 12A:
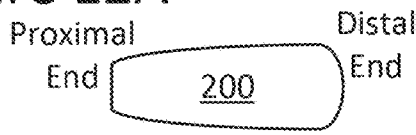
FIGS. 12A-12C are top-down views of several example treatment fins configured in accordance with some embodiments of the present disclosure.
Figure 12B:
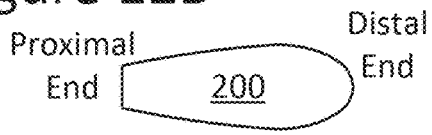
Figure 12C:
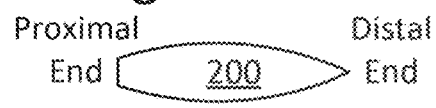
Figure 13A:
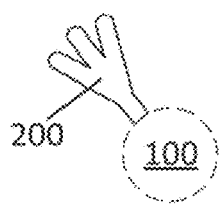
FIGS. 13A-13G are plan views of several example treatment fins configured in accordance with some embodiments of the present disclosure.
Figure 13B:
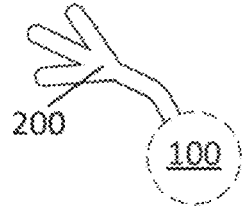
Figure 13C:
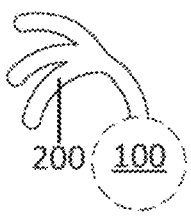
Figure 13D:
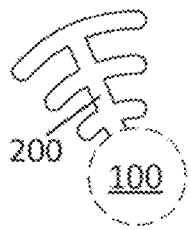
Figure 13E:
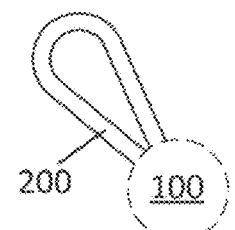
Figure 13F:
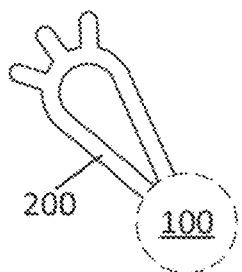
Figure 13G:
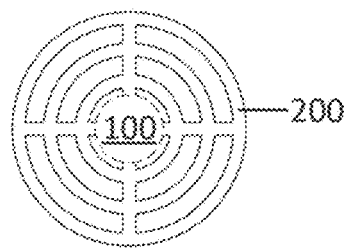

FIGS. 11A-11B illustrate side views of several example treatment fins 200 configured in accordance with some embodiments of the present disclosure. FIGS. 12A-12C illustrate top-down views of several example treatment fins 200 configured in accordance with some embodiments of the present disclosure. FIGS. 13A-13G illustrate top-down views of several example treatment fins 200 configured in accordance with some embodiments of the present disclosure. As can be seen here, in some cases, a given treatment fin 200 may be of substantially uniform profile (e.g., cross-sectional profile; longitudinal profile; etc.). In some other cases, a given treatment fin 200 may be of non-uniform profile. In some instances, a given treatment fin 200 may have a tapered, flared, rounded, or bullet-like profile. In some cases, the top of a given treatment fin 200 may extend above the upper end 132 of an associated central distribution unit 100. In some instances, the bottom of a given treatment fin 200 may extend below the lower end 112 of an associated central distribution unit 100. In some instances, a given treatment fin 200 may have a cross-sectional shape that changes in at least one of size and/or geometry from a first end to a second end thereof.

In some embodiments, a given treatment fin 200 may exhibit a generally straight/linear longitudinal profile, whereas in some other embodiments, a curved/non-linear longitudinal profile may be provided. For instance, in some embodiments, a given treatment fin 200 may have one, two, three, four, or more points of curvature, as desired for a given target application or end-use. The treatment fin 200 can be curved to obtain a desired distance from a second treatment fin 200 that may be part of the same or a different treatment module 10. In some cases, a given treatment fin 200 may have a branched profile (e.g., as in FIGS. 13A-13D). In some instances, a given treatment fin 200 may have a loop-shaped profile (e.g., as in FIGS. 13E and 13F). In some cases, a given treatment fin 200 may have a radial grid-shaped profile (e.g., as in FIG. 13G). Numerous configurations for a given treatment fin 200 will be apparent in light of this disclosure.

In some embodiments, a given treatment fin 200 may be flexible, malleable, or otherwise manipulable and thus may be manipulated into any shape, as desired for a given target application or end-use. The shape of the treatment fin 200 from end to end may be altered and so may the cross-sectional shape thereof. In an example case, a given treatment fin 200 may be sufficiently malleable such that its thickness can be changed by ±10%, ±20%, ±30%, ±40%, ±50%, ±60%, ±70%, ±80%, or greater than ±80% without causing damage thereto and/or without negatively impacting its treatment performance. In some cases, a given treatment fin 200 may be of sufficient flexibility, for example, to be manipulated to avoid obstacles (e.g., natural obstacles or other installed system equipment), adjust treatment behavior, and/or expand or collapse system footprint. In an example case, a given treatment fin 200 may be sufficiently flexible so as to be capable of being wrapped around a 1 ft.-diameter pipe without breakage. In another example case, a given treatment fin 200 may be sufficiently flexible so as to be capable of being wrapped around a pipe with a diameter up to 6 inches, up to 12 inches, up to 18 inches, or up to 24 inches without breakage (e.g., breaching media retention layer 220) and/or inhibiting fluid flow through porous medium 210. Other suitable configurations, profiles, and geometries for a given treatment fin 200 will depend on a given application and will be apparent in light of this disclosure.

In some embodiments, a given treatment fin 200 may have a width/diameter (W), for example, in the range of about 2-24 inches (e.g., about 2-6 inches, about 6-12 inches, about 12-24 inches, or any other sub-range in the range of about 2-24 inches). In some embodiments, a given treatment fin 200 may have a height (H), for example, in the range of about 2-24 inches (e.g., about 2-12 inches, about 12-18 inches, about 18-24 inches, or any other sub-range in the range of about 2-24 inches). In some embodiments, a given treatment fin 200 may have a length (L), for example, in the range of about 12-96 inches (e.g., about 12-36 inches, about 36-48 inches, about 48-60 inches, about 60-72 inches, about 72-96 inches, or any other sub-range in the range of about 12-96 inches). In accordance with some embodiments, the volume of a given treatment fin 200 may be, for example, about 1 gallon or greater, about 2 gallons or greater, about 3 gallons or greater, about 4 gallons or greater, or about 5 gallons or greater. In some embodiments, a given treatment fin 200 may have a volume, for example, in the range of about 5-10 gallons, about 10-15 gallons, or about 15-20 gallons. In some other embodiments, a given treatment fin 200 may have a volume of about 20 gallons or greater. It should be noted, however, that the present disclosure is not so limited to only these example dimensional ranges for a given treatment fin 200, as in a more general sense, and in accordance with an embodiment, the size of a given treatment fin 200 may be customized, as desired for a given target application or end-use. Numerous configurations will be apparent in light of this disclosure.

In some instances, the treatment fins 200 of a given treatment module 10 may be configured to maximize fin area per ground area for a target treatment capacity. In accordance with some embodiments, a plurality of treatment fins 200 can be in flow communication with a given central distribution unit 100 such that the area required for installing one treatment fin 200 can be, for example, less than 100 ft$^2$, less than 50 ft$^2$, less than 20 ft$^2$, or less than 10 ft$^2$. In some embodiments, the ratio of square feet of horizontal space required per treatment fin 200 is, for example: greater than about 5:1; greater than about 10:1; greater than about 50:1; or greater than about 100:1. In some embodiments, this ratio may be, for example: less than about 100:1; less than about 50:1; less than about 20:1; less than about 10:1; or less than about 5:1. In accordance with some embodiments, the total square footage of fin outer surface area per square foot of ground surface can be, for example: greater than about 1:1; greater than about 2:1; greater than about 3:1; greater than about 5:1; or greater than about 10:1. In some embodiments, a given treatment fin 200 may have an exterior or outer surface area that is greater than the exterior surface area of a central distribution unit 100 associated therewith. In some cases, a given treatment fin 200 (or arrangement of treatment fins 200) may have an outer surface area, for example, of about 10 ft$^2$ or greater, about 15 ft$^2$ or greater, or about 20 ft$^2$ or greater. Numerous configurations will be apparent in light of this disclosure.

FIGS. 14A-14B illustrate cross-sectional side views of some example treatment fins 200 configured in accordance with some embodiments of the present disclosure. As can be seen from FIG. 14A, for example, liquid waste received by treatment fin 200 at its proximal end (which may be open to the sidewall 102 of the mid-portion 120 of a central distribution unit 100) may migrate generally axially along treatment fin 200 through porous media 210, before passing radially out of porous media 210 (e.g., through optional media retention layer 220, if included). As can be seen from FIG. 14B, however, the presence of one or more optional internal barrier layers 230 may affect the radial migration of liquid waste within treatment fin 200, causing liquid (and any attendant solids/sludge) to settle/accumulate on the barrier layer(s) 230, at least temporarily. The degree of permeability of the one or more optional internal barrier layers 230 may be customized to provide a given rate of flow therethrough, as desired for a given target application or end-use. In some instances, a given optional internal barrier layer 230 may serve to reduce flow downwardly through porous medium 210 and, optionally, without reducing longitudinal flow there through. In some embodiments, a given treatment fin 200 may be configured such that liquid waste flows into and/or is retained by only a lower portion thereof (e.g., within the lower 50% of the height of such fin 200). In some other embodiments, a given treatment fin 200 may be configured such that liquid waste flows into only an upper portion thereof (e.g., within the upper 50% of the height of such fin 200) before being allowed to flow downward into a lower portion of the fin 200. In some cases, the geometry and/or size of a given treatment fin 200 may be configured to facilitate gravity-driven draining/flow downward and/or wicking/flow upward through its porous media 210.

In some other embodiments, a given treatment fin 200 may be configured such that two or more of its ends (e.g., proximal, distal, or otherwise) are in flow communication with central distribution unit 100. For instance, consider configurations such as those of FIGS. 13E-13G. As will be appreciated in light of this disclosure, in such cases, liquid waste received by such a treatment fin 200 may migrate as described with respect to FIGS. 14A-14B, but from both (or multiple) ends or points. As will be further appreciated in light of this disclosure, the same may be said for such configurations also having optional pipes 303/305, such as are described below with respect to FIGS. 17A-17B, in accordance with some embodiments.

In some cases, treatment fin 200 optionally may include one or more reinforcement structures (e.g., a rigid framework) therein that are configured to serve, at least in part, to prevent or otherwise reduce the chance for collapse of an associated treatment fin 200 and/or for passage of porous medium 210 therefrom. In some instances, such a structure may partition the interior of a host treatment fin 200 into one or more sections containing porous medium 210 and one or more sections devoid of porous medium 210. In some example embodiments, one or more wire ribs may be disposed within treatment fin 200. In some other embodiments, a frame may be disposed within treatment fin 200. In some other embodiments, one or more rigid or flexible pipes may be disposed within treatment fin 200. The geometry and dimensions of a given optional reinforcement structure may be customized, as desired for a given target application or end-use. If a given reinforcement structure is sufficiently large in size, it may be desirable to form passageways (e.g., perforations or other openings/orifices) therein which allow for liquid to flow therethrough so as to minimize or otherwise reduce any inhibitive effect that the presence of the reinforcement structure might have on the flow of liquid waste through the associated treatment fin 200. Other suitable configurations for a given optional reinforcement structure will depend on a given application and will be apparent in light of this disclosure.

Figure 16C:
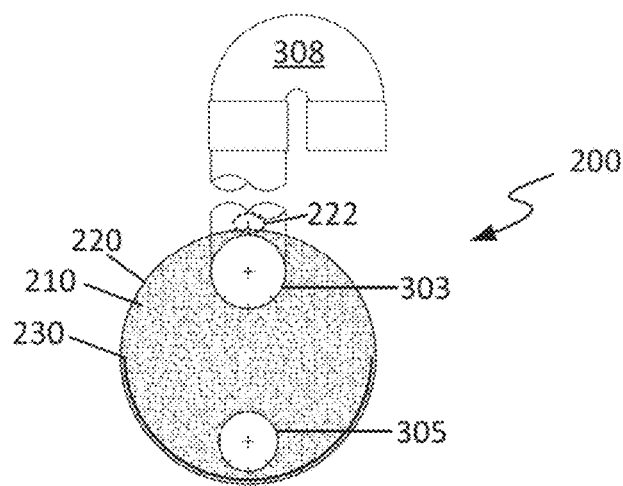

FIG. 15 illustrates a treatment fin 200 configured in accordance with another embodiment of the present disclosure. FIGS. 16A-16C illustrate cross-sectional views of several example treatment fins 200 configured in accordance with some embodiments of the present disclosure. As can be seen here, in some embodiments, treatment fin 200 optionally may include a pipe 303 and/or a pipe 305 passing through its one or more porous media 210. A given pipe 303/305 may have one or more apertures (e.g., perforations or other openings/orifices) formed in its sidewall which allow for liquid waste carried through such pipe 303/305 to drain into the surrounding porous media 210, in accordance with some embodiments. In accordance with some other embodiments, the one or more apertures may allow for air flow within a given pipe 303/305 and into the host treatment fin 200. In some instances, such air flow may facilitate aerobic treatment of liquid waste. In some cases, a given treatment fin 200 including a pipe 303 and/or a pipe 305 may be of a curvilinear cross-sectional geometry (e.g., generally oval, as in FIG. 16A; generally circular, as in FIG. 16C; elliptical; etc.). In some other cases, a given treatment fin 200 including a pipe 303 and/or a pipe 305 may be of a polygonal cross-sectional geometry (e.g., triangular; rectangular; square; rounded-rectangular, as in FIG. 16B; hexagonal; octagonal; etc.). A given pipe 303/305 may be smooth-walled, corrugated, or a combination thereof, in part or in whole, as desired. As will be appreciated in light of this disclosure, a given pipe 303/305 may be formed from any of the example materials discussed below, for example, with respect to pipes 302/304. In some instances, optional pipe 303 may be coupled with a vent stack 308 (e.g., as in FIG. 16C). To provide flow communication between a given pipe 303/305 and a central distribution unit 100, one or more perforations (e.g., slotted openings or other suitable apertures) may be formed within the sidewall 102 of central distribution unit 100. Such perforation(s) may be configured to permit air and/or liquid waste to flow between central distribution unit 100 and a given pipe 303/305. The dimensions and arrangement of such perforation(s) may be customized, as desired for a given target application or end-use. Other suitable configurations will depend on a given application and will be apparent in light of this disclosure.

Figure 17A:
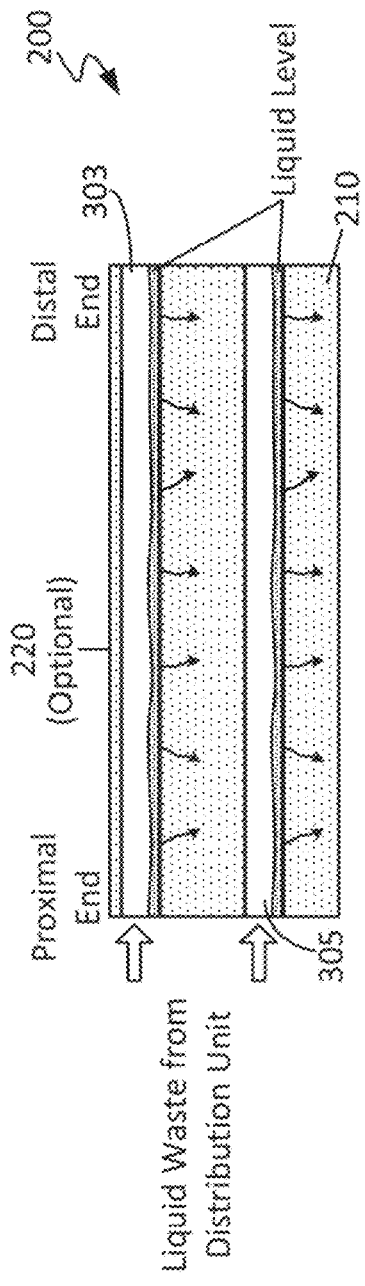
FIGS. 17A-17B are side cross-sectional views of several example treatment fins configured in accordance with some embodiments of the present disclosure.
Figure 17B:
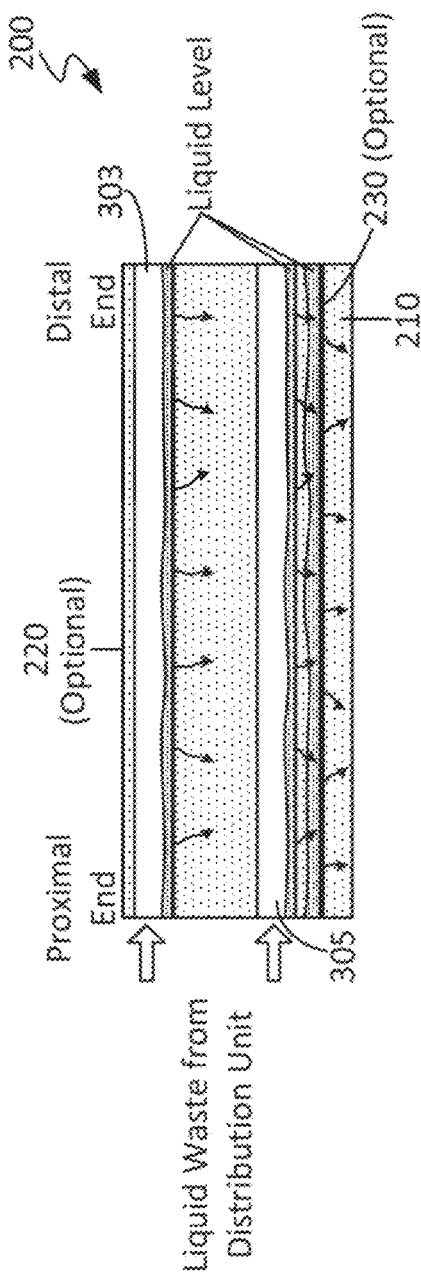

FIGS. 17A-17B illustrate cross-sectional side views of some example treatment fins 200 configured in accordance with some embodiments of the present disclosure. As can be seen from FIG. 17A, for example, liquid waste received by treatment fin 200 at its proximal end (which may be open to the sidewall 102 of the mid-portion 120 of a central distribution unit 100) may migrate generally axially along treatment fin 200 through a pipe 303 and/or a pipe 305 in porous media 210, before draining therefrom and passing radially out of porous media 210 (e.g., through optional media retention layer 220, if included). As can be seen from FIG. 17B, however, the presence of one or more optional internal barrier layers 230 may affect the radial migration of liquid waste within treatment fin 200, causing liquid (and any attendant solids/sludge) to settle/accumulate on the barrier layer(s) 230, at least temporarily. The degree of permeability of a given optional pipe 303, optional pipe 305, and the one or more optional internal barrier layers 230 may be customized to provide a given rate of flow therethrough, as desired for a given target application or end-use. In a general sense, configuration of a given treatment fin 200 with one or more pipes 303/305 may serve to separate its treatment function from a conduit/liquid waste conveyance function.

The quantity and arrangement of treatment fins 200 for a given treatment module 10 can be customized, as desired for a given target application or end-use. In some cases, a given treatment module 10 may include 1-10 treatment fins 200 (e.g., 1-3 treatment fins 200; 3-5 treatment fins 200; 5-8 treatment fins 200; 8-10 treatment fins 200). In some other cases, a given treatment module 10 may include 10 or more treatment fins 200 (e.g., 15 or more; 20 or more; etc.). In some embodiments, the treatment fins 200 of a given treatment module 10 may be configured to extend radially from a central distribution unit 100 (e.g., in a general hub-and-spoke arrangement). In some example cases, two or more treatment fins 200 may extend radially in a horizontal plane from an associated central distribution unit 100. In some embodiments in which a central distribution unit 100 of polygonal shape is provided, a single treatment fin 200 may extend from a given side/face of central distribution unit 100, whereas in some other such embodiments, multiple treatment fins 200 may extend from a given side/face of such central distribution unit 100 (e.g., such as can be seen with respect to FIG. 22). In some example cases, neighboring treatment fins 200 may be spaced with respect to one another about 3-6 inches apart, about 6-12 inches apart, or about 12 inches apart or greater. In some cases, neighboring treatment fins 200 may be radially spaced with respect to one another in a horizontal plane about 15° apart or less, about 30° apart or less, about 45° apart or less, about 60° apart or less, about 75° apart or less, or about 90° apart or less. In some other cases, neighboring treatment fins 200 may be radially spaced with respect to one another about 90°-120° apart, 120°-150° apart, or about 120°-180° apart. In any case, as discussed herein, system sand (and/or other suitable dispersal, treatment, filtration, or support media) may be utilized to fill interstitial space between treatment fins 200, in accordance with some embodiments. In some instances, any portion of a given treatment fin 200 not contacting a central distribution unit 100 may be surrounded by system sand (and/or other suitable dispersal, treatment, filtration, or support media). Other suitable quantities and arrangements of treatments fins 200 for a given treatment module 10 will depend on a given application and will be apparent in light of this disclosure.

Figure 18A:
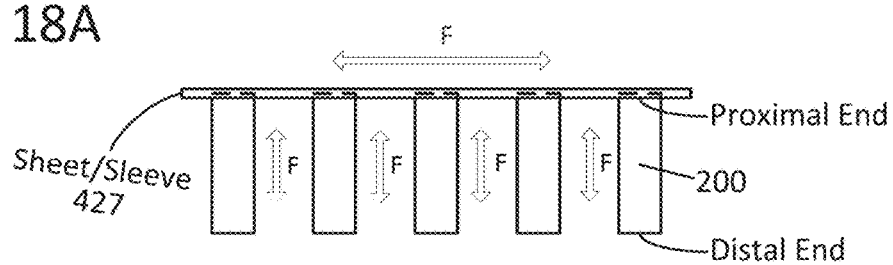
FIGS. 18A-18E illustrate an example method of assembling a plurality of treatment fins in flow communication with a central distribution unit, in accordance with an embodiment of the present disclosure.

FIGS. 18A-18E illustrate an example method of assembling a plurality of treatment fins 200 in flow communication with a central distribution unit 100, in accordance with an embodiment of the present disclosure. FIG. 18A depicts a plurality of treatment fins 200. The plurality of treatment fins 200 may be provided in a symmetrical pattern or an asymmetrical pattern, as desired. In some embodiments, the plurality of fins 200 may be affixed to or otherwise share a flexible sheet/sleeve. In some other embodiments, the plurality of fins 200 may be formed from a single flexible sheet/sleeve of media retention layer 220 that has been manipulated to form several recesses therein which define the volume of the treatment fins 200 and which may be filled with porous media 210. In some such cases, the recesses of the media retention layer 220 may be filled with the porous media 210 on site to avoid any need for transportation of a bulky plurality of treatment fins 200. In other cases, filling with porous media 210 may be performed off site. A given treatment fin 200 may be filled partially (e.g., less than 90%, less than 75%, less than 50%) or entirely with porous material 210, as desired. Thus, in a general sense, a given treatment fin 200 may be a non-hollow treatment body that is filled with one or more porous media 210, in accordance with some embodiments.

The proximal end of each treatment fin 200 may be left open, for example, to facilitate flow communication with central distribution unit 100 when assembled therewith, and the distal end of each treatment fin 200 may be sealed/sewn, for example, to prevent loss of porous media 210. In some embodiments, the sleeve/sheet may be made of an impermeable fabric that ensures that liquid waste which has flowed through the sidewall 102 at the mid-portion 120 of central distribution unit 100 remains confined between it and the exterior of central distribution unit 100, thus creating a common space containing liquid waste from which the treatment fins 200 are fed.

Figure 18B:
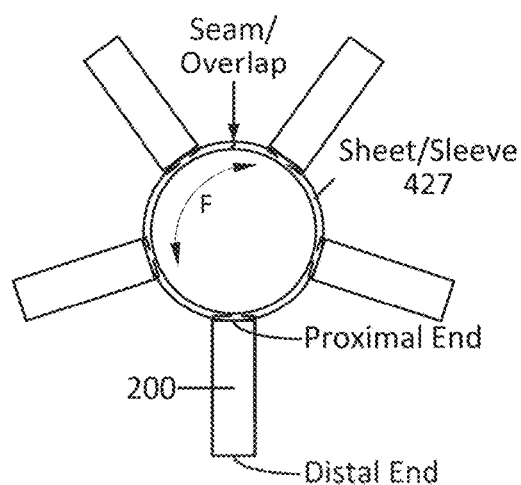
Figure 18C:
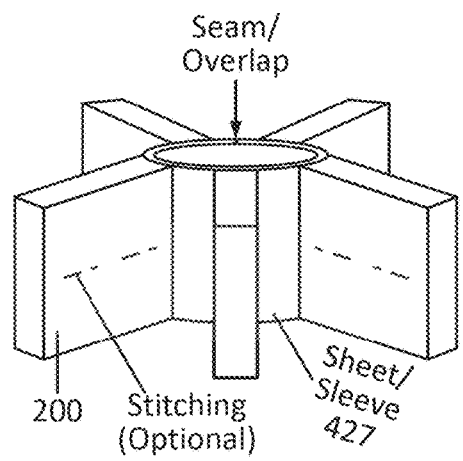
Figure 18D:
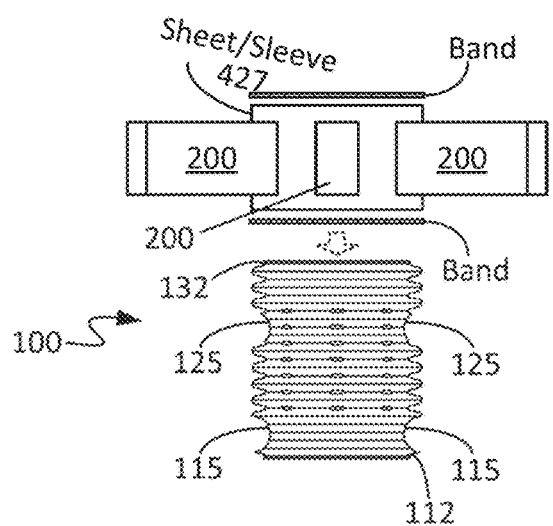
Figure 18E:
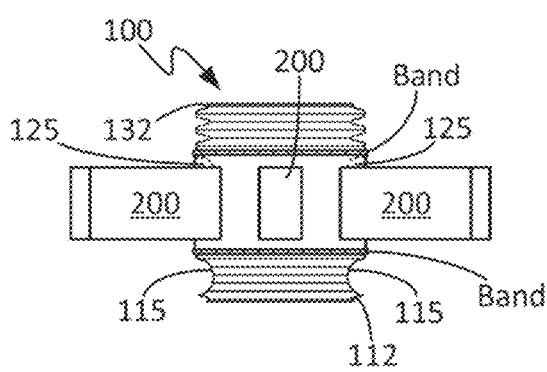

As in FIGS. 18B-18C, the sheet/sleeve may be folded back towards/onto itself, radially fanning out the plurality of treatment fins 200. In FIG. 18D, the sheet/sleeve may be slid onto or wrapped around the central distribution unit 100. One or more securing bands (e.g., wires, clamps, ties, etc.) may be utilized to secure the sheet/sleeve once it is in place around the central distribution unit 100. In FIG. 18E, the treatment fins 200 are positioned about the mid-portion 120 (having one or more apertures 122), and the band(s) are tightened to secure the sheet/sleeve about the central distribution unit 100 (e.g., against an exterior corrugation ridge of central distribution unit 100, if corrugated). In some embodiments, the band(s) may seal the sheet/sleeve against the exterior of unit 100 to provide a liquid-tight sealing relationship at the banded edge(s). The annular space between the sleeve and the outer surface of the central distribution unit provides a reservoir space that can aid in redistributing waste water from the interior of the central distribution unit 100 to the fins. The annular space formed between the central distribution unit 100 and the sleeve can hold, for example, more than one liter, more than two liters or more than 4 liters of liquid waste. As the fins can be joined to the flexible sleeve and not to the rigid central distribution unit 100, there is significant flexibility in the horizontal and vertical angle at which the fin can extend from the central distribution unit 100. For example, in standard positioning the fin may be positioned so that it extends 90° (normal) from the surface of the central distribution unit 100 in both the horizontal and vertical direction. However, in other embodiments, the fin can be angled up, down, left or right by more than 10°, more than 20°, more than 30°, more than 40°, or more than 50° from normal. This variable angle of attachment in combination with the flexibility of the fin itself, in many embodiments, provides for a flexible system that can be fit into small, oddly shaped footprints.

Figure 18F:
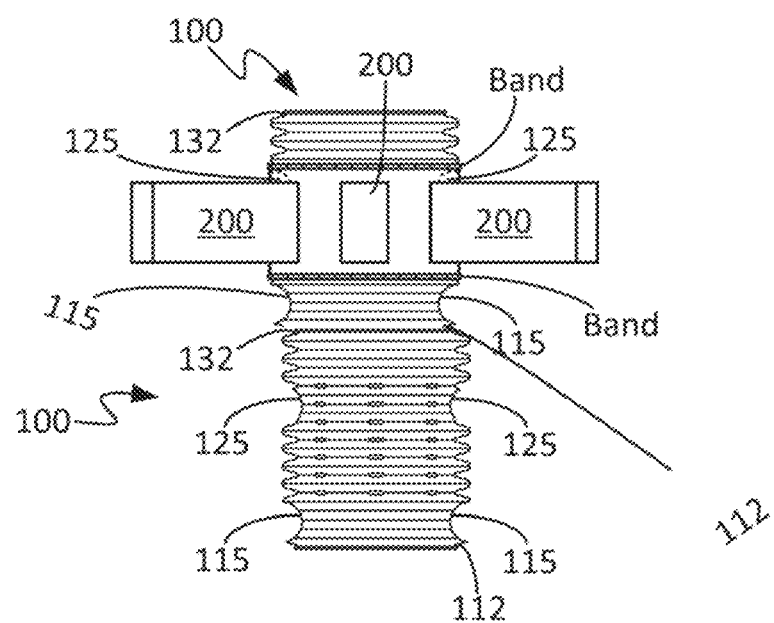
FIG. 18F shows a stacked central distribution unit arrangement in accordance with some embodiments of the present disclosure.
Figure 33:
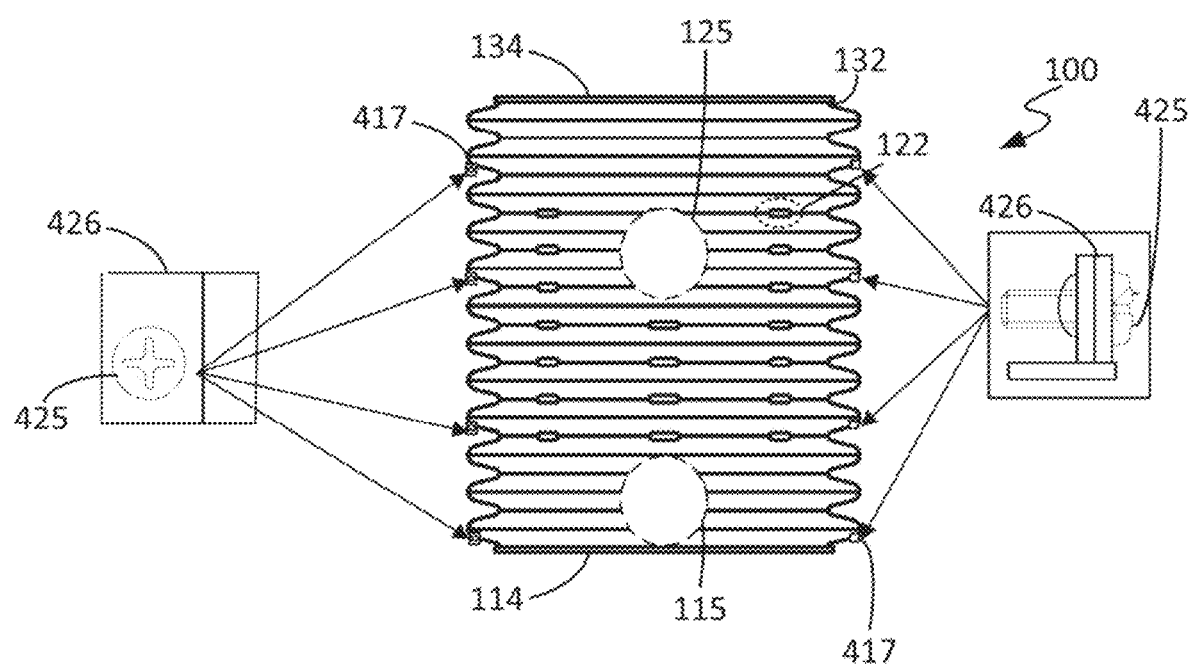
FIG. 33 illustrates an example embodiment of the present disclosure wherein the central distribution unit is configured to be split in half.

In FIG. 18F, a stacked central distribution unit arrangement, or stackable central distribution unit arrangement, is illustrated wherein a top central distribution unit 100 contains treatment fins 200 and a bottom central distribution unit 100 acts to support the top central distribution unit and provide a sump region. Alternative configurations are contemplated where the bottom central distribution unit 100 contains the treatment fins and the top central distribution unit has no treatment fins, as is shown for example in FIGS. 30B-C. This arrangement may be desirable in situations where more material cover is required above the top of the treatment fins to maintain a reduced distance to open the top of the system for inspection, for example. This arrangement may be desirable in multi-level systems where certain bottom units need a riser to provide access to the system and alternating units are positioned without a riser (FIGS. 30C-B). Two stackable central distribution units may be joined using alignment tabs 426 and screws 425 between the bottom central distribution unit and top central distribution unit as illustrated in FIG. 33 for central distribution units which are split in half. Such an arrangement may allow for easier access into a cover of the system if it were desired to perform an inspection. Such an arrangement may allow for minimal distance from the natural undisturbed soil to the top system cover in order to facilitate inspection. It is contemplated that a top cover of a stacked or stackable central distribution unit may be within 3 feet, within 2 feet, or may be less than 2 feet from access via natural undisturbed soil.

A single central distribution unit may be split in half along a vertical plane, or alternatively, along a horizontal plane. Two stackable central distribution units may be joined one on top of another. Joining of central distribution unit sections or portions may be accomplished using alignment tabs 426 and/or screws 425 between a first central distribution unit portion and a second central distribution unit portion. Alignment tabs 426 and screws 425 are illustrated in FIG. 33 for a distribution unit which is split in half along a vertical plane. Alignment tabs 426 and screws 425, or the like, may be used along a joint of a top central distribution unit 100 and a bottom central distribution unit 100 for securing stacked central distribution units 100.

Tightening or securing of the sleeve 427 around the central distribution unit 100 in combination with one or more apertures (e.g., perforations, tabs, or other openings/orifices) in the central distribution unit 100 may allow for an indirect flow pattern from central distribution unit 100 to treatment fins 200. It is contemplated that in one set of embodiments, an indirect flow pattern may be achieved in the following way. Wastewater is received via an inlet baffle into central distribution unit 100 and any dense constituents sink to the sump portion of the central distribution unit 100. Wastewater then exits the interior chamber of the central distribution unit 100 through one or more apertures into a common space formed between the sleeve 427 and the central distribution unit 100. The apertures can include inward facing skimmer tabs that can trap grease and solids to prevent them from clogging the apertures or the fins themselves. Treatment fins 200 are in fluid communication with the common reservoir space between the sleeve and the walls of the central distribution unit. From FIGS. 18A-B show that from the sleeve, wastewater may flow into any one of a plurality of treatment fins. In this manner, any one fin is not fixed exclusively to one passageway to the central distribution unit. One or more treatment fins may be connected to the central distribution unit with a set of tabs connecting the one or more treatment fins to the sleeve, with a male connector at the fin and a female connector at the sleeve, or using a reduced diameter plastic insert, for example. Thus, a fluid tight seal may be maintained between a treatment fin and the sleeve. Thus, if one or more apertures suffer from reduced flow due to, for example, a grease clog, all the fins will still be fed equally from other unobstructed apertures. This also means that if the central distribution unit becomes unleveled due to, for example, system sand disturbance, a now uphill facing fin will not be deprived of flow simply because its connection to the central distribution unit is raised above the level of waste water in the unit. Waste water exiting the central distribution unit on the opposite side from the fin will still reach the fin. It is contemplated that over the course of use, the treatment module 10 as a whole, the central distribution unit 100, or one or more treatment fins may fall into a temporary position that is not level.

In some embodiments, the treatment module 10 may be self-leveling. Self-leveling can be defined as being configured to achieve a level state following an event that caused the system to fall into a position that was not level. Self-leveling can be defined as being capable of passively redistributing waste water. Self-leveling can be defined as permitting fluid to passively flow from one treatment fin to another treatment fin via a passageway there between. Self-leveling can be defined as being configured to create a level alignment of a central distribution unit. Self-leveling can be defined as being configured to create a level alignment of a set of treatment fins. Self-leveling can be extended to include creating a level alignment between a set of central distribution units, which may or may not contain a set of treatment fins, through the passive redistribution of waste water.

It is contemplated that self-leveling may be achieved as a result of the indirect flow mechanism provided with the sheet/sleeve surrounding the central distribution unit and housing a common space for collecting wastewater prior to distribution into one or more treatment fins 200. FIGS. 18A-B show direction of fluid flow F. Fluid may flow freely in a direction F through and within sleeve 427 and through and within treatment fins 200, as sleeve 427 and treatment fins 200 are in fluid communication. For example, if the treatment module 10 found itself predisposed to the right, waste water would more easily flow into the treatment fin located at the right. This treatment fin would then receive a majority of wastewater flow and would subsequently fill up to capacity. Particularly with the flow rate being slowed down as the waste water undergoes treatment in each treatment fin 200, future incoming wastewater would subsequently be urged toward a different treatment fin 200 via the common space surrounding central distribution unit 100. As the other treatment fins 200 filled with waste water, this would help to re-establish equilibrium and leveling in the system. It is contemplated that the system would be capable of self-leveling via indirect flow of wastewater. It is contemplated that the system would be capable of self-leveling of the central distribution unit 100. It is contemplated that the system would be capable of self-leveling of the treatment fins 200.

Other suitable techniques for assembling one or more treatment fins 200 about a given central distribution unit 100 will depend on a given application and will be apparent in light of this disclosure. For instance, in accordance with some other embodiments, treatment fins 200 may be assembled (e.g., with one another and/or central distribution unit 100) with a hook-and-loop fastener fabric, such as VELCRO® fabric, or other suitable fastener material. In accordance with some other embodiments, a given treatment fin 200 optionally may include stitching along one or more of its sides (e.g., such as is generally shown in FIG. 18C and FIG. 46). For example, a treatment fin 200 may include stitching that passes from one side thereof, through its body, to another side thereof. In some cases in which treatment fin 200 is formed using a fabric or other flexible material, tightening of the stitching may cause the sides of the treatment fin 200 to draw inwards toward one another, producing localized puckering or other dimpling of the flexible material (e.g., of media retention layer 220). In some such instances, this may form generally cell-like pockets or pillowed regions along the treatment fin 200. The presence of such optional stitching may provide additional structural support for the form of the treatment fin 200, in some instances. In some cases in which a pipe 303/305 is included within treatment fin 200, such optional stitching may help to support and/or physically separate such elements (e.g., pipe 303 may reside above the stitching, whereas pipe 305 may reside below the stitching).

Exemplary System Installations and Arrangements

Treatment module 10 may be configured, in accordance with some embodiments, to be installed, in part or in whole, above the ground and/or within the ground. When installed, the central distribution unit 100 of a given module 10 may be oriented substantially vertically (e.g., within 10° of vertical) with respect to the ground or other installation site, in accordance with some embodiments. In some such cases, the one or more treatment fins 200 associated therewith may be oriented substantially horizontally (e.g., within 10° of horizontal) with respect to the ground or other installation site. In an example case, a given treatment fin 200 may extend substantially parallel (e.g., precisely parallel or otherwise within a given tolerance) to the surface of the ground. In some other embodiments, however, the central distribution unit 100 of a given module 10 may be oriented substantially horizontally (e.g., precisely horizontally or otherwise within a given tolerance) with respect to the ground or other installation site. In some such cases, the one or more treatment fins 200 may be oriented substantially vertically (e.g., within 10° of vertical) with respect to the ground or other installation site. In an example case, a given treatment fin 200 may extend substantially perpendicular (e.g., precisely perpendicular or otherwise within a given tolerance) to the surface of the ground. Numerous configurations will be apparent in light of this disclosure.

In some embodiments, a given treatment module 10 may be configured in a general hub-and-spoke arrangement, with its central distribution unit 100 as the hub and its one or more treatment fins 200 as the spoke(s). In some cases, a plurality of treatment fins 200 may be arranged about a central distribution unit 100 such that they lay within a common plane along the length of unit 100, whereas in some other cases, a plurality of fins 200 may be provided in a spiral, helical, or otherwise staggered arrangement along the length of unit 100. In some instances, the treatment fins 200 of a given treatment module 10 may be configured such that a horizontal plane passes through all (or some sub-set) thereof. In accordance with some embodiments, the space around the central distribution unit 100 and the one or more treatment fins 200 of a given treatment module 10 may be backfilled, for example, with system sand (and/or any other suitable dispersal, treatment, filtration, or support media), and topsoil may be disposed thereover. The presence of such supplemental treatment media may provide for further treatment of liquid draining from a given treatment fin 200 before such liquid enters into the surrounding/underlying soil, in accordance with an embodiment.

Figure 19A:
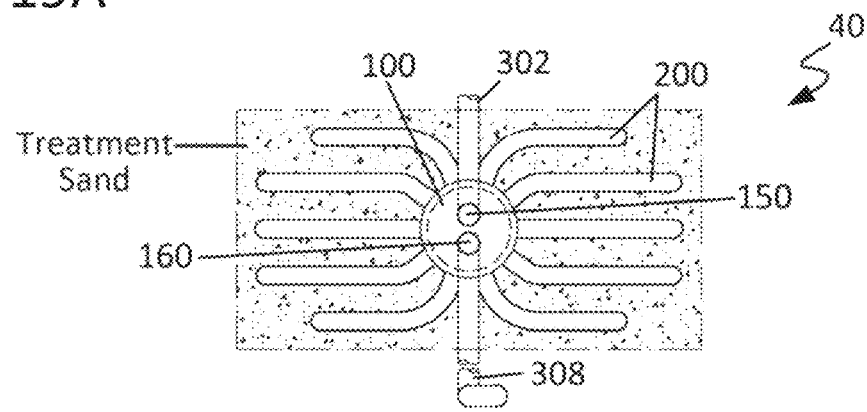
FIG. 19A is a plan view of a rectangular treatment cell configured in accordance with an embodiment of the present disclosure.
Figure 19B:
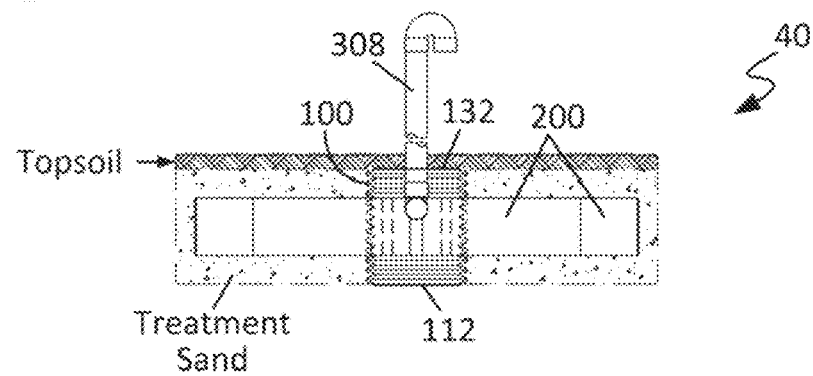
FIG. 19B is a side view of the rectangular treatment cell of FIG. 19A.
Figure 19C:
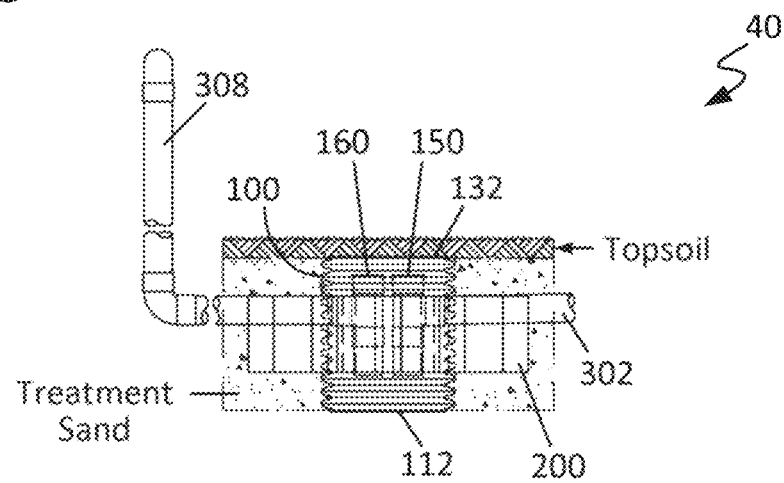
FIG. 19C is another side view of the rectangular treatment cell of FIG. 19A.

The arrangement of treatment fins 200 and surrounding system sand can be customized to provide a treatment cell 40 (or treatment cell 50, discussed below) having a treatment module 10 of a given configuration, as desired for a given target application or end-use. For instance, consider FIGS. 19A-19C, which illustrate several views of a rectangular treatment cell 40 configured in accordance with an embodiment of the present disclosure. In some cases, treatment fins 200 may be at substantially the same height with respect to one another along the length of central distribution unit 100 (e.g., as in FIG. 19B). However, as previously noted above with respect to FIG. 1C, in some other cases, a first treatment fin 200 may be vertically offset from a second treatment fin 200 by a vertical distance ($\Delta Y$) along the length of unit 100. In some example cases, first and second treatment fins 200 may be separated by a vertical offset distance ($\Delta Y$), for example, in the range of about 0.5-6.0 inches (e.g., about 0.5-2.0 inches, about 2.0-4.0 inches, about 4.0-6.0 inches, or any other sub-range in the range of about 0.5-6.0 inches). Greater or lesser vertical offset distance ($\Delta Y$) values may be provided, as desired. In some such cases in which the treatment fins 200 are staggered in this manner, liquid waste may accumulate within central distribution unit 100, reaching each fin 200 in succession up the length of unit 100, in accordance with an embodiment.

Figure 23A:
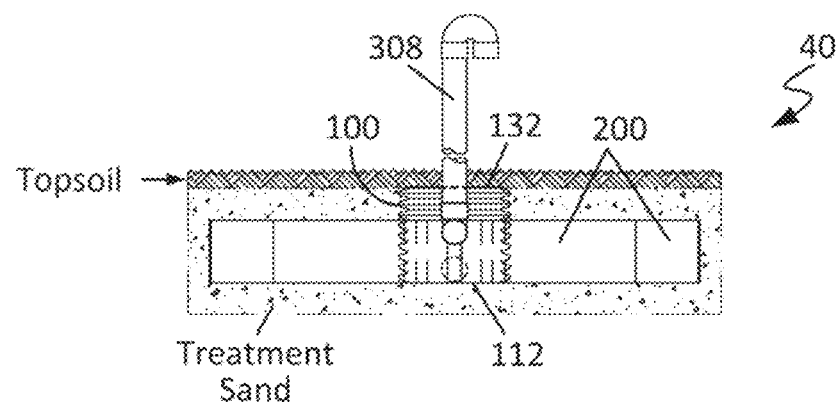
FIG. 23A is a side view of a rectangular treatment cell configured in accordance with another embodiment of the present disclosure.
Figure 23B:
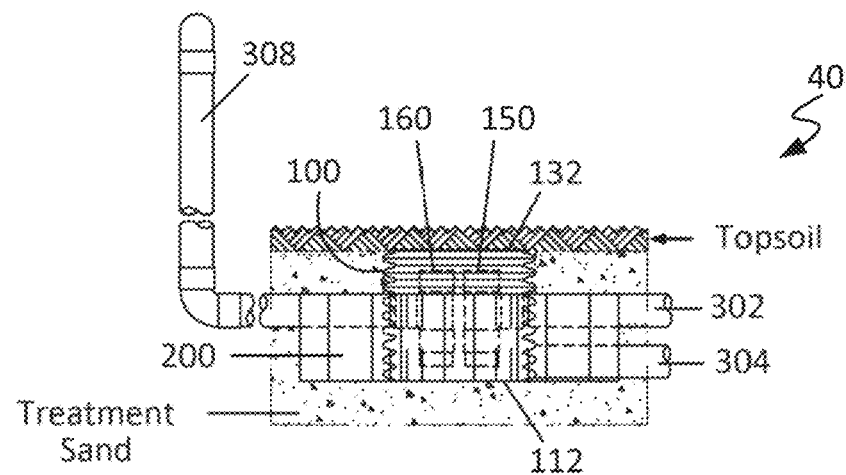
FIG. 23B is another side view of the rectangular treatment cell of FIG. 23A.

In some instances, a given treatment fin 200 may be arranged such that its major axis is substantially parallel with the longitudinal axis of an associated central distribution unit 100. In some other instances, a given treatment fin 200 may be arranged such that its major axis is offset in alignment with respect to the longitudinal axis of an associated central distribution unit 100. For example, a treatment fin 200 may be oriented such that its major axis is offset from the longitudinal axis of a unit 100 by about 45° (e.g., ±5°), by about 90° (e.g., ±5°), or by any other angle, as desired for a given target application or end-use. Also, consider FIGS. 23A-23B, which illustrate several views of a rectangular treatment cell 40 configured in accordance with another embodiment of the present disclosure. As can be seen here, a central distribution unit 100 may have a truncated sump portion 110 (e.g., as previously discussed with respect to FIGS. 7A-7D), thereby reducing the total vertical depth of an installed treatment module 10, in accordance with an embodiment.

Figure 20A:
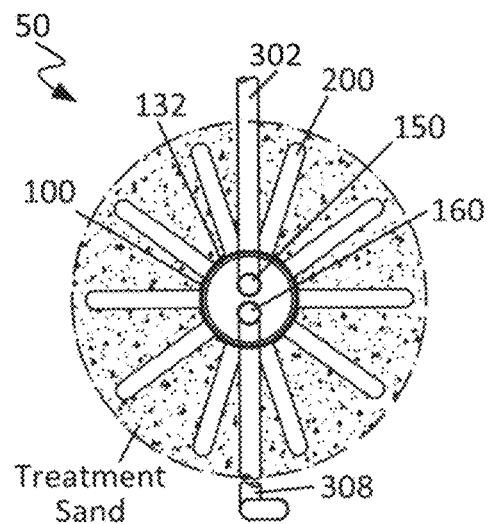
FIG. 20A is a plan view of a rounded treatment cell configured in accordance with an embodiment of the present disclosure.
Figure 20B:
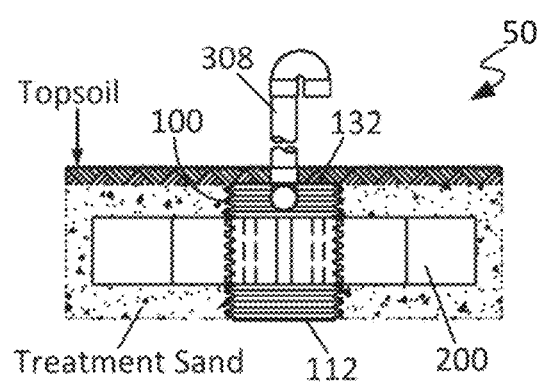
FIG. 20B is a side view of the rounded treatment cell of FIG. 20A.
Figure 20C:
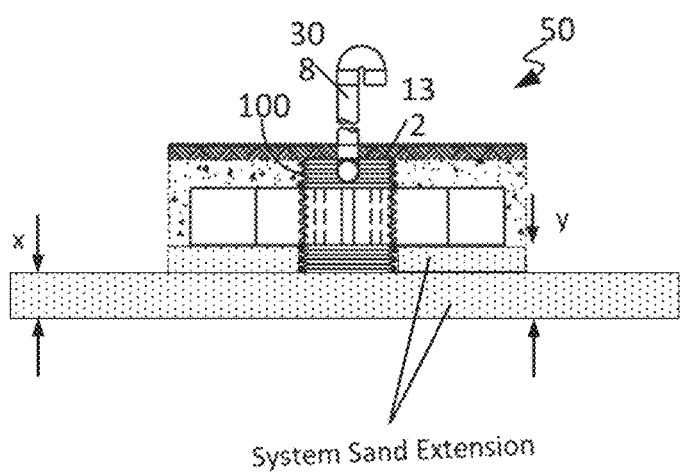
FIG. 20C is a side view illustrating a system sand extension in one embodiment of the present disclosure.
Figure 20D:
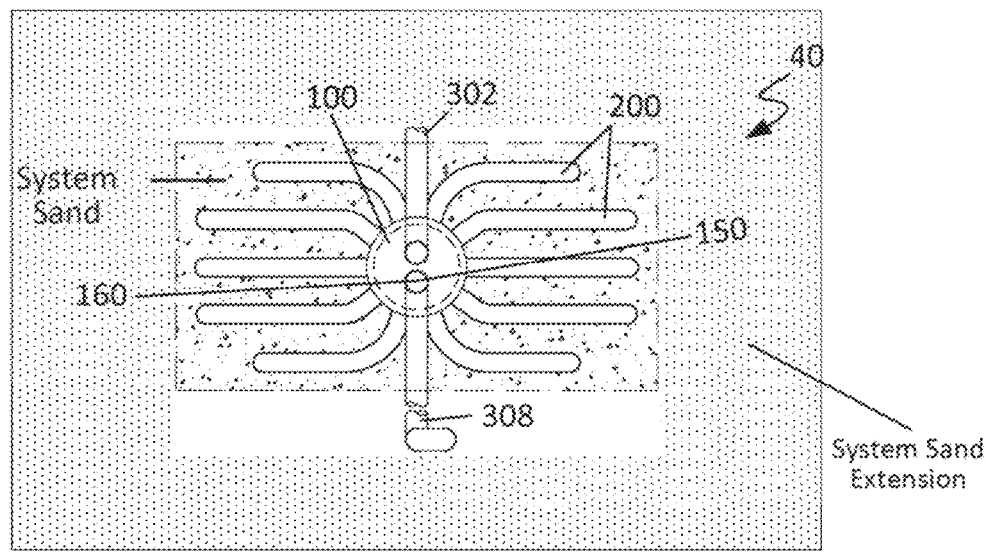
FIG. 20D is a top view illustrating a system sand extension in one embodiment of the present disclosure.
Figure 21B:
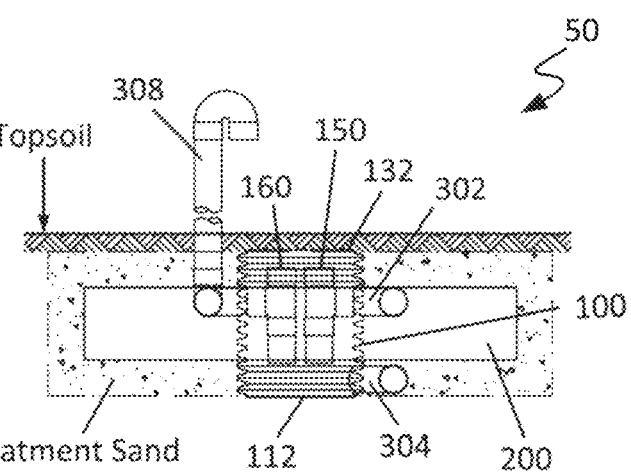
FIG. 21B is a side view of the rounded treatment cell of FIG. 21A.

It should be noted, however, that the present disclosure is not so limited only to rectangular treatment cell configurations. For instance, consider FIGS. 20A-20B, which illustrate several views of a rounded treatment cell 50 configured in accordance with an embodiment of the present disclosure, and FIGS. 21A-21B, which illustrate several views of a rounded treatment cell 50 configured in accordance with another embodiment of the present disclosure. As can be seen from these figures, in some cases, treatment fins 200 may be arranged about central distribution unit 100 in a generally linear-radial configuration (e.g., as in FIG. 20A), whereas in some other cases, a generally spiraled-radial arrangement of treatment fins 200 may be provided (e.g., as in FIG. 21A). FIG. 20C highlights system sand positioned below the central distribution unit as well as below the treatment fins. In some embodiments shown in FIG. 20C, distance x, which is a depth of system sand positioned below the central distribution unit, may be between about 2" and about 8", between about 2.5" and about 6", or between about 3" and about 4". In some embodiments shown in FIG. 20C, distance y, which is a depth of sand below the treatment fins, may be between about 5" and about 11", between about 5.5" and about 9", or between about 6" and about 7". The lower portion of the system sand may extend a greater width than the width of the treatment unit. Furthermore, consider FIG. 22, which illustrates a rounded treatment cell 50 configured in accordance with another embodiment of the present disclosure. As can be seen here, in some cases, a multi-faceted central distribution unit 100 may be provided, and multiple treatment fins 200 may be in flow communication with a given side/facet of such unit 100, in accordance with some embodiments. Other suitable treatment cell geometries (e.g., curvilinear; polygonal) will depend on a given application and will be apparent in light of this disclosure.

In accordance with some embodiments, multiple treatment modules 10 may be operatively coupled with one another. The quantity and arrangement of modules 10 can be customized, as desired for a given target application or end-use. In some cases, a plurality of treatment modules 10 may be arranged, for example, in a straight trench arrangement, a curved trench arrangement, a substantially horizontal planar arrangement on a hill, a graded arrangement (e.g., within ±25° of horizontal), a bed arrangement, a tiered arrangement, and/or a serial distribution arrangement. Multiple treatment modules 10 may be coupled in a linear or non-linear fashion, as desired. Multiple treatment modules 10 may be coupled in series and/or parallel arrangements, as desired. The spacing of treatment modules 10 may be customized, for example, to adjust the distribution of liquid waste across such system and/or the total system footprint.

Figures 24A, 24B, 24C:
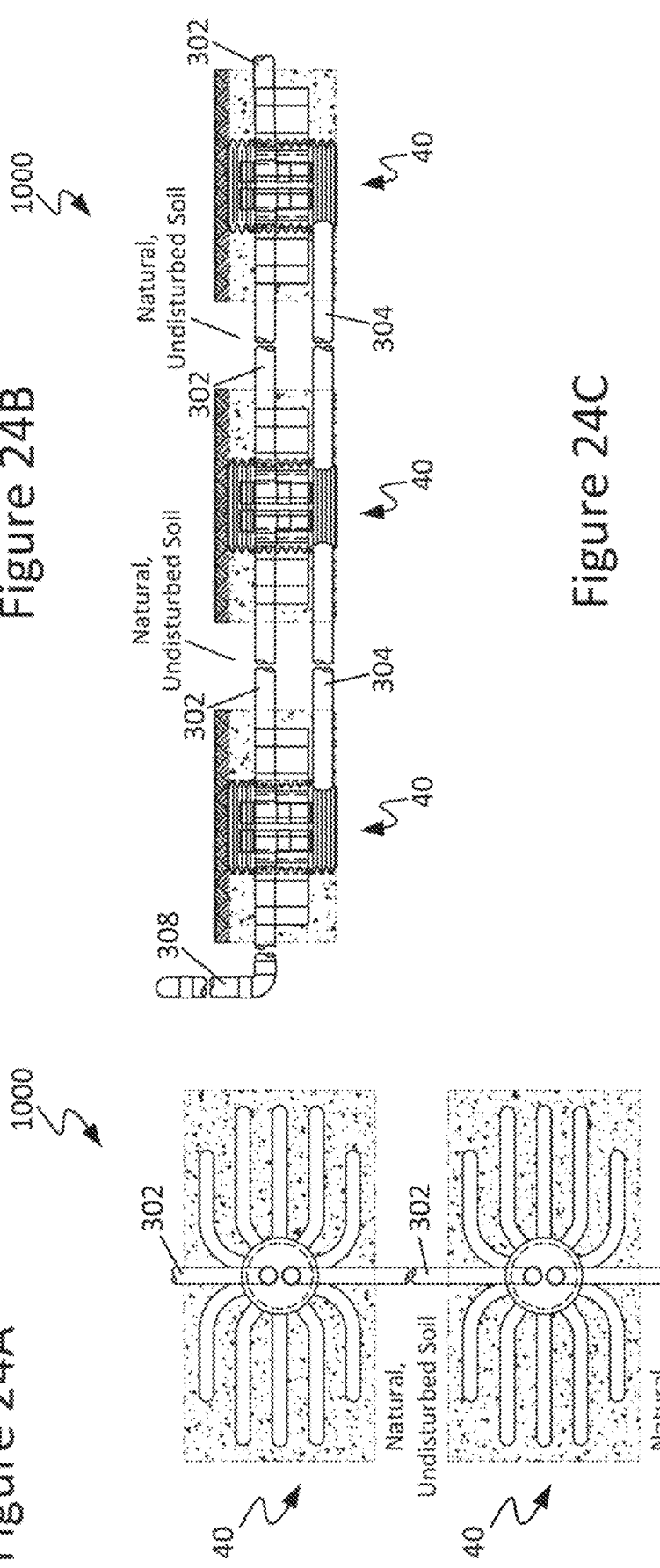
FIG. 24A is a plan view of a serial arrangement of rectangular treatment cells configured in accordance with an embodiment of the present disclosure.
FIG. 24B is a side view of the serial arrangement of FIG. 24A.
FIG. 24C is another side view of the serial arrangement of FIG. 24A.
Figure 25A:
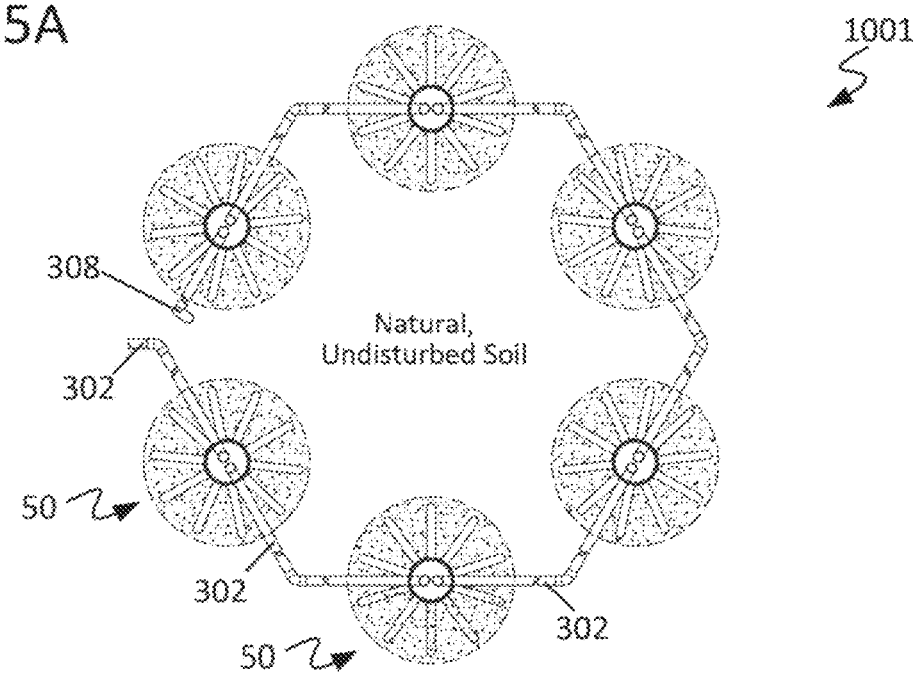
FIG. 25A is a plan view of a serial arrangement of rounded treatment cells configured in accordance with an embodiment of the present disclosure.
Figure 25B:
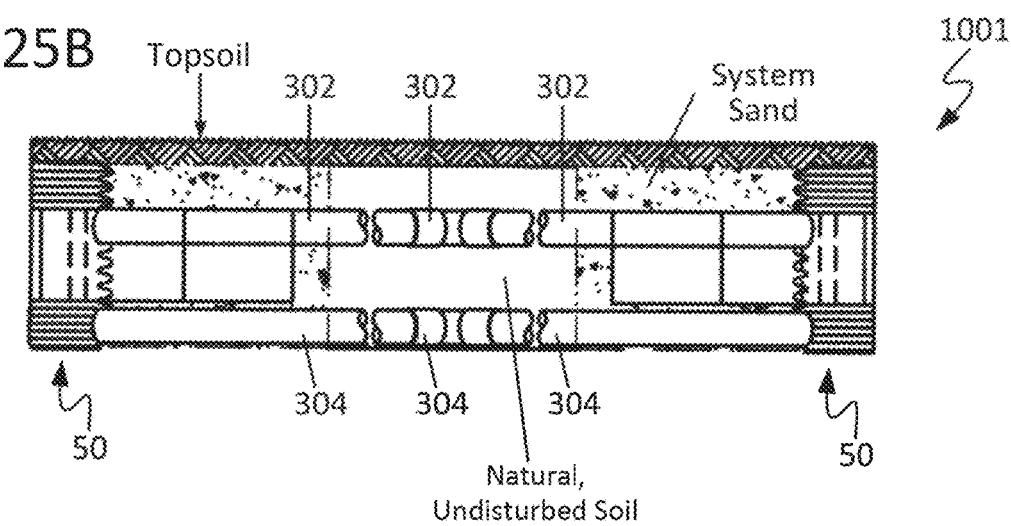
FIG. 25B is a partial side view of the serial arrangement of FIG. 25A.
Figure 25C:
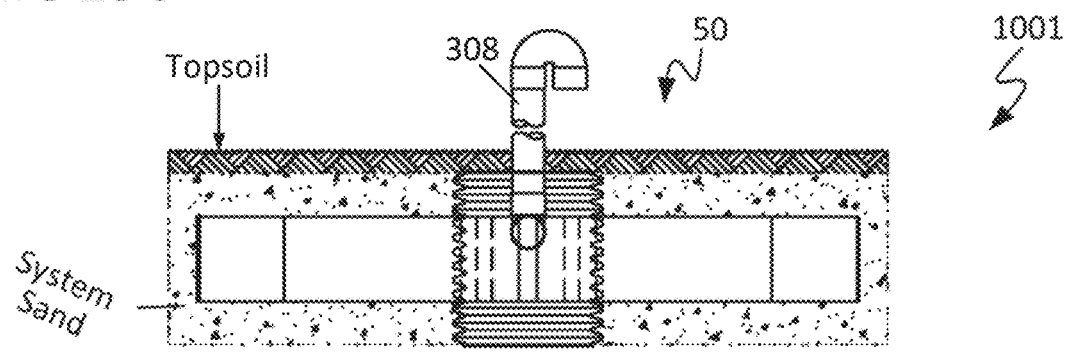
FIG. 25C is another side view of the serial arrangement of FIG. 25A.

FIGS. 24A-24C illustrate several views of a serial arrangement 1000 of rectangular treatment cells 40 configured in accordance with an embodiment of the present disclosure. FIGS. 25A-25C illustrate several views of a serial arrangement 1001 of rounded treatment cells 50 configured in accordance with another embodiment of the present disclosure. As can be seen from these figures, multiple treatment modules 10 of multiple treatment cells 40 may be connected with one another via a plurality of pipes 302 and/or fluid equalization pipes 304. A first treatment cell 40 in a given series may be coupled with a source of liquid waste via a pipe 302, and the last treatment cell 40 in the series may be coupled with a vent stack 308 via a pipe 302. As can be seen further, the mid-portions 120 of the central distribution units 100 may be coupled in flow communication with one another via pipes 302 (e.g., serial feed pipes), and the sump portions 110 thereof may be coupled in flow communication with one another via pipes 304 (e.g., fluid equalization pipes). A given pipe 302/304 may be any standard and/or custom pipe/conduit, and the geometry, size, and material composition of a given pipe 302/304 can be customized, as desired for a given target application or end-use. In accordance with some embodiments, pipe 302 and/or pipe 304 may be formed from an impermeable material to prevent or otherwise reduce leakage of liquid waste migrating between central distribution units 100 in flow communication with one another. To that end, a given pipe 302/304 may be formed from any of the example material(s) discussed above, for instance, with respect to central distribution unit 100, in accordance with some embodiments.

Figure 26A:
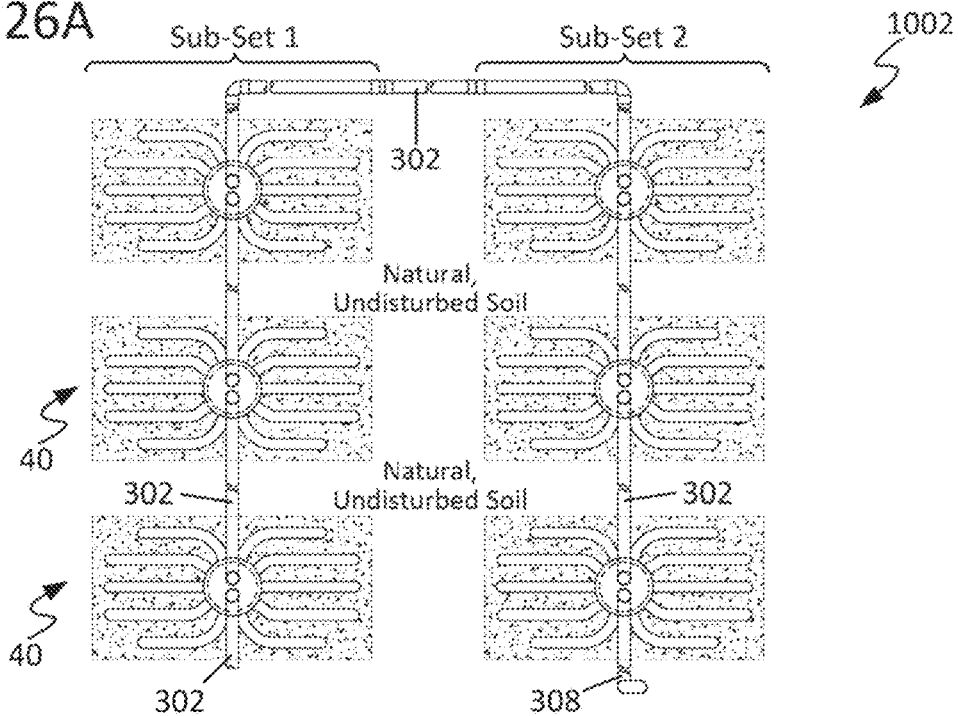
FIG. 26A is a plan view of a terraced serial arrangement of rectangular treatment cells configured in accordance with an embodiment of the present disclosure.
Figure 26B:
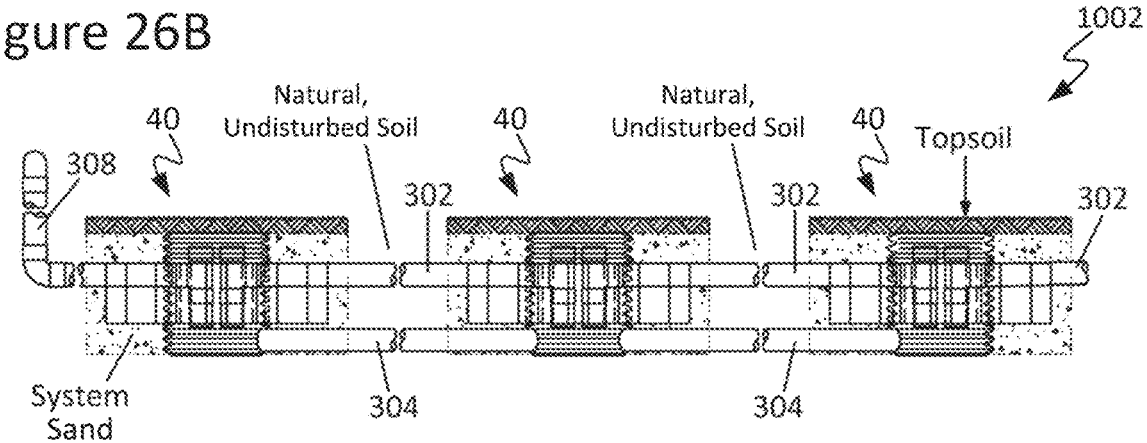
FIG. 26B is a side view of the terraced serial arrangement of FIG. 26A.
Figure 26C:
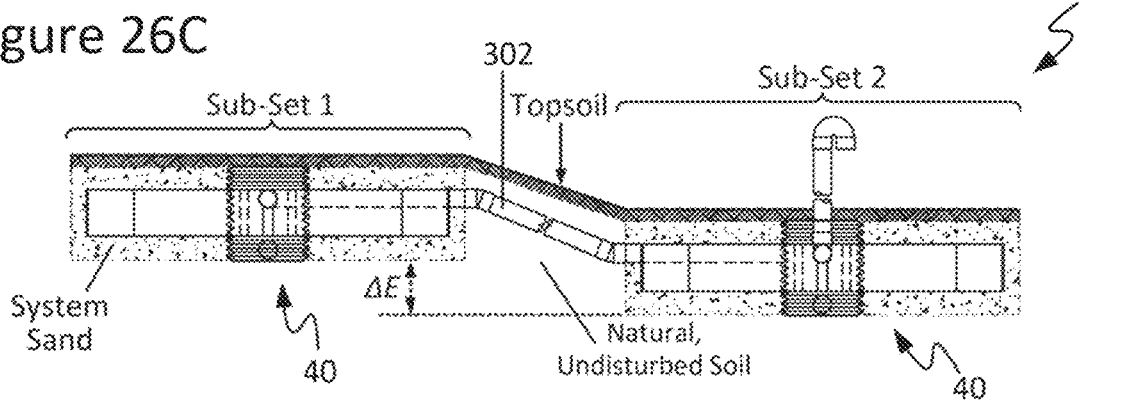
FIG. 26C is another side view of the terraced serial arrangement of FIG. 26A.
Figure 27A:
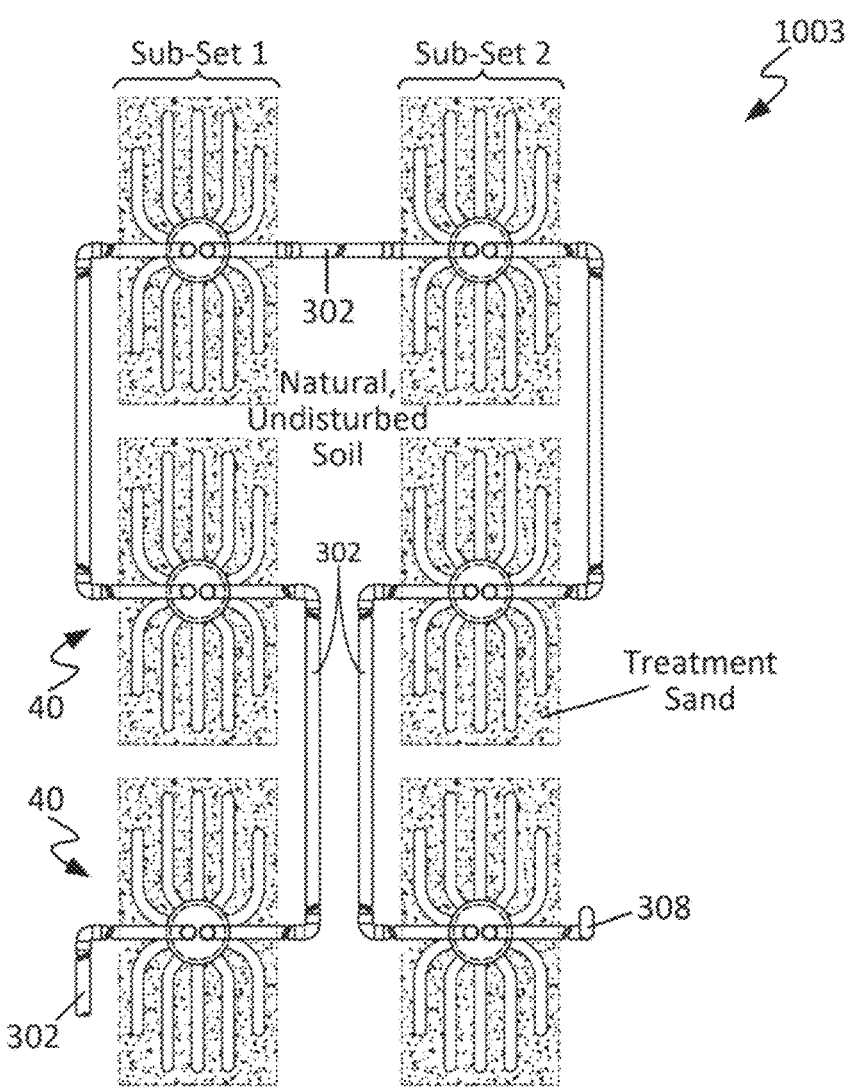
FIG. 27A is a plan view of a narrow/consolidated terraced serial arrangement of rectangular treatment cells configured in accordance with another embodiment of the present disclosure.
Figure 27B:
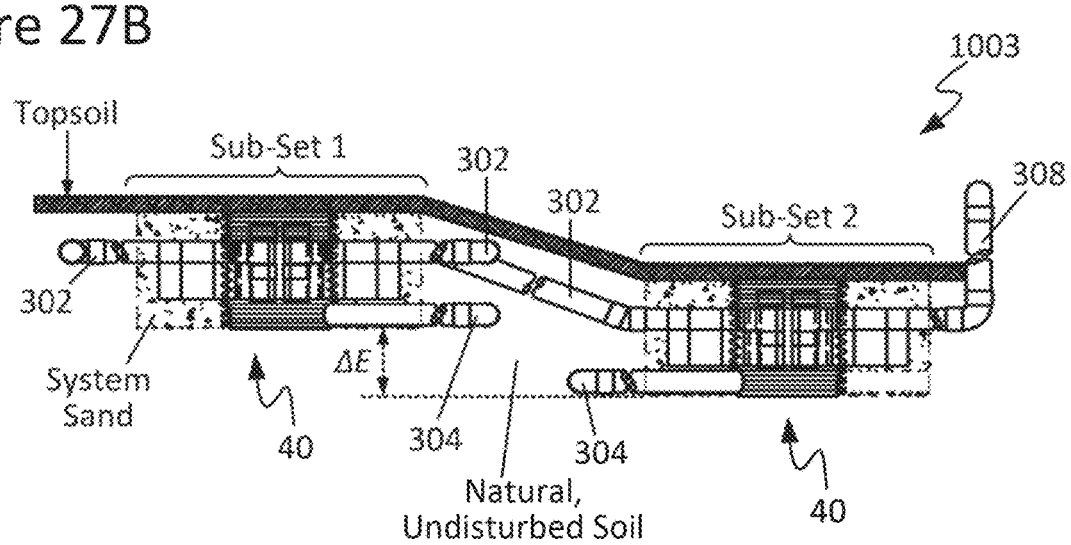
FIG. 27B is a side view of the narrow/consolidated terraced serial arrangement of FIG. 27A.
Figure 28A:
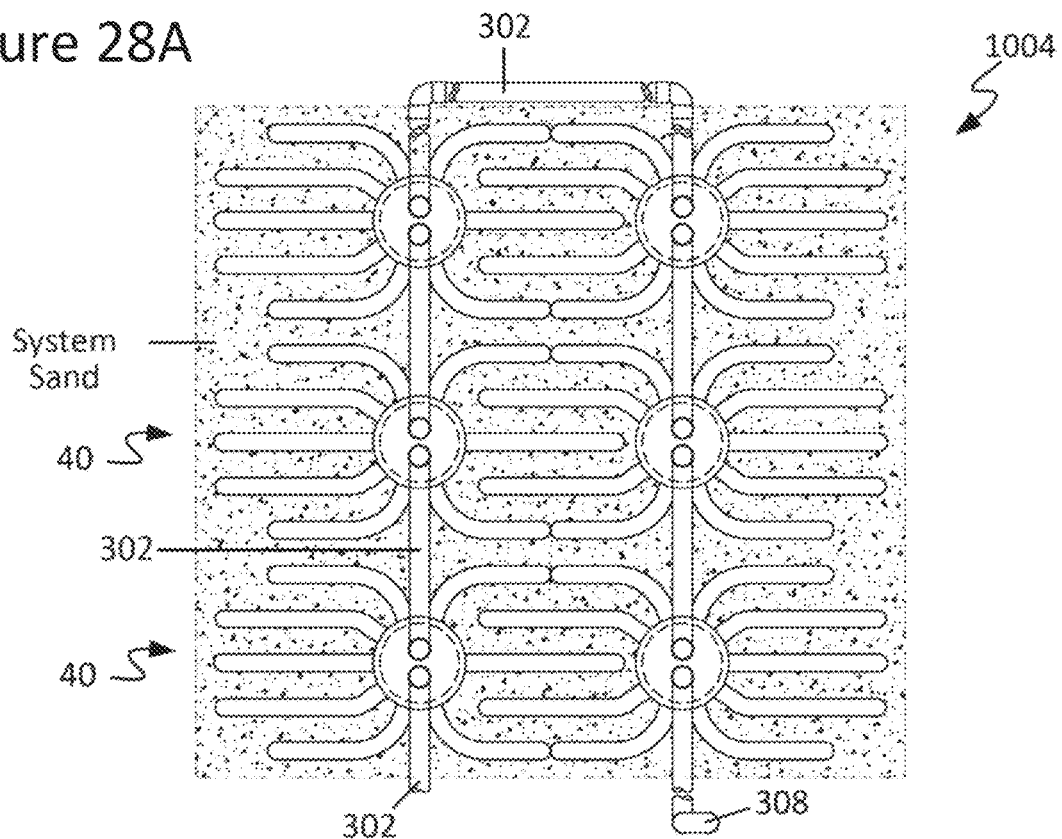
FIG. 28A is a plan view of an interlocking serial arrangement of rectangular treatment cells configured in accordance with an embodiment of the present disclosure.
Figure 28B:
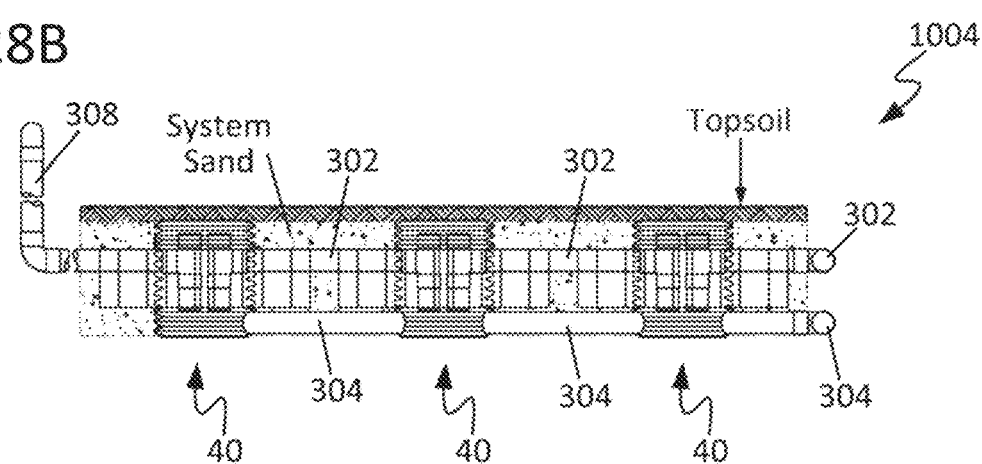
FIG. 28B is a side view of the interlocking serial arrangement of FIG. 28A.
Figure 28C:
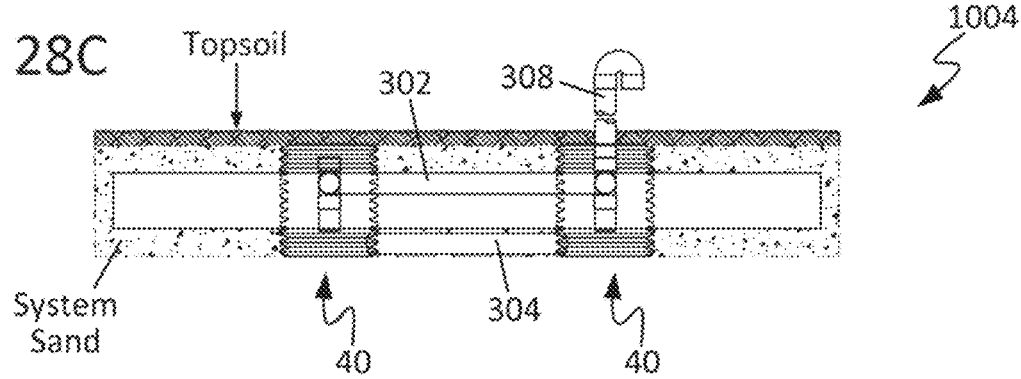
FIG. 28C is another side view of the interlocking serial arrangement of FIG. 28A.

FIGS. 26A-26C illustrate several views of a terraced serial arrangement 1002 of rectangular treatment cells 40 configured in accordance with an embodiment of the present disclosure. FIGS. 27A-27B illustrate several views of a narrow/consolidated terraced serial arrangement 1003 of rectangular treatment cells 40 configured in accordance with another embodiment of the present disclosure. As can be seen, a first sub-set (Sub-Set 1) of rectangular treatment cells 40 may be vertically offset from a second sub-set (Sub-Set 2) thereof by a vertical offset distance (ΔE). The vertical offset distance (ΔE) can be customized, as desired for a given target application or end-use. In accordance with some embodiments, the vertical offset distance (ΔE) may be selected such that the flow of liquid waste from a first central distribution unit 100 of a first cell 40 to a second central distribution unit 100 of a second cell 40 is within about 25 degrees of horizontal. As can be seen further, in some cases, natural, undisturbed soil may remain between the rectangular treatment cells 40 (e.g., adjacent to the system sand, if provided). In some other cases, however, the soil may be removed and replaced with system sand (and/or other dispersal, treatment, filtration, or support media). For instance, consider FIGS. 28A-28C, which illustrate several views of an interlocking serial arrangement 1004 of rectangular treatment cells 40 configured in accordance with an embodiment of the present disclosure. As can be seen here, the treatment fins 200 of the constituent treatment cells 40 may be arranged so as to at least partially interlock, overlap, or otherwise reside adjacent to one another to facilitate a reduction in the overall system footprint, in accordance with an embodiment. In a more general sense, a first treatment cell 40 or 50 having a first areal footprint (e.g., of X ft$^2$) and a second treatment cell 40 or 50 having a second areal footprint (e.g., Y ft$^2$) may be installed or otherwise arranged such that the first and second areal footprints at least partially overlap one another (e.g., the installation/arrangement is less than X ft$^2$+Y ft$^2$). In some instances, the treatment cells 40 or 50 may be arranged without inclusion of any soil there between; that is, system sand (and/or any other suitable dispersal, treatment, filtration, or support media) may fill the interstitial space between neighboring treatment cells 40 or 50. As will be appreciated in light of this disclosure, the areal footprint of a given treatment cell 40 or 50 may be substantially conformal to the constituent components of a given treatment module 10 (or treatment cell 40 or 50), or it may be the smallest (or other specified) area fitted by a geometric shape (e.g., circle, ellipse, rectangle, square, etc.) that substantially encompasses it (e.g., when viewed from a top-down plan view).

FIGS. 29A-29B illustrate several views of an arrangement 1005 of rectangular treatment cells 40 including a distribution box 306 configured in accordance with an embodiment of the present disclosure. As can be seen here, a distribution box 306 optionally may be in flow communication with one or more downstream treatment cells 40. Distribution box 306 may be configured as typically done and may serve to deliver liquid waste to one or more downstream central distribution units 100 from an upstream source (e.g., septic tank).

FIGS. 30A-30C illustrate several views of a multi-level arrangement 1006 of rectangular treatment cells 40 configured in accordance with an embodiment of the present disclosure. As can be seen here, a first tier (Tier 1) of rectangular treatment cells 40 may be disposed at a first depth (e.g., with respect to the ground), and a second tier (Tier 2) may be disposed at a second, different depth (e.g., with respect to the ground). The quantity of tiers, the quantity of treatment cells 40 per tier, and the depth of a given constituent treatment cell 40 may be customized, as desired for a given target application or end-use. It may be desirable, in some instances, to extend the length of the headspace portion 130 of a given central distribution unit 100 of a given lower tier, for example, up to or above the ground surface to facilitate access to the interior hollow 105 thereof (e.g., for cleaning). In some cases, a distribution box 306 may be included to facilitate distribution of liquid waste between constituent tiers.

FIGS. 31A-31C illustrate several views of a serial arrangement 1007 of rectangular treatment cells 40 configured in accordance with another embodiment of the present disclosure. As can be seen in this example case, arrangement 1007 is configured for single point discharge. To that end, arrangement 1007 includes a containment liner 320, drainage material 322, and a collection pipe 324, in accordance with an embodiment. It should be noted, however, that the present disclosure is not so limited, as in some other embodiments, multiple discharge/collection points may be provided, as desired.

Liner 320 may serve, at least in part, to collect treated liquid that has passed through a given treatment fin 200 of a given treatment module 10 and to prevent that treated liquid from freely draining to the surrounding soil (or other installation site). To that end, optional liner 320 may be formed from any suitable impermeable or semi-permeable material (or combination of such materials) including, for example: clay; a plastic; a metal (e.g., steel); concrete; and/or a combination of any one or more thereof. In a more general sense, optional liner 320 can be formed from any of the example materials discussed above, for instance, with respect to optional media retention layer 220 and optional internal barrier layer 230. In some instances, a first portion of optional liner 320 may be provided with a first degree of permeability (or impermeability), whereas a second portion thereof may be provided with a second, different degree of permeability (or impermeability). For example, a bottom portion of liner 320 may be more permeable than a side portion thereof. Numerous configurations and variations will be apparent in light of this disclosure. In some cases, liner 320 may be flexible (e.g., a bag or sheet), whereas in some other cases, a rigid or semi-rigid liner 320 (e.g., a bin or housing) may be provided. In some instances, optional liner 320 may be affixed to or otherwise supported by a frame (e.g., a metal frame; a composite frame; a wooden frame; etc.), the dimensions of which may be selected, at least in part, based on the dimensions of the one or more treatment modules 10 with which it is associated. In some cases, optional liner 320 may include one or more coatings (e.g., a sealant). The thickness of liner 320 may be customized, as desired for a given target application or end-use, and in some example cases may be in the range of about 0.01-2.0 inches (e.g., about 0.01-0.1 inches, about 0.1-0.5 inches, about 0.5-1.0 inches, about 1.0-1.5 inches, about 1.5-2.0 inches, or any other sub-range in the range of about 0.01-2.0 inches). Other suitable configurations for liner 320 will depend on a given application and will be apparent in light of this disclosure.

Drainage material 322 may be disposed between a given treatment module 10 and underlying liner 320. Drainage material 322 may include any of the example materials (e.g., aggregate, coarse material, fibers, etc.) discussed above, for instance, with respect to porous material 210, in accordance with some embodiments. In some cases, a constituent piece/portion of such drainage material 322 may have an average thickness (e.g., width/diameter), for instance, of: about ⅟₆₄ inch or greater; about ⅟₃₂ inch or greater; about ⅟₁₆ inch or greater; about ⅛ inch or greater; about ¼ inch or greater; about ⅜ inch or greater; about ½ inch or greater; about 1 inch or greater; or about 1½ inches or greater. In some cases, a constituent piece/portion of such drainage material 322 may have an average length, for instance, in the range of about 0.25-1.5 inches (e.g., about 0.25-0.5 inches, about 0.5-0.75 inches, about 0.75-1.0 inches, about 1.0-1.25 inches, about 1.25-1.5 inches, or any other sub-range in the range of about 0.25-1.5 inches). Other suitable drainage materials 322 will depend on a given application and will be apparent in light of this disclosure.

As can be seen, collection pipe 324 may be disposed, at least in part, within drainage material 322 under a given treatment module 10. In accordance with some embodiments, collection pipe 324 may be formed from any of the example materials discussed above, for instance, with respect to central distribution unit 100. Also, the dimensions of collection pipe 324 may be customized, as desired for a given target application or end-use. In accordance with an embodiment, collection pipe 324 may be configured to receive treated liquid that has passed through drainage material 322 and to deliver that treated liquid downstream to an outlet point 325. To that end, collection pipe 324 may have one or more apertures (e.g., holes, perforations, elongate slots, or other orifices) defined in its sidewall, allowing liquid to flow into pipe 324. In accordance with an embodiment, the end of collection pipe 324 having outlet point 325 may pass through liner 320. In some such cases, a bulkhead (or other suitable interface) may be included at the location where collection pipe 324 passes through liner 320 to provide a liquid-tight sealing arrangement between pipe 324 and liner 320. Collection pipe 324 may have any desired geometry (e.g., linear, V-shaped, etc.), and in some instances may be graded (e.g., within about 25 degrees of horizontal). Other suitable configurations for collection pipe 324 will depend on a given application and will be apparent in light of this disclosure.

In accordance with some embodiments, liquid received from outlet point 325 of collection pipe 324 may be directed, for example, back into an upstream septic tank and/or one or more additional treatment systems or devices. For instance, treated liquid may be collected from collection pipe 324 and subjected to one or more additional treatment processes, such as: nitrification; denitrification; chlorination; ultraviolet germicidal irradiation (UVGI) or other disinfection process; recirculation; and/or any other desired liquid waste treatment process, as desired for a given target application or end-use. It should be noted that any of the example system arrangements (e.g., arrangements 1000, 1001, 1002, 1003, 1004, 1005, 1006, and/or 1007) discussed herein may utilize rectangular treatment cells 40, rounded treatment cells 50, and/or any other treatment cell geometry, as desired, in accordance with some embodiments. Numerous suitable configurations and arrangements will be apparent in light of this disclosure.

In some cases, a given treatment module 10 may be coupled with a recharge pipe or other access point by which substances such as, for instance, nutrients, additives, micro-organisms, carbon, and/or sulfur, among others, may be delivered without having to dig up or otherwise disassemble the treatment system. In some instances, such an access point may facilitate bacterial injection/seeding. In accordance with some embodiments, accumulated sludge/solids may be removed from a given central distribution unit 100, for example, by removing cover 134 (if optionally included) and vacuuming out sump portion 110. In some instances, a given central distribution unit 100 may be cleaned out individually. In some cases, connections between sump portions 110 of coupled central distribution units 100 (e.g., via pipes 304) may facilitate cleaning across multiple central distribution units 100.

The following description relates to the method of assembly and method of collapse for shipment of a treatment system module, discussed above in the General Overview section.

Figure 45:
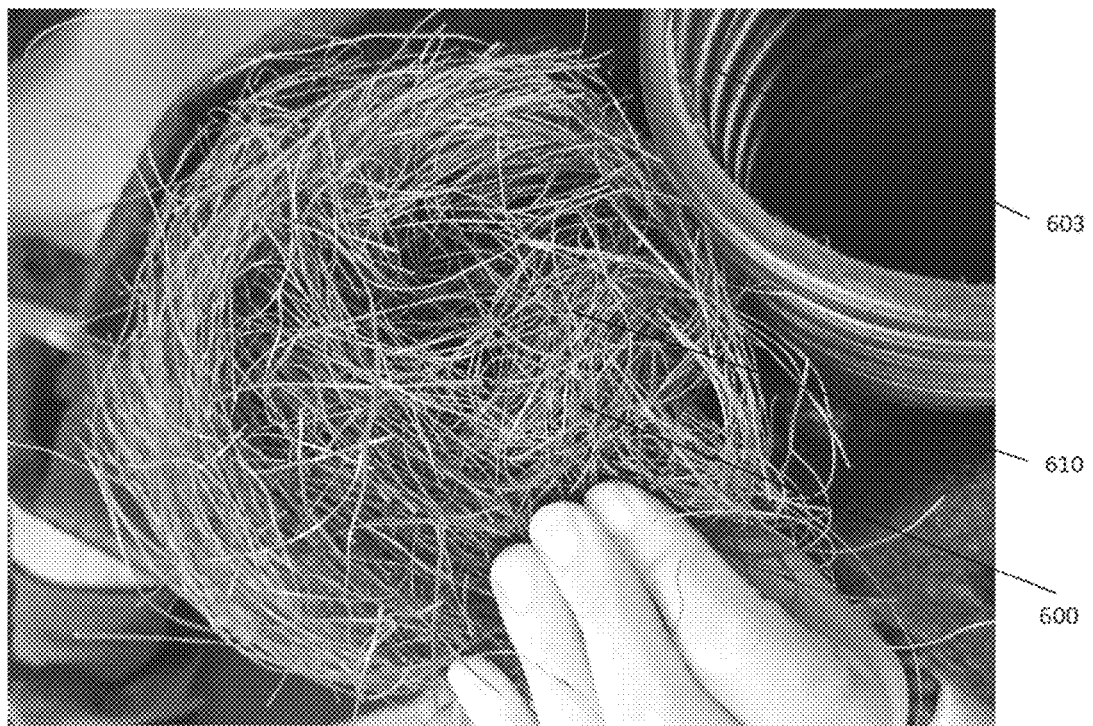
FIG. 45 illustrates components of an example treatment fin utilizing a compressed fiber layer adjacent to a conduit, in one embodiment of the disclosure.

FIGS. 45-46 show an embodiment of partly disassembled fin comprising a perforated pipe 603, a mass of lightly compressed fiber 600 which comprises the lower sub-portion 610 of a fin. The components are shown contained within and outer fabric layer in FIG. 46, with fasteners 602, spaced apart along a stich line, holding together opposing sides of the fabric layer.

Figure 47:
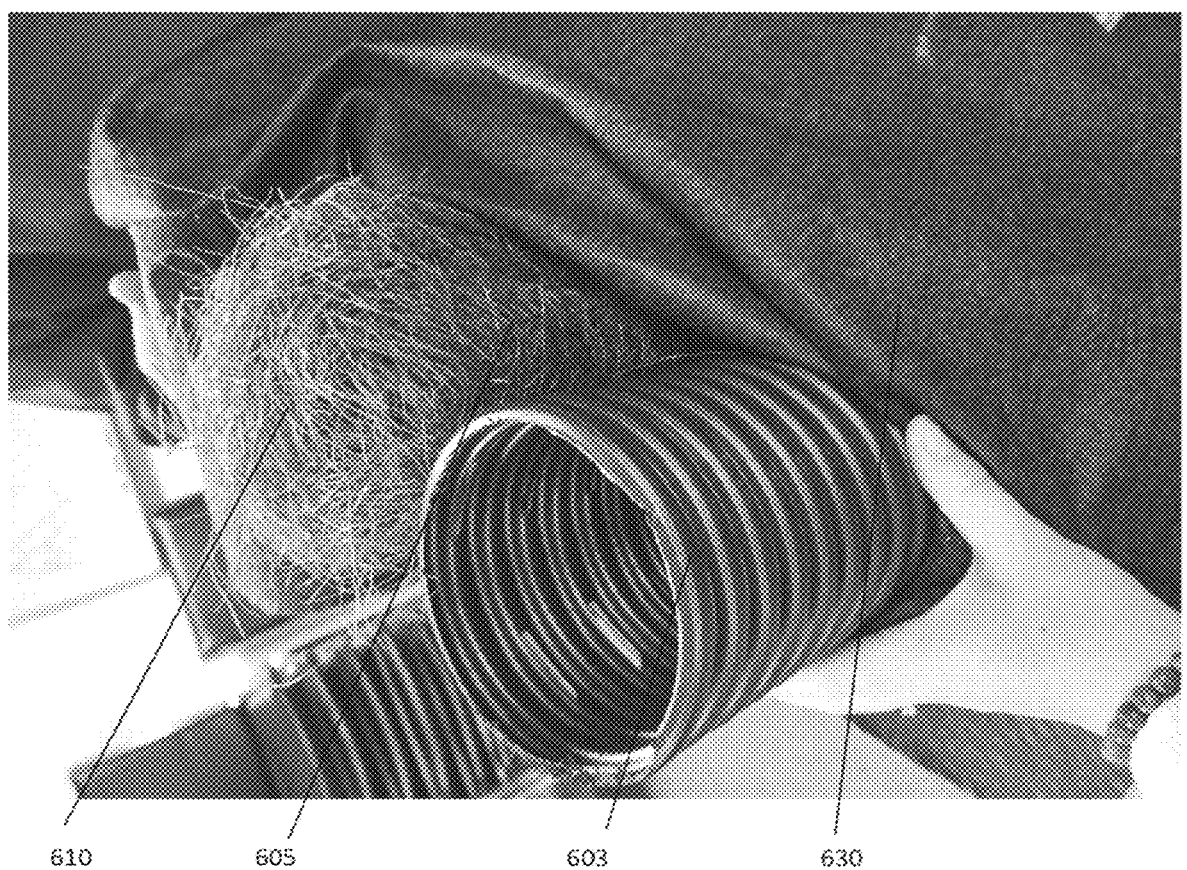
FIGS. 47-48 illustrate components of an example treatment fin utilizing a compressed fiber layer adjacent to a conduit, in one embodiment of the disclosure.
Figure 48:
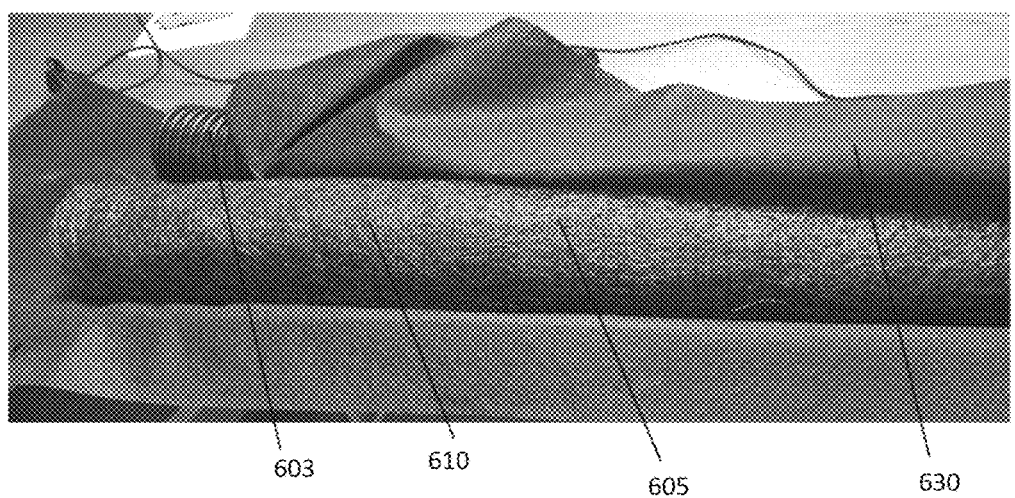

The end view of FIG. 47 and the side view of FIG. 48 similarly show a fin embodiment comprising a perforated pipe 603 which comprises the upper sub-portion of a fin, a netting 605 which holds together prior to assembly the fiber mass 610 which comprises the lower sub-portion of a fin, and a fabric layer 630 which envelopes the upper and lower sub-portions, holding them together.

Figure 49:
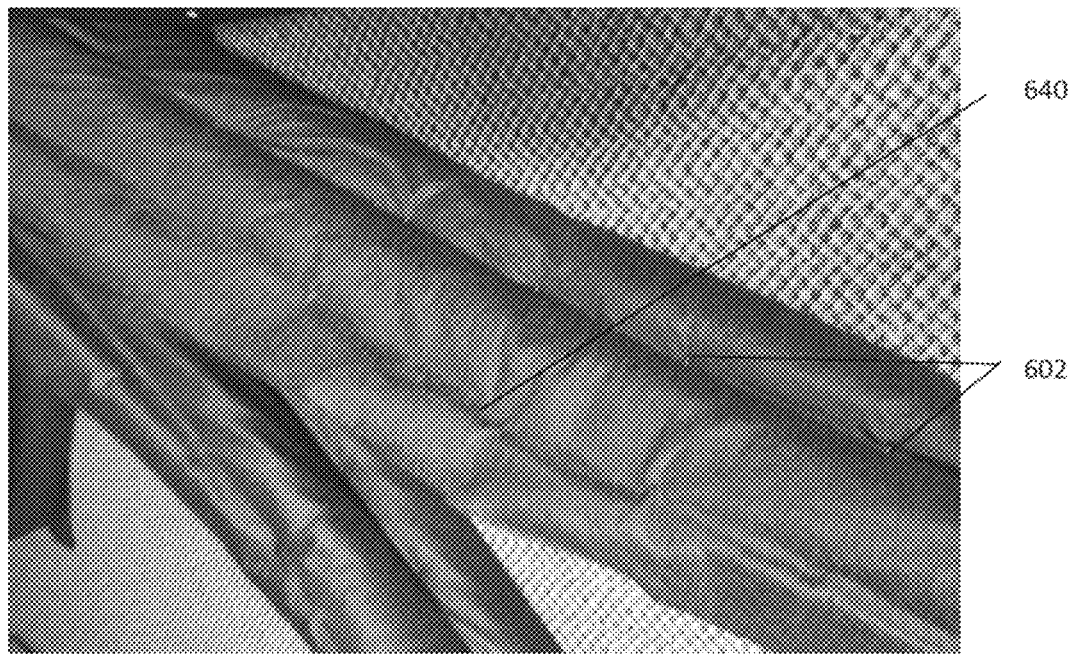
FIGS. 49-50 illustrate a fiber layer connected using an adhesive or glue, in one embodiment of the disclosure.
Figure 50:
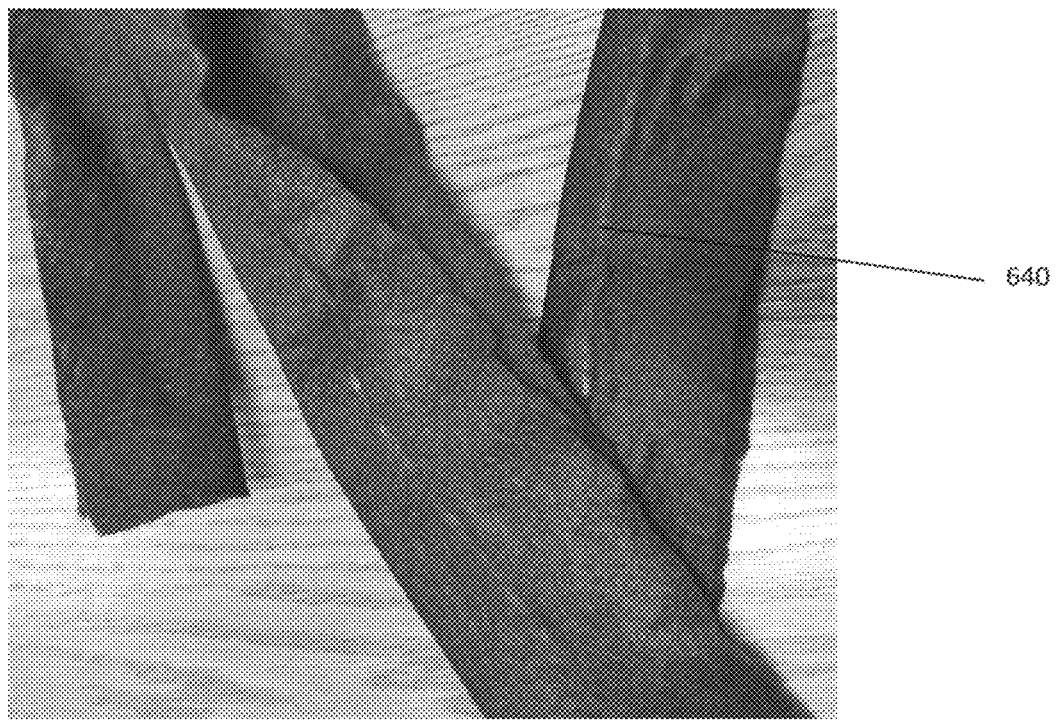

FIGS. 49-50 illustrate a fin embodiment formed of fiber layer which is folded around the upper sub-portion and, between the upper sub-portion and lower sub-portion, the opposing lengthwise sides of the fin fabric are fastened together along a stitch line by fasteners 602. The opposing sides of the fabric layer are fastened together at the bottom of the lower sub-portion by an adhesive or glue running along bonding line 640. In FIG. 50 the fabric of the lower sub-portion along a jagged edge, having been cut away from the fins shown in FIG. 49.

FIGS. 51A, 51B and 52 illustrate two clamshell halves 730, respectively an interior view and an exterior view, which halves are mateable and secured to each other by tabs, to form an embodiment of central distribution unit. It can be appreciated that for compact shipment one half unit can be nested within the other half unit, with the bottom surfaces one-within-the other in planar proximity to each other. Alternatively, one half unit can be turned upside down relative to the other half unit, so that for shipment the lengthwise edge of one half unit sets within the interior concavity of the mating half unit. Each half unit is similar to the other and comprises mating tabs 426 (discussed further below), a hole 125 for a distribution pipe, and a plurality of spaced apart oblong air ports 720 near the upper end of the distribution unit and above the elevation of the multiple passageways with skimmers.

Figure 53:
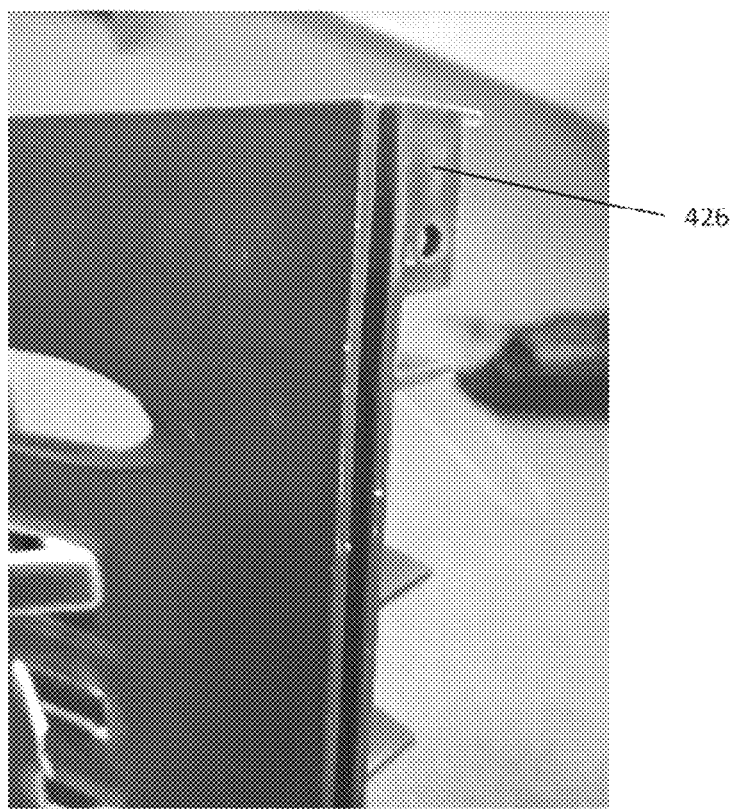
FIG. 53 illustrates a partial view of an upper portion of one clamshell half of a central distribution unit, in accordance with one embodiment of the disclosure.
Figure 54:
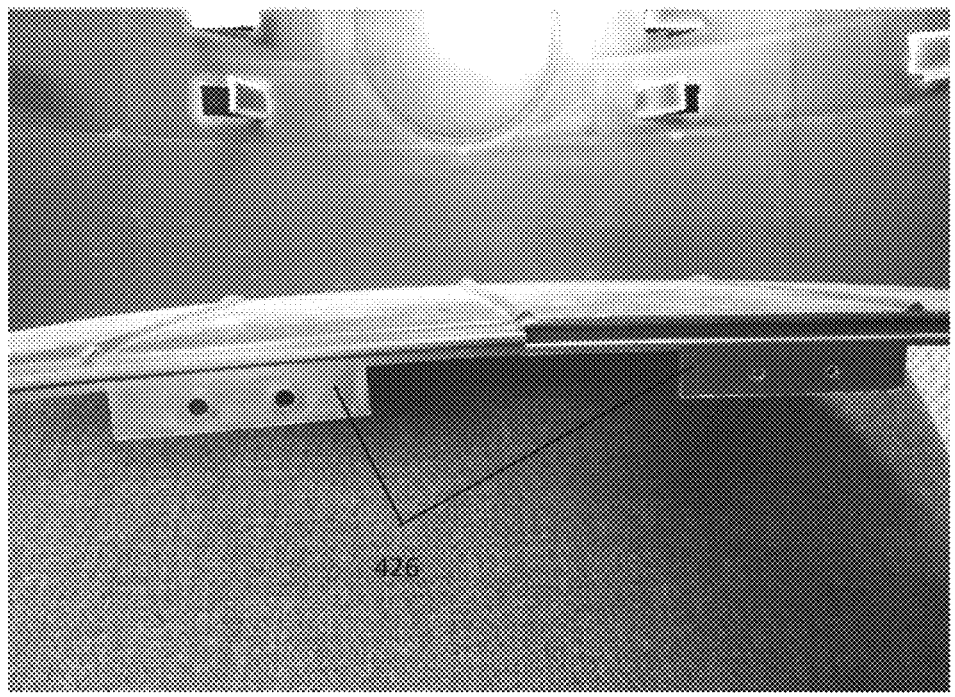
FIG. 54 illustrates a partial view of a lower power of one clamshell half of a central distribution unit, in accordance with one embodiment of the disclosure.
Figure 58A:
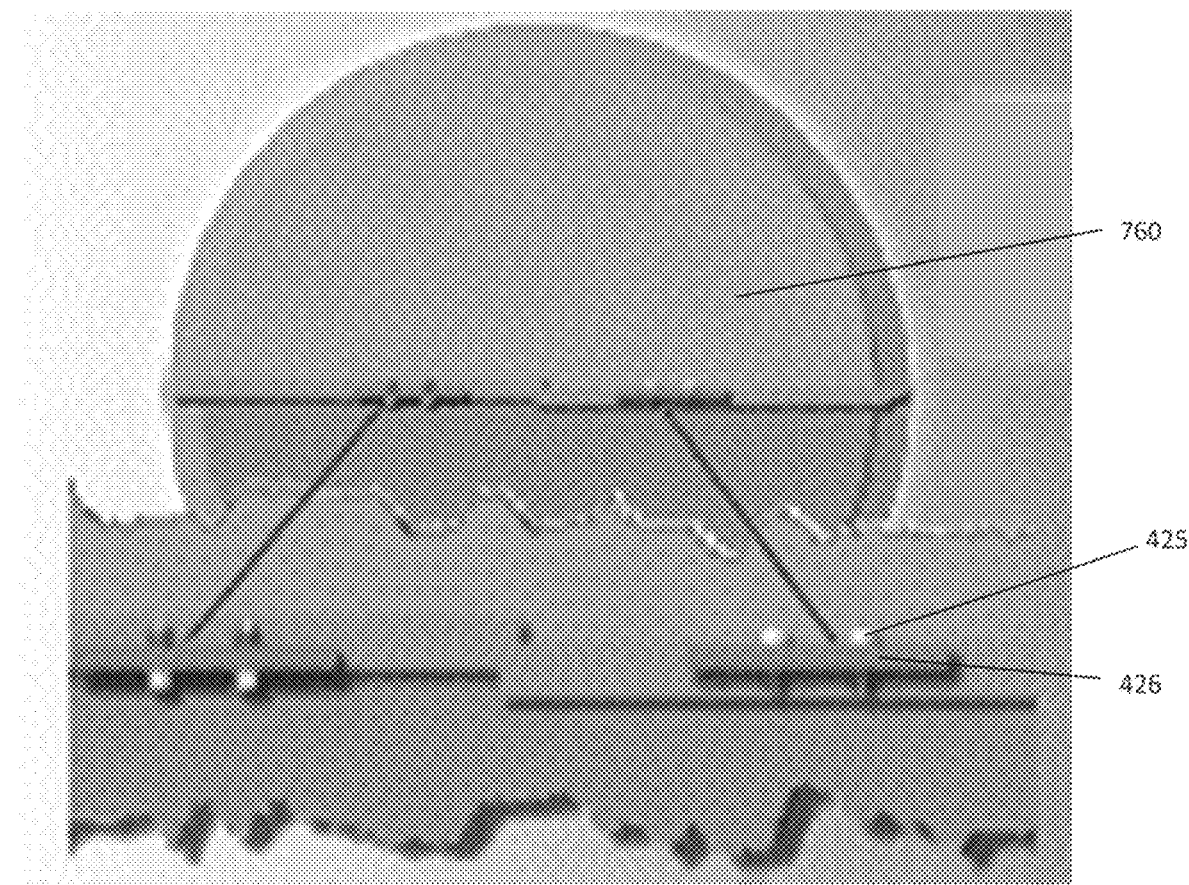
FIG. 58A illustrates a close-up view of a bottom portion of a central distribution unit as two clamshell halves are connected using a set of tabs and connectors, in accordance with one embodiment of the disclosure.
Figure 58B:
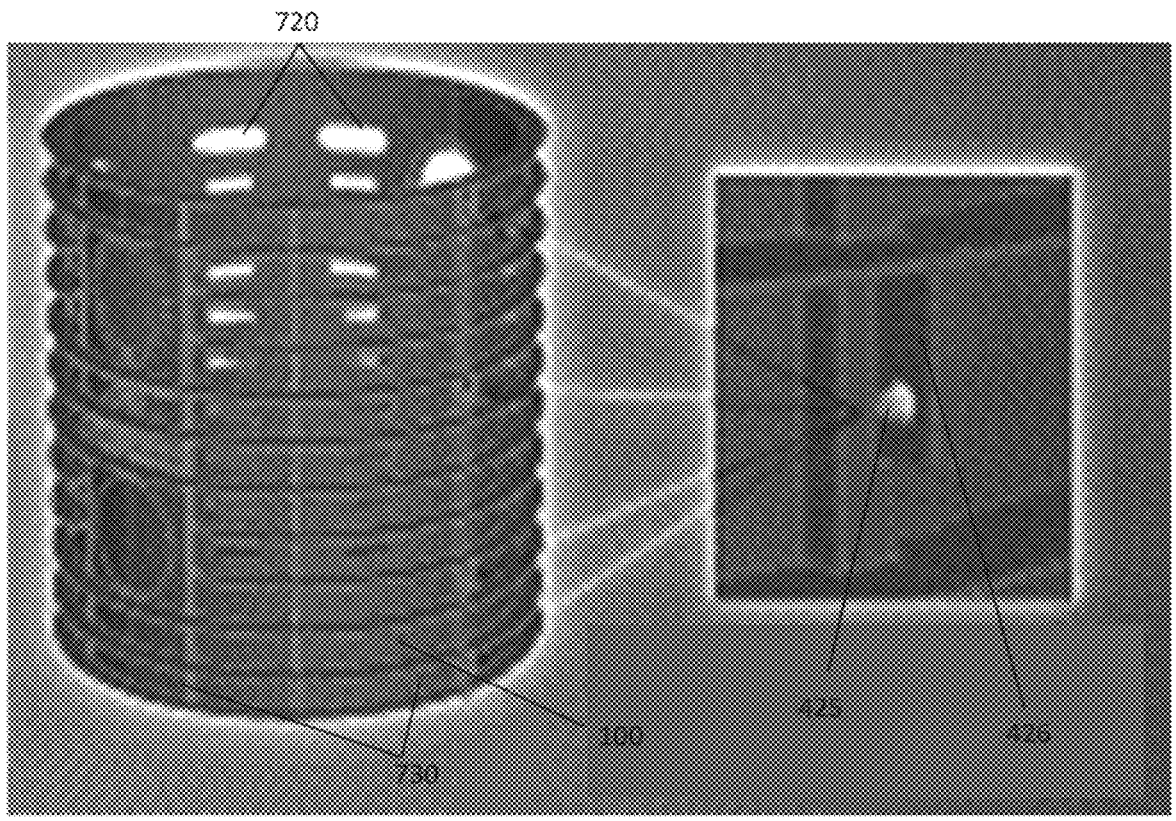
FIG. 58B illustrates an example embodiment of the present disclosure wherein two clamshell half portions of the central distribution unit are joined together using a set of tabs and connectors.

FIG. 53 and FIG. 54 show the edges of distribution units and associated tabs 426. In FIG. 53 a tabs has a single hole; in FIG. 54 tabs have two holes. Mating tabs of mating half units may be attached to each other by bolts 425, ties, or other fasteners. FIG. 58B shows in perspective a unit 100 with a blow-up of mated and bolted tabs. FIG. 58A shows with an inset enlarged portion an embodiment of distribution unit halves that are fastened to each other by bolts 425 running through tabs 426 which are along the joint of the planar bottom 760 of mated half units.

Figure 55:
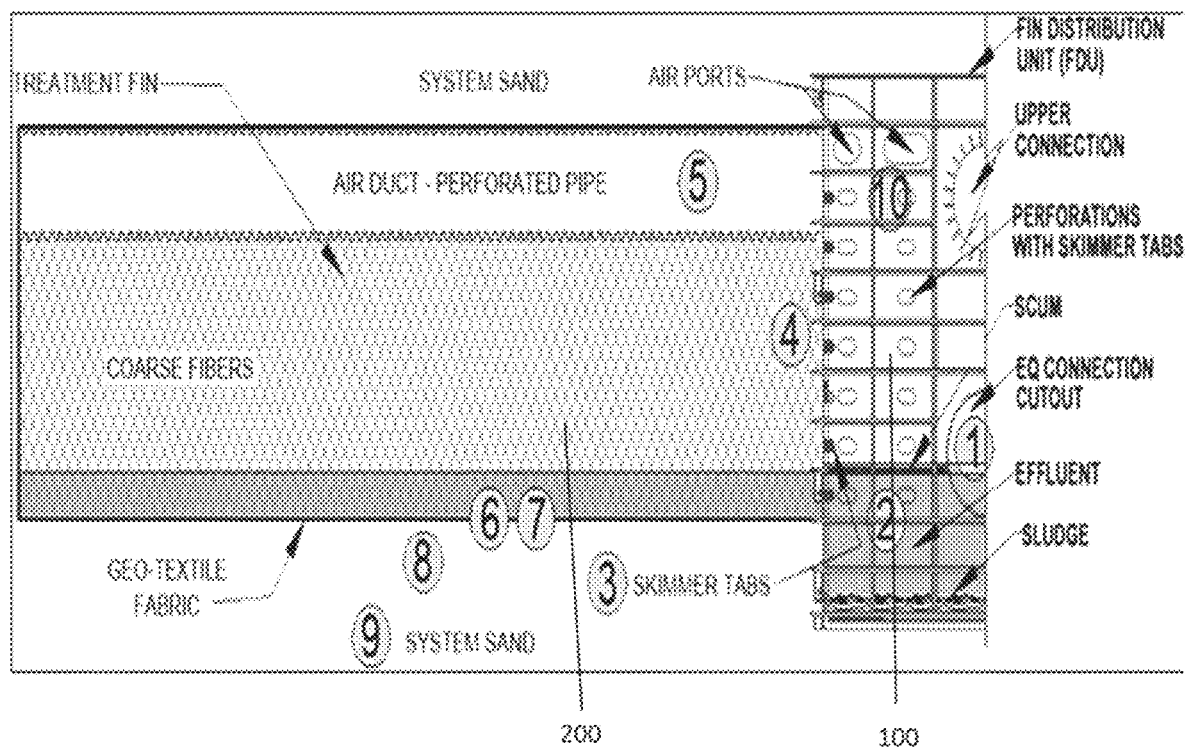
FIG. 55 illustrates a partial side elevation view of a central distribution unit and treatment fin, in accordance with one embodiment of the disclosure.

FIG. 55 is a side elevation schematic cross section of a portion of a treatment system module, showing one of the treatment fins comprised of a perforated pipe 5 in the upper sub-portion of the fin, a coarse fiber mass 200 in the lower sub-portion of the fin. The fabric layer 6 of the fin at the bottom of the lower sub-portion. Below the fin is sand media 9. The distribution unit 100 has skimmer tabs 3 associated with passageways, contains wastewater (effluent) 2, which when it rises sufficiently due to inflow of wastewater, will flow into the fiber mass at location 4. The unit 100 comprises a cutout 1 for placement of a distribution pipe (not shown).

Figure 56:
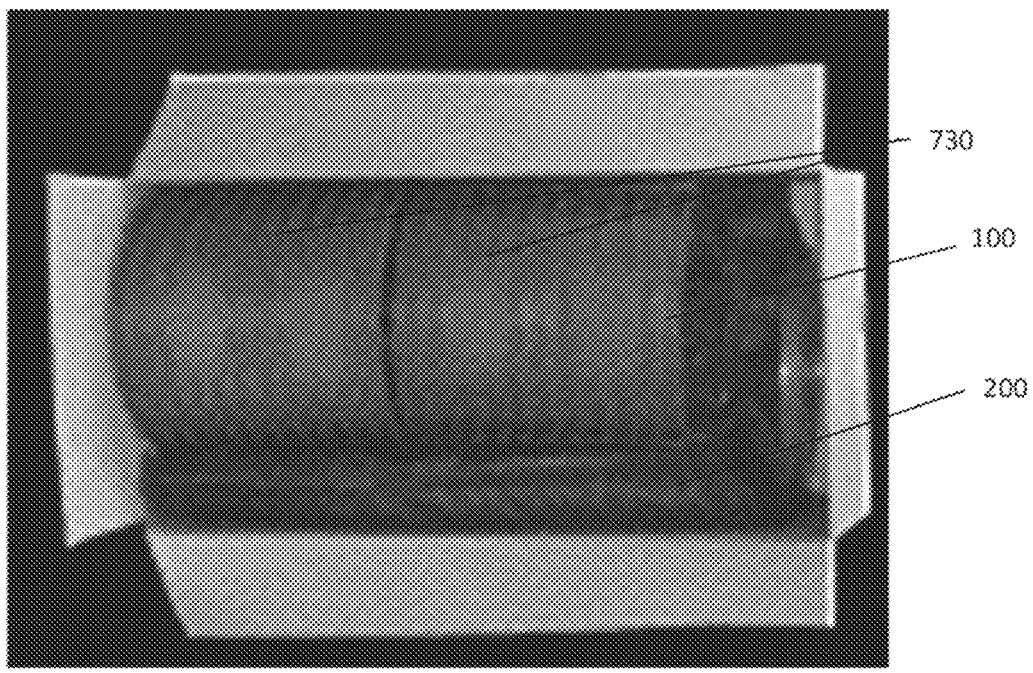
FIG. 56 illustrates a disassembled central distribution unit and a disassembled set of treatment fins packaged in a box/shipping container for shipment, in accordance with one embodiment of the disclosure.

FIG. 56 illustrates a disassembled central distribution unit and a disassembled set of treatment fins packaged in a box for shipment, in accordance with one embodiment of the disclosure.

Figure 57:
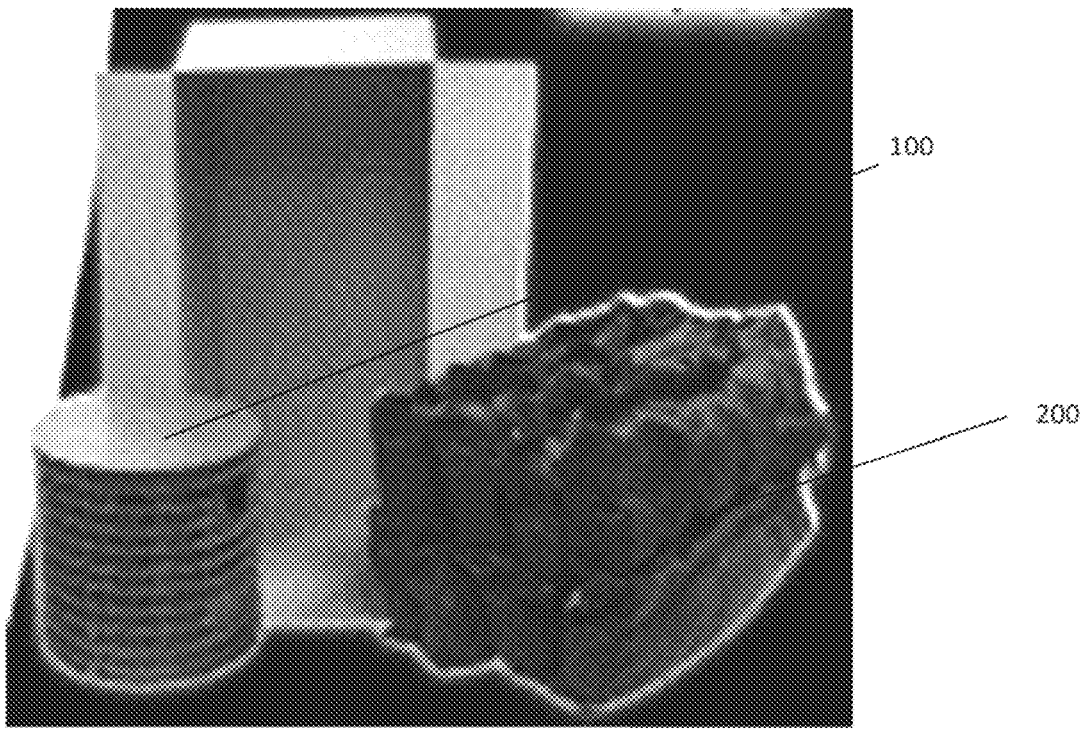
FIG. 57 illustrates a central distribution unit and a set of treatment fins folded into a compact form in preparation for shipment, in accordance with one embodiment of the disclosure.

FIG. 57 illustrates a central distribution unit and a set of treatment fins folded into a compact form in preparation for shipment, in accordance with one embodiment of the disclosure.

FIG. 58A illustrates a close-up view of a bottom portion of a central distribution unit as two clamshell halves are connected using a set of tabs and connectors, in accordance with one embodiment of the disclosure.

FIG. 58B illustrates an example embodiment of the present disclosure wherein two clamshell half portions of the central distribution unit are joined together using a set of tabs and connectors.

Figure 58C:
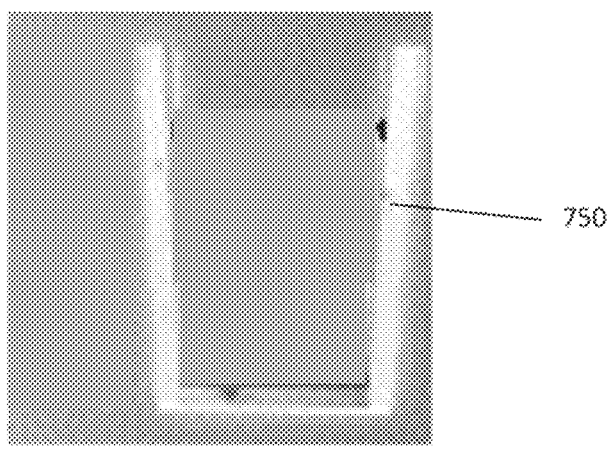
FIG. 58C illustrates an example bracket for supporting assembly of a liquid waste treatment system following shipment, in accordance with one embodiment of the disclosure.

FIG. 58C illustrates an example bracket for supporting assembly of a liquid waste treatment system following shipment, in accordance with one embodiment of the disclosure.

Figure 58D:
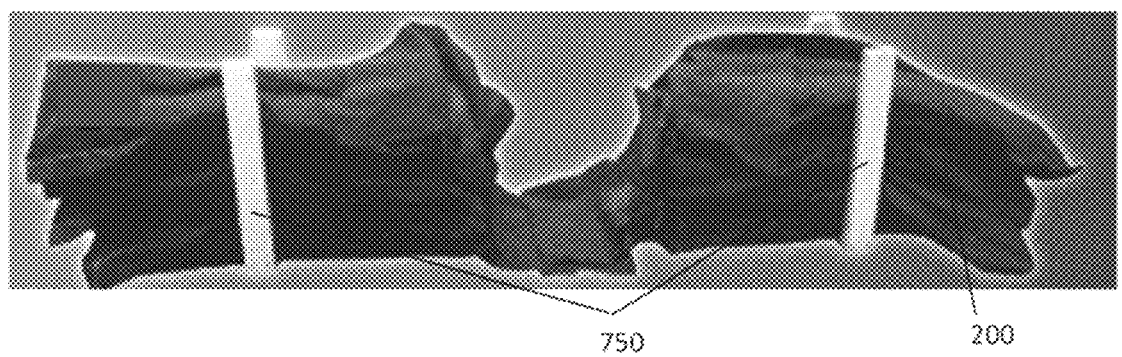
FIG. 58D illustrates a set of treatment fins supported in a bracket during assembly of a liquid waste treatment system, in accordance with one embodiment of the disclosure.

FIG. 58D illustrates a set of treatment fins supported in a bracket during assembly of a liquid waste treatment system, in accordance with one embodiment of the disclosure.

Figure 58E:
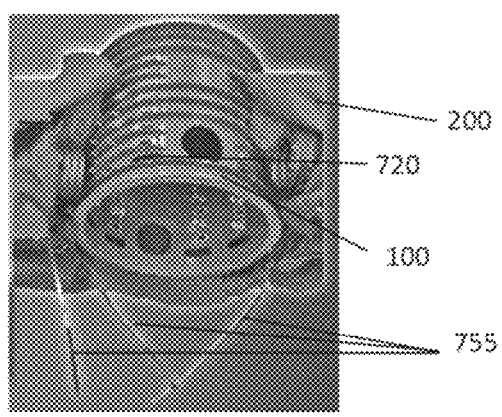
FIG. 58E illustrates a central distribution unit placed in the center of the configuration of FIG. 58D during assembly of a liquid waste treatment system, in accordance with one embodiment of the disclosure.

FIG. 58E illustrates a central distribution unit placed in the center of the configuration of FIG. 58D during assembly of a liquid waste treatment system, in accordance with one embodiment of the disclosure.

Figure 58F:
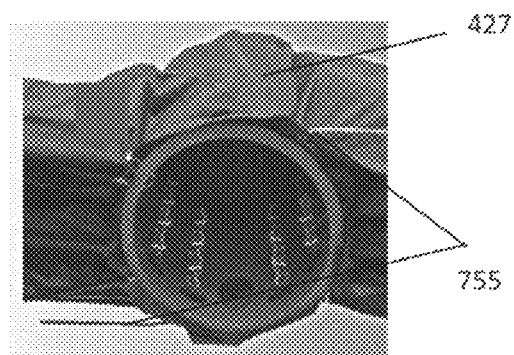
FIG. 58F illustrates a central distribution unit placed in the center of the configuration of FIG. 58D during assembly of a liquid waste treatment system, where a fabric layer is positioned to surround the central distribution unit, in accordance with one embodiment of the disclosure.

FIG. 58F illustrates a central distribution unit placed in the center of the configuration of FIG. 58D during assembly of a liquid waste treatment system, where a fabric layer is positioned to surround the central distribution unit, in accordance with one embodiment of the disclosure.

Figure 59:
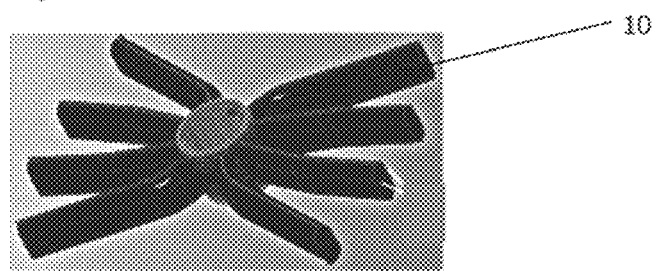
FIG. 59 illustrates an assembled treatment system, in accordance with one embodiment of the disclosure.

FIG. 59 illustrates an assembled treatment system, in accordance with one embodiment of the disclosure.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. An assembly comprising:
   (a) a wastewater treatment system module in condition for shipping, transport or storage prior to use, comprising:
   a central distribution unit having a vertical axis, an interior, an exterior, and a sidewall circumscribing the vertical axis thereby defining said interior, the sidewall having a multiplicity of passageways connecting said interior to said exterior; and,
   a multiplicity of treatment fins secured to the exterior of the central distribution unit, each said fin having
   a length,
   an interior portion in flow communication with at least one of said passageways and comprising compressed fiber, and
   an outer fabric layer surrounding the fin;
   wherein the fin is bendable with respect to both the fin length and the central distribution unit vertical axis;
   wherein each fin of said multiplicity is wrapped around the exterior of the central distribution unit in spiraling, overlapping, and partially touching contact fashion; and,
   (b) a shipping container;
   wherein said module is positioned within the container.

2. The assembly of claim 1 wherein each said fin has an oblong cross section and the interior portion is comprised of a lengthwise running upper sub-portion and a lengthwise running lower sub-portion, and at least one lengthwise-running perforated pipe within said upper sub-portion.

3. The assembly of claim 1, wherein the central distribution unit has a circular exterior.

4. The assembly of claim 1 wherein the shipping container has the shape of a rectanguloid.

5. The assembly of claim 1 wherein the module further comprises a membrane around the exterior of the central distribution unit defining therebetween a reservoir space, wherein the outer fabric layer or each fin is attached to the membrane and said interior portion of each fin is in flow communication with the reservoir.

6. A method for fabricating a wastewater treatment system at a site which comprises:
   providing an assembly in accord with claim 1;
   removing the module from the shipping container;
   assembling the module on a sand or soil surface of the site by unwrapping the fins from the central distribution unit and extending the fins radially or longitudinally from the central distribution unit; and, placing sand or other media around the fins.

7. The method of claim 6 wherein the module is configured to treat wastewater to meet NSF 40 standards at a rate of more than 150 gallons per day.

8. An assembly comprising:
   (a) a wastewater treatment system module kit in condition for shipping transport or storage prior to use, comprising:
   a central distribution unit having a vertical axis, an interior, an exterior, and a sidewall circumscribing the vertical axis thereby defining said interior, the sidewall having a multiplicity of passageways connecting said interior to said exterior; and,
   a multiplicity of treatment fins connected to a membrane shaped for fitting the exterior of the sidewall of the central distribution unit, so that the fins are secured to the exterior of the central distribution unit, each said fin having
   a length, an interior portion configured for flow communication with at least one passageway and comprising compressed fiber, and an outer fabric layer surrounding the fin;

wherein each fin of said multiplicity is bendable with respect to both the fin length and the central distribution unit vertical axis;

wherein each fin of said multiplicity is wrapped around the exterior of the central distribution unit in spiraling, overlapping, and partially touching contact fashion; and, (b) a shipping container;

wherein said wastewater treatment system module kit is positioned within the container.

9. The assembly of claim 8 wherein the central distribution unit comprises two half units separated from each other, and positioned in nested fashion relative to each other within the shipping container.

10. The assembly of claim 8 wherein the shipping container has a rectanguloid shape.

11. A method for fabricating a wastewater treatment system at a site which comprises:

providing an assembly in accord with claim 8;

removing the wastewater treatment system module kit from the shipping container;

assembling said kit as a wastewater treatment system module on a sand or soil surface of the site by unwrapping said multiplicity of fins from the central distribution unit, putting the membrane around the exterior of the central distribution unit and extending the fins radially or longitudinally from the central distribution unit; and, placing sand or other media around the extended fins.

* * * * *